(12) United States Patent (10) Patent No.: US 7,233,929 B1
Lingle et al. (45) Date of Patent: Jun. 19, 2007

(54) POSTAL SYSTEM INTRANET AND COMMERCE PROCESSING FOR ON-LINE VALUE BEARING SYSTEM

(75) Inventors: Piers Christian Lingle, Los Angeles, CA (US); Keith Shoji Kiyohara, Santa Monica, CA (US); Kenneth Kay-Yih Hwang, Los Angeles, CA (US); Girish Venkat, Los Angeles, CA (US)

(73) Assignee: Stamps.Com, Santa Monica, CA (US)

( * ) Notice: Subject to any disclaimer, the term of this patent is extended or adjusted under 35 U.S.C. 154(b) by 0 days.

(21) Appl. No.: 09/692,829

(22) Filed: Oct. 18, 2000

Related U.S. Application Data

(60) Provisional application No. 60/154,523, filed on Oct. 19, 1999, provisional application No. 60/160,036, filed on Oct. 18, 1999, provisional application No. 60/160,491, filed on Oct. 20, 1999, provisional application No. 60/160,703, filed on Oct. 20, 1999, provisional application No. 60/160,112, filed on Oct. 20, 1999, provisional application No. 60/160,563, filed on Oct. 20, 1999.

(51) Int. Cl.
*G06Q 40/00* (2006.01)
*H04K 1/00* (2006.01)
*H04L 9/00* (2006.01)
*G06F 17/00* (2006.01)
*G07B 17/02* (2006.01)

(52) U.S. Cl. .......................... 705/402; 705/60; 705/62; 705/401

(58) Field of Classification Search .................. 705/1, 705/50–53, 64, 400, 401, 60, 62, 402
See application file for complete search history.

(56) References Cited

U.S. PATENT DOCUMENTS

| | | | |
|---|---|---|---|
| 4,447,890 A | 5/1984 | Duwel et al. | |
| 4,725,718 A | 2/1988 | Sansone et al. | 235/495 |
| 4,743,747 A | 5/1988 | Fougere et al. | 235/494 |
| 4,757,537 A | 7/1988 | Edelmann et al. | |

(Continued)

FOREIGN PATENT DOCUMENTS

EP 0 360 225 A2 3/1990

(Continued)

OTHER PUBLICATIONS

"Protecting organizations from electronic-transaction fraud", Healthcare Financial Management; Westchester; Feb. 1995; Sagner, James S.*

(Continued)

*Primary Examiner*—Calvin L. Hewitt, II
(74) *Attorney, Agent, or Firm*—Christie, Parker & Hale, LLP

(57) ABSTRACT

An on-line system for printing a value bearing item (VBI) that includes a client subsystem for interfacing with a user, a cryptographic device remote from the client subsystem for authenticating a plurality of users, and a server subsystem capable of communicating with the client subsystem and having code for providing customer support to a user, for administering a user VBI meter, for providing payment administration support to a user, providing accounts receivable support to a user, meter refund and withdrawal processing support to a user, providing misprint processing support to a user, and providing payment processing and billing functions. A method implementing these features is also provided.

14 Claims, 87 Drawing Sheets

U.S. PATENT DOCUMENTS

| | | | |
|---|---|---|---|
| 4,775,246 A | 10/1988 | Edelmann et al. | 380/23 |
| 4,802,218 A | 1/1989 | Wright et al. | 380/23 |
| 4,812,994 A | 3/1989 | Taylor et al. | |
| 4,831,555 A | 5/1989 | Sansone et al. | |
| 4,837,702 A | 6/1989 | Obrea | |
| 4,853,865 A | 8/1989 | Sansone et al. | |
| 4,900,903 A | 2/1990 | Wright et al. | |
| 4,900,904 A | 2/1990 | Wright et al. | |
| 4,908,770 A | 3/1990 | Breault et al. | |
| 4,933,849 A | 6/1990 | Connell et al. | |
| 4,935,961 A | 6/1990 | Gargiulo et al. | 380/21 |
| 4,949,381 A | 8/1990 | Pastor | |
| 4,980,542 A | 12/1990 | Jackson et al. | |
| 5,048,085 A | 9/1991 | Abraham et al. | |
| 5,058,008 A | 10/1991 | Schumacher | |
| 5,075,865 A | 12/1991 | Kawamura et al. | |
| 5,111,030 A | 5/1992 | Brasington et al. | |
| 5,142,577 A | 8/1992 | Pastor | |
| 5,181,245 A | 1/1993 | Jones | 380/23 |
| 5,265,221 A | 11/1993 | Miller | |
| 5,319,562 A | 6/1994 | Whitehouse | 364/464.03 |
| 5,325,519 A | 6/1994 | Long et al. | |
| 5,341,505 A | 8/1994 | Whitehouse | |
| 5,377,268 A | 12/1994 | Hunter | 380/23 |
| 5,384,886 A | 1/1995 | Rourke | |
| 5,390,251 A | 2/1995 | Pastor et al. | |
| 5,448,641 A | 9/1995 | Pintsov et al. | |
| 5,454,038 A | 9/1995 | Cordery et al. | |
| 5,471,925 A | 12/1995 | Heinrich et al. | |
| 5,561,795 A | 10/1996 | Sarkar | |
| 5,570,465 A | 10/1996 | Tsakanikas | 395/114 |
| 5,598,477 A | 1/1997 | Berson | |
| 5,600,562 A | 2/1997 | Guenther | |
| 5,621,797 A | 4/1997 | Rosen | |
| 5,655,023 A | 8/1997 | Cordery et al. | |
| 5,659,616 A | 8/1997 | Sudia | |
| 5,666,421 A | 9/1997 | Pastor et al. | |
| 5,680,629 A | 10/1997 | Slayden et al. | |
| 5,684,951 A | 11/1997 | Goldman et al. | |
| 5,715,164 A * | 2/1998 | Liechti et al. | 705/410 |
| 5,729,734 A * | 3/1998 | Parker et al. | 707/9 |
| 5,742,683 A | 4/1998 | Lee et al. | |
| 5,768,132 A | 6/1998 | Cordery et al. | |
| 5,781,438 A | 7/1998 | Lee et al. | |
| 5,781,634 A | 7/1998 | Cordery et al. | |
| 5,793,867 A | 8/1998 | Cordery et al. | 380/4 |
| 5,796,841 A | 8/1998 | Cordery et al. | |
| 5,801,944 A | 9/1998 | Kara | 364/464.2 |
| 5,812,990 A | 9/1998 | Ryan, Jr. et al. | |
| 5,812,991 A | 9/1998 | Kara | 705/410 |
| 5,819,240 A | 10/1998 | Kara | |
| 5,822,739 A | 10/1998 | Kara | |
| 5,825,893 A | 10/1998 | Kara | 380/51 |
| 5,867,578 A | 2/1999 | Brickell et al. | |
| 5,917,924 A | 6/1999 | Herbert | |
| 5,918,234 A | 6/1999 | Shah et al. | |
| 5,930,796 A | 7/1999 | Pierce et al. | 707/100 |
| 5,940,383 A * | 8/1999 | Willkie | 370/336 |
| 5,953,427 A | 9/1999 | Cordery et al. | 380/51 |
| 5,956,404 A | 9/1999 | Schneier et al. | |
| 5,978,484 A | 11/1999 | Apperson et al. | |
| 5,983,227 A | 11/1999 | Nazem et al. | 707/10 |
| 5,987,441 A | 11/1999 | Lee et al. | 705/401 |
| 5,988,897 A | 11/1999 | Pierce et al. | 400/61 |
| 6,005,945 A * | 12/1999 | Whitehouse | 380/51 |
| 6,009,417 A | 12/1999 | Brookner et al. | |
| 6,010,156 A | 1/2000 | Block | |
| 6,026,385 A | 2/2000 | Harvey et al. | 705/408 |
| 6,049,671 A | 4/2000 | Slivka et al. | |
| 6,058,384 A * | 5/2000 | Pierce et al. | 705/50 |
| 6,061,671 A | 5/2000 | Baker et al. | 705/404 |
| 6,064,993 A | 5/2000 | Ryan, Jr. | 705/403 |
| 6,065,117 A | 5/2000 | White | |
| 6,070,150 A * | 5/2000 | Remington et al. | 705/34 |
| 6,081,810 A | 6/2000 | Rosenzweig et al. | |
| 6,098,058 A | 8/2000 | Gravell et al. | |
| 6,105,063 A * | 8/2000 | Hayes, Jr. | 709/223 |
| 6,134,582 A * | 10/2000 | Kennedy | 709/206 |
| 6,151,591 A | 11/2000 | Pierce et al. | |
| 6,161,139 A * | 12/2000 | Win et al. | 709/225 |
| 6,164,528 A * | 12/2000 | Hills et al. | 235/379 |
| 6,166,729 A * | 12/2000 | Acosta et al. | 715/719 |
| 6,223,166 B1 | 4/2001 | Kay | |
| 6,226,752 B1 * | 5/2001 | Gupta et al. | 713/201 |
| 6,233,565 B1 * | 5/2001 | Lewis et al. | 705/35 |
| 6,233,568 B1 * | 5/2001 | Kara | 705/410 |
| 6,249,777 B1 * | 6/2001 | Kara et al. | 705/404 |
| 6,275,824 B1 * | 8/2001 | O'Flaherty et al. | 707/9 |
| 6,286,098 B1 | 9/2001 | Wenig et al. | |
| 6,324,523 B1 * | 11/2001 | Killeen et al. | 705/35 |
| 6,341,274 B1 | 1/2002 | Leon | |
| 6,353,926 B1 | 3/2002 | Parthesarathy et al. | |
| 6,367,013 B1 | 4/2002 | Bisbee et al. | |
| 6,381,589 B1 | 4/2002 | Leon | |
| 6,385,654 B1 * | 5/2002 | Tanaka | 709/231 |
| 6,385,731 B2 | 5/2002 | Ananda | |
| 6,415,983 B1 | 7/2002 | Ulvr et al. | |
| 6,424,954 B1 | 7/2002 | Leon | |
| 6,427,021 B1 | 7/2002 | Fischer et al. | |
| 6,466,921 B1 | 10/2002 | Cordery et al. | |
| 6,473,743 B1 | 10/2002 | Ryan, Jr. | |
| 6,546,377 B1 | 4/2003 | Gravell et al. | |
| 6,567,794 B1 | 5/2003 | Cordery et al. | |
| 6,587,880 B1 | 7/2003 | Saigo et al. | |
| 6,636,983 B1 | 10/2003 | Levi | |
| 2001/0034716 A1 | 10/2001 | Goodwin | |
| 2001/0037320 A1 | 11/2001 | Allport et al. | |
| 2001/0055388 A1 | 12/2001 | Kaliski, Jr. | |
| 2002/0046193 A1 | 4/2002 | Bator et al. | |
| 2002/0095383 A1 | 7/2002 | Mengin et al. | |
| 2003/0078893 A1 | 4/2003 | Shah et al. | |
| 2003/0130954 A1 | 7/2003 | Carr et al. | |
| 2005/0114712 A1 | 5/2005 | Devine et al. | |

FOREIGN PATENT DOCUMENTS

| | | |
|---|---|---|
| EP | 0 576 113 A2 | 12/1993 |
| EP | 0 604 146 A3 | 6/1994 |
| EP | 0 604 148 A3 | 6/1994 |
| EP | 0 647 925 A2 | 4/1995 |
| EP | 0 604 146 B1 | 11/1997 |
| EP | 0840258 | 5/1998 |
| EP | 0 854 448 A2 | 7/1998 |
| EP | 0 892 367 A2 | 1/1999 |
| EP | 927956 A2 * | 7/1999 |
| EP | 0927958 | 7/1999 |
| EP | 0927963 | 7/1999 |
| EP | 0948158 | 10/1999 |
| GB | 2318486 A | 4/1998 |
| WO | WO 94/27258 | 11/1994 |
| WO | WO 98/13790 A1 | 4/1998 |
| WO | WO 98/57302 | 12/1998 |
| WO | WO 98/57460 A1 | 12/1998 |
| WO | WO 99/18514 | 4/1999 |
| WO | WO 00/19382 A1 | 4/2000 |
| WO | WO 00/70503 A1 | 11/2000 |
| WO | WO 01/50227 A2 | 7/2001 |

OTHER PUBLICATIONS

Peppriell, Barbara, "The Post Office Unveils the E-STAMP", Searcher, v7, n5, May 1999.*

United States Postal Service, XP-002137734, "Information Based Indicia Program Postal Security Device Specification," Jun. 1996, Whole document (41 pgs.).

International Search Report, Intl. Appl. No. PCT/US00/41291, Feb. 2001.

Fickel, Louise, "Know Your Customer," Leaders for the Next Millennium, CIO Magazine, Aug. 15, 1999; pp. 1-11.

The United States Postal Service (USPS) Engineering Center; Information Based Indicia Program (IBIP) Indicium Specification; Jun. 13, 1996; 22pp.

The United States Postal Service (USPS); Information-Based Indicia Program (IBIP): Performance Criteria for Information-Based Indicia and Security Architecture for Closed IBI Postage Metering Systems (PCIBI-C); Jan. 12, 1999; 49pp.

The United States Postal Service (USPS); Information-Based Indicia Program (IBIP); Performance Criteria for Information-Based Indicia and Security Architecture for Open IBI Postage Evidencing Systems (PCIBI-O); Jun. 25, 1999; 76pp.

U.S. Appl. No. 09/585,025, filed Jun. 1, 2000, "Online Value Bearing Item Printing", 125pp.

U.S. Appl. No. 09/688,451, filed Oct. 16, 2000, Auditing Method and System for an On-Line Value-Bearing Item Printing System, 105pp.

U.S. Appl. No. 09/688,452, filed Oct. 16, 2000, "Role Assignments in a Cryptographic Module for Secure Processing of Value-Bearing Items", 105pp.

U.S. Appl. No. 09/688,456, filed Oct. 16, 2000, "Cryptographic Module for Secure Processing of Value- Bearing Items", 109pp.

U.S. Appl. No. 09/690,066, filed Oct. 16, 2000, "Cryptographic Module for Secure Processing of Value-Bearing Items", 121pp.

U.S. Appl. No. 09/690,083, filed Oct. 16, 2000, "Cryptographic Module for Secure Processing of Value-Bearing Items", 109pp.

U.S. Appl. No. 09/690,243, filed Oct. 17, 2000, "Method and Apparatus for On-Line Value-Bearing Item System", 66pp.

U.S. Appl. No. 09/690,796, filed Oct. 17, 2000, "Secure and Recoverable Database for On-Line Value-Bearing Item System", 71pp.

U.S. Appl. No. 09/692,746, filed Oct. 18, 2000, "Method and Apparatus for Digitally Signing an Advertisement Area Next to a Value-Bearing Item", 61pp.

U.S. Appl. No. 09/788,069, filed Feb. 16, 2001, "On-Line Value-Bearing Indicium Printing Using DSA", 43pp.

U.S. Appl. No. 10/083,236, filed Feb. 26, 2002, "Secured Centralized Public Key Infrastructure", 101pp.

Pastor, Jose; CRYPTOPOST™—A Cryptographic Application to Mail Processing; Journal of Cryptology; 1991; 137-146 pp.; vol. 3; No. 2; International Association for Cryptologic Research.

Tygar, J.D. and Yee, Bennet; Cryptography: It's Not Just for *Electronic* Mail Anymore; School of Computer Science; Mar. 1, 1993; 1-21 pp.; Carnegie Mellon University, Pittsburg, PA, USA.

Tygar, J.D. and Yee, Bennet; Dyad: A System for Using Physically Secure Coprocessors; School of Computer Science; May 4, 1991; 1-36 pp.; Carnegie Mellon University, Pittsburg, PA, USA.

Ratcliffe, Mitch "Ever feel you're being watched? You will.", Digital Media, May 16, 1994 v3, n12, pp. 1-3.

* cited by examiner

Customer ID
This header is persistent. It is visible at all times on all screens within an individual customer's record.

Customer Menu
Functions available that directly affect a single customer's profile. Menu changes with context.

206

CS Home | Search | Meter Profile | Account History | instant adjustment
Meter Payment History | Withdraw Meter | Meter Hisotry | Email History | Reset Password

| Last Name | Goodwin | First Name | Jonathan | Middle Name | D |
|---|---|---|---|---|---|
| User Name | JGTemp2 | User ID | 0100015c | Meter # | 1031 |

Account Status

| Account Status | 3 | Date | 00:00:00 |
|---|---|---|---|
| Status Reason | 0 | | |
| Available Balance | 10 | Total Postage Purchased | 10 |
| Last Print Date | | Total stamps Printed | |
| License Status | | Date | |
| QA Envelope Status | | Next Envelope Due | |
| Billing Plan | 2 | Next Statement Date | -1 |

Contact Information

| Company Name | Goodwin | | |
|---|---|---|---|
| Title | | | |
| Billing Address | 2900 31ST STREET | | |
| Billing City | SANTA MONICA | State CA | Zip 90405 |
| Email | jgoodwin@stamps.com | | Last 4 0: |
| Phone # | 3104084051 | Alternate Phone # | |
| Fax # | | | |
| Comment | | | |

☐ Send Marketing Material

Submit Changes

Password Recovery Verification

Please confirm that the following information is correct. If *any* information is incorrect, click <CANCEL> or the <Back> button on your browser to correct.

| | |
|---|---|
| Mother's Maiden Name | Smith |
| Last 4 digits of SS # | 9999 |
| Customer Contact Method | Phone |

[Submit] [Cancel]

| Last Name | | First Name | | Middle Name | |
|---|---|---|---|---|---|
| User Name | | User ID | | Meter # | |
| Email | | | | | |

Meter Payment History

| Amount in Meter: | | | | Amount Available: | | |
|---|---|---|---|---|---|---|
| | | | | Amount Disputed: | | |
| Request # | Date | Payment Type | Amount | Status | Status Comment | Running Balance |
| 1234567 | | | | | | |

| Last Name | | First Name | | Middle Name | |
|---|---|---|---|---|---|
| User Name | | User ID | | Meter # | |
| Email | | | | | |
| | | | | | |
| Meter License | | | | | |
| License # | | Date of Application | | | |
| Licensing PO | | Date of Approval | | | |
| PO Finance # | | Date Hardcopy of Application Received | | | |
| Meter # | | | | | |
| | | | | | |
| Contact Information | | | | | |
| Mailing Address | | | | | |
| Mailing City | | Mailing State | | Mailing Zip Code | |
| Physical Address | | | | | |
| Physical City | | Physical State | | Physical Zip Code | |

| Last Name | | First Name | | Middle Name | |
|---|---|---|---|---|---|
| User Name | | User ID | | Meter # | |
| Email | | | | | |
| | | | | | |
| Meter Status History | | | | | |
| Date | | Status | | Reason | |
| 05/16/99 | | Active | | License Approved | |

FIG. 17

| Email History | | | | |
|---|---|---|---|---|
| Status | From | To | Subject | Date |
| Rejected | AR | Jdoe@hotmail.com | Billing Statement | 06/15/1999 |
| Sent-Client Receipt | AR | JADoe@juno.com | Billing Statement | 06/30/1999 |
| Queued | CS | JADoe@juno.com | Account Credit | 07/02/1999 |

Home | Search | Customer Profile | License Information | Meter Payment History | Withdraw Meter
Instant Adjustment | Email History | Reset Password | Adjust Account | Fee Suspension

| Last Name | First Name | Middle Name |
|---|---|---|
| User Name | User ID | Meter # |
| Email | | |

| Stamps.com Account History | | | | | |
|---|---|---|---|---|---|
| Account Status: | Balance Owed : | | Days Outstanding: | | |
| Statement # | Date of Charge | Service Amount | Payment Plan ID | Payment Method | Status Status Comments |
| 345678 | | | | | |

FIG. 19

| Last Name | | First Name | | Middle Name | |
|---|---|---|---|---|---|
| User Name | | User ID | | Meter # | |
| Email | | | | | |

Statement Details

Hello, John. Thank you for using Stamps.com. Recommend a friend and receive 10% of your next purchase. Ask our Customer Support Staff for more details.

| | | |
|---|---|---|
| Total Postage Printed: | $20.00 | Postage Print to Date: $100.00 |
| Postage Print Fee: | $0.00 | |
| Service Plan Fee: | $0.00 purchased labels | |
| | $10.00 purchased envelopes | |
| | $3.00 shipping charges | |
| Other Credits: | $0.00 | |

| Total Charges | $18.25 |
|---|---|

Convenience Fee Suspension

Suspend Convenience Fees

Time Period (in months): 1

2
3
4
5
6
7
8
9
10
11
12

Submit

Fee Waive Verification

Hit the <Yes> button to complete the fee waive. If this information is incorrect, hit the <No> button.

| | |
|---|---|
| Customer Name | John Doe |
| Suspend Fees for | 3 months |

[Yes]  [No]

| Last Name | First Name | Middle Name |
|---|---|---|
| User Name | User ID | Meter # |
| Email | | |

Convenience Fee Adjustment

Convenience Fees - will be reflected in the customer's next statement

Amount [ ] . [ ]     Reason [Select One ▼]

○ Add to fees
◉ Subtract from fees

Comments [            ]

[Submit] [Cancel]

FIG. 23

Print Error Claim

Please enter information from each misprinted mailpiece.

| Claim # | | Spoils Cap | $20.00 |
|---|---|---|---|
| Username | | Claimed to Date | $15.25 |
| Email | | | |

| Spoil # | Date | Amount | Readable? | Scannable? |
|---|---|---|---|---|
| 1 | / / | . | ☐ | ☐ |
| 2 | / / | . | ☐ | ☐ |
| 3 | / / | . | ☐ | ☐ |
| 4 | / / | . | ☐ | ☐ |
| 5 | / / | . | ☐ | ☐ |
| 6 | / / | . | ☐ | ☐ |
| 7 | / / | . | ☐ | ☐ 275 |

283 — More?   Finished

Print Error Claim - Additional Entries

Please enter information from each misprinted mailpiece.

| Claim # | 456722 | Spoils Cap | $20.00 |
|---|---|---|---|
| Username | JohnDoe | Claimed to Date | $15.25 |
| Email | jdoe@juno.com | | |

| Spoil # | Date | Amount | Readable? | Scannable? |
|---|---|---|---|---|
| 8 | / / | . | ☐ | ☐ |
| 9 | / / | . | ☐ | ☐ |
| 10 | / / | . | ☐ | ☐ |
| 11 | / / | . | ☐ | ☐ |
| 12 | / / | . | ☐ | ☐ |
| 13 | / / | . | ☐ | ☐ |
| 14 | / / | . | ☐ | ☐ |

[More?] [Finished]

Print Error Claim Verification

Review the information below. If everything is correct, click <Process>. If there are any errors, click <Back> and correct them.

| Username | JohnDoe |
|---|---|
| Email | jdoe@juno.com |
| Claim # | 456782 |
| Claim Total | $13.33 |

[Process] [<<Back]    288

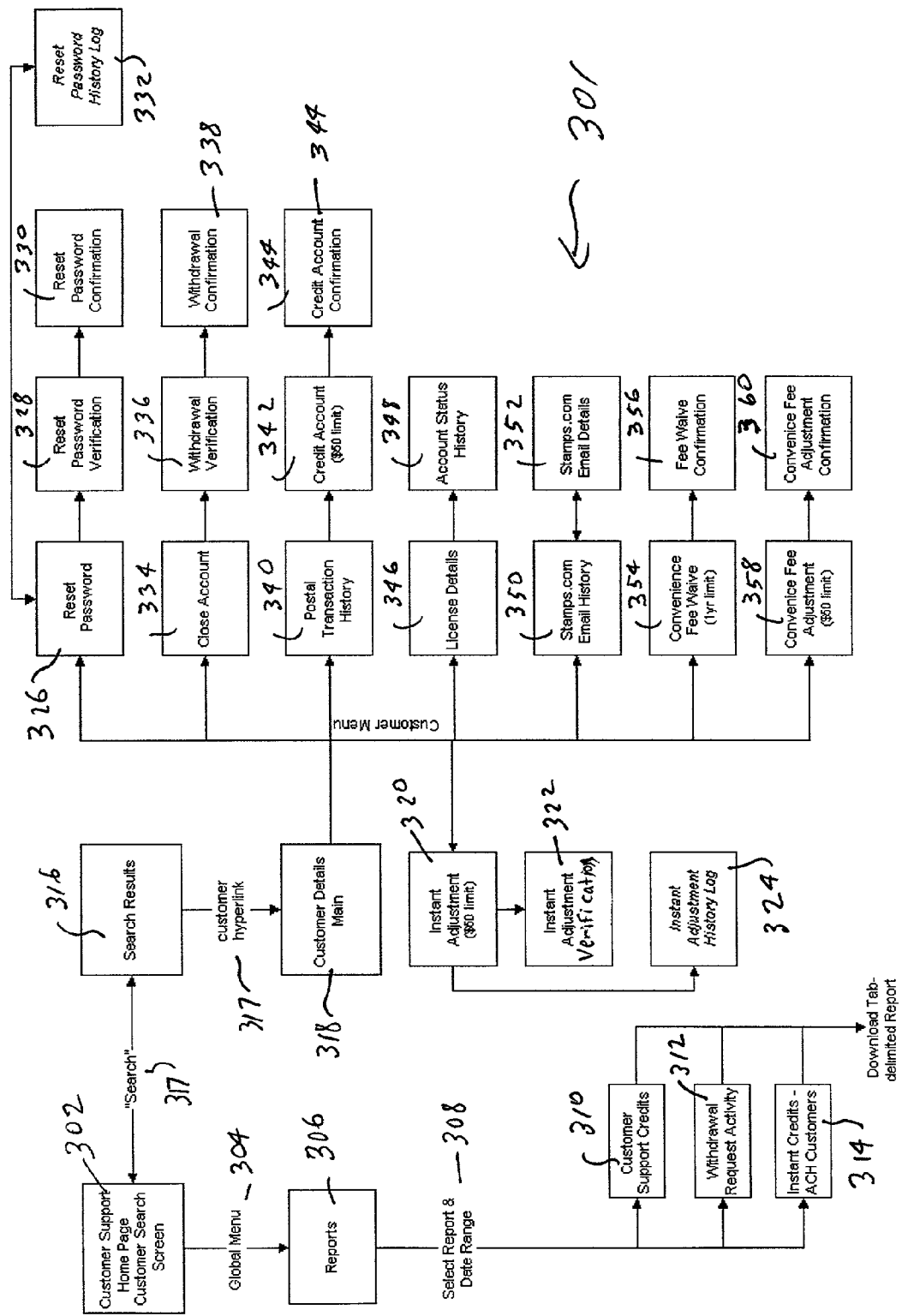

Instant Adjustment Verification

Please confirm that the following information is correct. If any information is incorrect, click <CANCEL> or the <Back> button on your browser to correct.

| | |
|---|---|
| Amount Given to Customer | $15.00 |
| Reason | Overcharge of convenience fees |
| Comments | Verified with AR |

[Submit] [Cancel]

Instant Adjustment History Log

| Date | Claim # | Amount | CSR Name |
|---|---|---|---|
| 06/15/1999 | 123456 | $1.33 | Joe Smith |
| 06/30/1999 | 234567 | $10.25 | Jane Doe |
| 07/02/1999 | 345678 | $5.50 | Jim Brown |

| Reset Password History Log | | | |
|---|---|---|---|
| Date | Method of Reset | Attempts Needed | CSR Name |
| 06/15/1999 | Phone | 2 | Joe Smith |
| 06/30/1999 | Email | 1 | Jane Doe |
| 07/02/1999 | Client | 1 | |

| Last Name | | First Name | | Middle Name | |
|---|---|---|---|---|---|
| User Name | | User ID | | Meter # | |
| Email | | | | | |

Withdraw Meter

Provide the following information to withdraw the meter. If the customer can access the withdrawal feature in their software, they *MUST* initiate withdrawal there.

What is your (mother's maiden name)? [____]

What are the last 4 digits of your (Employee Identification Number)? [____]

Why are you cancelling your Stamps.com service? [Select one ▼]

What product/service will you now use for your postage needs? [Select ▼]

Mail the refund to this Mailing Address

Address [2900 31st St.]

City [Santa Monica] State [CA] Zip Code [90405]

[OK] [Cancel]

Withdrawal Verification

Do you really want to withdraw <John Doe>'s account and send the refund to:

<1234 Main Street
Santa Monica, CA 90405>?

[Yes] [No]

Reports

○ Customer Support Credits

○ Withdrawal Request Activity

○ Instant Credits ACH Customers

Start Date: [Month] [Date] [Year]

End Date: [Month] [Date] [Year]

[Run Report]

| Customer Support Credits | | | | | | |
|---|---|---|---|---|---|---|
| Date | Customer ID | Customer Name | CSR Name | Reason | Comment | Amount |
| | | | | | | Total |

FIG. 27A

| Withdrawal Requests Report | | | | | | |
|---|---|---|---|---|---|---|
| Date | Meter # | Customer ID | Customer Name | Phone | Refund Amount | Reason | Manager Name |
| | | | | | | | Person who initiated |
| | | Count | | | Total | | |

FIG. 27B

| ACH Credits | | | | | | |
|---|---|---|---|---|---|---|
| Date | Customer ID | Customer Name | CSR Name | Reason | Comment | Amount |
| | Count | | | | | Total |

FIG. 27C

| Last Name | | First Name | | Middle Name | |
|---|---|---|---|---|---|
| User Name | | User ID | | Meter # | |
| Email | | | | | |

Withdraw Meter

Provide the following information to withdraw the meter.

Please enter a reason for withdrawal

What product/service will the customer now use for their postage needs?
[Select]

Mail the refund to this Mailing Address

Address: 2900 31st St.
City: Santa Monica   State: CA   Zip Code: 90405

[OK] [Cancel]

Meter Withdrawal Verification

Please confirm that the following information. If any information is incorrect, click <CANCEL> or the <Back> button on your browser to correct.

Reason for Withdrawal   Service does not work.

Product/ Service Customer will now use   None

Refund Address   2900 31st Street
Santa Monica, CA
90405

[Submit] [Cancel]

Hold Account Verification

Review the information below. If everything is correct, click <Process>. If there are any errors, click <Back> and correct them.

| | |
|---|---|
| Account # | 300123 |
| Reason for Suspension | QA Envelope Not Received |
| Comments | QA Envelope 20 days late. |

[Process]  [<<Back]

Acitvate an Account

Select a reason to activate the account and click the <Submit> button. To select multiple reasons, use the <CNTRL> or <SHIFT> key.

Status: Account Hold - No QA Envelope
Account Hold - Payment Problem
Account Hold - Admistrative Problem

Comments: John Doe 6/16/99 - The QA Envelope is 20 days over due.
Jane Doe 6/17/99 - Convenience Fee payment was declined by credit card.
John Doe: 6/19/99 - Suspected Fraud

Reason for Activation: QA Envelope Passed
- Postage Purchase Approved
- Payment Problem Resolved
- Postage License Application Received
- Postage License Reinstated
- Administrative Problem Resolved

Comments:

[Submit] [Cancel]

Activate an Account Verification

Review the information below. If everything is correct, click <Process>. If there are any errors, click <Back> and correct them.

| | |
|---|---|
| Account # | 300123 |
| Status | Account Hold - No QA Envelope<br>Account Hold - Payment Problem<br>Account Hold - Admistrative Problem |
| Reason for Activation | QA Envelope Passeed<br>Adminsitrative Problem Resolved<br>Payment Problem Resolved |
| Comments | QA Envelope passed scan.<br><br>Suspected fraud turned out to be another family member who did not know the password.<br><br>Credit Card company honored the payment. |

[Process] [<<Back]

File Transfer Status Monitor — 584

September 9, 1999     Current Time: 08:50:09

CMLS    585C    585B    585A

| Scheduled Time | Status Date | Time | Upload/Download | Status | File ID | File Type |
|---|---|---|---|---|---|---|
| 06:30 | 09/09/1999 | 06:31 | Upload | Sent OK | 345909099 | License Applications |
| 06:50 | 09/09/1999 | 06:51 | Download | Retrieved OK | 345909099 | Acknowledgement |
| 08:40 | 09/09/1999 | 11:33 | Download | Retrieved OK | 345909099 | License Approvals |
| 08:30 | 09/09/1999 | 08:31 | Upload | Sent OK | 345909100 | License Applications |
| 08:50 | 09/09/1999 | 08:50 | Download | In Process | 345909100 | Acknowledgement |
| 10:40 | | | Download | Not Processed | 345909100 | License Approvals |
| 10:30 | | | Upload | Not Processed | 345909101 | License Applications |
| 10:50 | | | Download | Not Processed | 345909101 | Acknowledgement |
| 12:40 | | | Download | Not Processed | 345909101 | License Approvals |
| 12:30 | | | Upload | Not Processed | 345909102 | License Applications |
| 12:50 | | | Download | Not Processed | 345909102 | Acknowledgement |
| 14:40 | | | Download | Not Processed | 345909102 | License Approvals |
| 14:30 | | | Upload | Not Processed | 345909103 | License Applications |
| 14:50 | | | Download | Not Processed | 345909103 | Acknowledgement |
| 16:40 | | | Download | Not Processed | 345909103 | License Approvals |
| 16:30 | | | Upload | Not Processed | 345909104 | License Applications |

CMRS

| Scheduled Time | Status Date | Time | Upload/Download | Status | File ID | File Type |
|---|---|---|---|---|---|---|
| 08:47 | 09/09/1999 | 08:50 | Upload | In Process | 8949594 | Meter Resetting File |
| 08:46 | 09/09/1999 | 08:50 | Upload | Line Busy - Retry #1 | 855940563 | Address Movement File |
| 08:44 | 09/09/1999 | 08:50 | Upload | ERROR - File Upload | 58940300a | License Movement File |

Citibank ACH

| Scheduled Time | Status Date | Time | Upload/Download | Status | File ID | File Type |
|---|---|---|---|---|---|---|
| 16:15 | | | Upload | Not Processed | 0909995050500 | ACH Transfers |
| 16:20 | | | Download | Not Processed | 0909995050500 | Acknowledgment |
| 08:00 | 09/09/1999 | 08.02 | Download | No Files | | Returns File |
| 10:30 | | | Download | Not Processed | | Returns File |
| 14:00 | | | Download | Not Processed | | Returns File |
| 11:30 | | | Upload | Not Processed | 5x95 | Password File |

Citibank ACH

| Scheduled Time | Status Date | Time | Upload/Download | Status | File ID | File Type |
|---|---|---|---|---|---|---|
| 16:15 | | | Upload | Not Processed | 0909995050500 | ACH Transfers |
| 16:20 | | | Download | Not Processed | 0909995050500 | Acknowledgment |
| 08:00 | | | Download | Not Processed | 09099950 | Returns File |

FIG. 34A

| Status | Definition |
|---|---|
| Normal Process | |
| Not Processed | The file has not been created yet. |
| In Progress | File transfer is in process |
| Sent OK | File upload is complete |
| Retrieved OK | File download is complete |
| No Files | No files found during check (ACH only) |
| Delays | |
| File Missing - Retry #n (n = 1-3) | Download file not found during initial check, will retry up to 3 times |
| Line Busy - Retry #n (n = 1-3) | Encountered a busy signal on the first attempt, will retry up to 3 times |
| Errors | |
| Cannot Connect! | The line picked-up but could not establish a connection. |
| Cannot Find Files! | Download file not located after the third attempt. |
| Line Busy! | All retry attempts encountered a busy signal. |
| Transfer Incomplete! | File transfer was aborted while upload/download in process. |
| No Dial Tone! | There is no dial tone from the modem. |

FIG. 34B

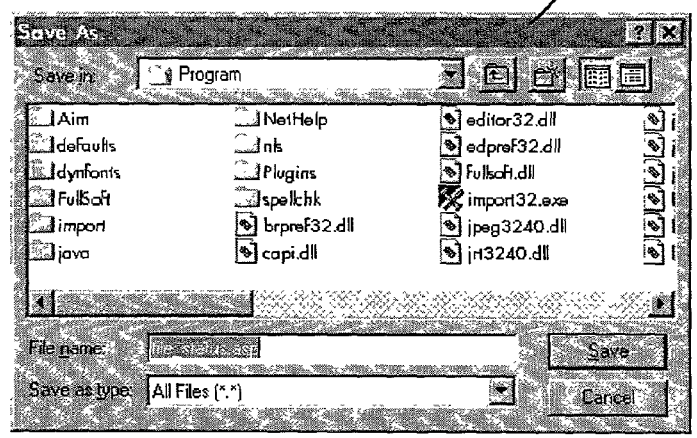

FIG. 34C

File Archive Search

590 —

Scheduled Date

Scheduled Time

File ID

File Status
--ALL--

File Type
--ALL--

Search

File Search Results

| Date/Time | File ID | Status | File Type |
|---|---|---|---|
| 06/16/1999 07:30 AM | 1234567 | Processed | License Notification |
| 06/16/1999 09:30 AM | 1234568 | Sent OK | License Applications |
| 06/16/1999 11:30 AM | 1234569 | Processed | Acknowledgment |
| 06/16/1999 01:30 PM | 1234570 | Processed | Update Notification |
| 06/16/1999 03:30 PM | 1234571 | Sent OK | License Updates |
| 06/16/1999 05:30 PM | 1234572 | Processed | License Notification |
| 06/16/1999 07:30 PM | 1234573 | Processed | Acknowledgment |
| 06/16/1999 09:30 PM | 1234574 | Processed | License Notification |
| 06/16/1999 11:30 PM | 1234575 | Sent OK | License Applications |
| 06/17/1999 01:30 AM | 1234576 | Sent OK | License Applications |

FIG. 34E

QA Envelope Entry

Please Enter QA Envelope Information.

Postmark Date [ ]
(Enter 00 if envelope not received)

Status [00 Passed ▼]

01 Not Passed, bad indicia
02 Indicia scanned, but misprinted
03 FIM Error
04 Address Error
05 Postnet Barcdode Error
06 Damaged Envelope, not scannable, looks OK

[Submit]

Upload the QA Envelope Log

Enter the file location

[　　　　　　　　] [Browse]

[OK] [Cancel]

| License Summary | | | | |
|---|---|---|---|---|
| Customer ID | Customer Name | Meter Number | License Number | Date Granted |
| | | | | |

| Historical Summary | | | | | | | |
|---|---|---|---|---|---|---|---|
| Customer ID | Customer Name | Meter Number | Date Rejected | Reason | Current License (Y/N) | Date Granted | License Number |
| | | | | | | | |

| Customer Collateral / QA Envelope | | | | | |
|---|---|---|---|---|---|
| Customer ID | Meter Number | Item Scanned | Date Received | Status Code | Status Description |
| | | Beta paperwork, 3601A hardcopy, QA enveloper | | | |

| Application Rejection | | | | | |
|---|---|---|---|---|---|
| Customer ID | Meter Number | Problem Type | Error Code | Error Code Explanation | Application ID# |
| | | Basic integrity check, edit check, application format check | | | |
| Count | | | | | |

| Withdrawn Meters Report | | | | | | | |
|---|---|---|---|---|---|---|---|
| Date of Request | Meter # | Customer ID | Customer Name | Phone | Refund Amount | Pending Transaction ID # | Manager Name |
| Withdrawn Meters | | | | | | | |
| | | | | | | N/A | Person who initiated (if applicable) |
| | | Count | | | Total | | |
| Meters that could not be Withdrawn | | | | | | | |
| | | | | | | | |
| | | Count | | | Total | | |

```
ACH Transaction Rejections and Returns
Enter the Transaction ID # and Process Date Transaction ID #        [                              ]

Process/ Effective Date [            ]

Select a Code

NACHA CODE              [ R01 - Return for NSF      ▼]

[ Submit ]  [ Cancel ]
```

NACHA Return and Rejection Codes

| ACH Code | Reason |
| --- | --- |
| R01 | Insufficient Funds |
| R02 | Account Closed |
| R03 | No Account/Unable to Locate Account |
| R04 | Invalid Account Number |
| R05 | Reserved |
| R06 | Returned per ODFI's Request |
| R07 | Authorization Revoked by Customer (adjustment entries)- |
| R08 | Payment Stopped |
| R09 | Uncollected Funds |
| R10 | Customer Advises Not Authorized (adjustment entries) |
| R11 | Check Truncation Entry Return (Specify) |
| R12 | Branch Sold to Another DFI |
| R13 | RDFI Not Qualified to Participate/ Routing Number not Valid |
| R14 | Account-holder Deceased (Representative Payee Deceased or Unable to Continue in that Capacity) |
| R15 | Beneficiary Deceased |
| R16 | Account Frozen |
| R17 | File Record Edit Criteria (Specify) |
| R18 | Improper Effective Entry Date |
| R19 | Amount Field Error |
| R20 | Non-Transaction Account |
| R21 | Invalid Company identification |
| R22 | Invalid Individual ID Number |

FIG. 38D

| | |
|---|---|
| R23 | Credit Entry Refused by Receiver |
| R24 | Duplicate Entry |
| R25 | Addenda Error |
| R26 | Mandatory field Error |
| R27 | Trace Number Error |
| R28 | Routing Number Check Digit Error |
| R29 | Corporate Customer Address Not Authorized |
| R30 | RDFI Not Participant in Check Truncation Program |
| R31 | Permissible Return Entry (CCD and CTX only) |
| R32 | RDFI Non-Settlement |
| R33 | Return of XCK Entry |
| R34 | Limited Participation DFI |
| R35 | Return of Improper Debit Entry |
| R40 | Non-Participant in ENR Program (ENR only) [Return of ENR Entry by Federal Government Agency (ENR Only)] |
| R41 | Invalid Transaction Code (ENR only) |
| R42 | Routing Number/Check Digit Error (ENR only) |
| R43 | Invalid DFI Account Number (ENR only) |
| R44 | Invalid Individual ID Number (ENR only) [Invalid Individual ID Number/Identification Number (ENR only)] |
| R45 | Invalid Individual Name (ENR only) [Invalid Individual Name./Company Name (ENR only)] |
| R46 | Invalid Representative Payee Indicator (ENR only) |
| R47 | Duplicate Enrollment (ENR Only) |
| C01 | Incorrect DFI Account Number |
| C02 | Incorrect Routing Number |
| C03 | Incorrect Routing Number and Incorrect DFI Account Number |
| C04 | Incorrect Individual Name/ Receiving Company Name |
| C05 | Incorrect Transaction Code |
| C06 | Incorrect DFI Account Number and Incorrect Transaction Code |
| C07 | Incorrect Routing Number, Incorrect DFI Account Number, and Incorrect Transaction Code |
| C08 | Reserved |
| C09 | Incorrect Individual Identification Number |
| C10 | Incorrect Company Name |
| C11 | Incorrect Company Identification |
| C12 | Incorrect Company Name and Incorrect Company Identification |
| C13 | Addenda Format Error |

FIG. 38D (continued)

ACH Transaction Verification

Please confirm that the following information appears on the fax. If *any* information is incorrect, click <CANCEL> or the <Back> button on your browser to correct.

| | |
|---|---|
| Name on Account | John Doe |
| Transaction Amount | 100.25 |
| Process Date | 06/16/1999 |
| NACHA CODE | R-01 - Return |

Please re-enter the Transaction ID # and submit

Transaction ID #

[Submit] [Cancel]

FIG. 38E

ACH Payment Rejected/Returned Report

| Meter Number | Customer ID | Transaction ID | Request Date | Type | Amount |
|---|---|---|---|---|---|
| | | | | reject/return | |
| | | Count | | | Total |

FIG. 39A

ACH Transfer Breakdown Report

| Meter Number | Customer ID | Transaction ID | Request Date | Amount |
|---|---|---|---|---|
| Free Postage Transfers | | | | |
| | | | | |
| | | Count | | Total |
| Merchant Postage Transfers | | | | |
| | | | | |
| | | Count | | Total |
| Spoilage and Other Transfers | | | | |
| | | | | |
| | | Count | | Total |

FIG. 39B

| Rejection / Return Summary Report | | | | | | |
|---|---|---|---|---|---|---|
| Meter Number | Customer ID | Transaction ID | Reject Date | Type | Reason | Amount |
| | | | | Reject/Return | | |

| Captured Credit Card Payments | | | | | |
|---|---|---|---|---|---|
| Meter Number | Customer ID | Transaction ID | Request Date | Capture Date | Amount |
| | | | | | |
| | | Count | | Total | |

| Credit Card Payment Rejected/Returned Report | | | | | | |
|---|---|---|---|---|---|---|
| Meter Number | Customer ID | Transaction ID | Request Date | Type | Reason Code | Amount |
| | | | | reject/return | | |
| | | Count | | | Total | |

| Meter Resets Report | | | | | |
|---|---|---|---|---|---|
| Meter Number | Customer ID | Transaction ID | Request Date | Reset Date | Amount |
| | | | | | |
| | | Count | | Total | |

| Activity Date: | date |
|---|---|
| To: | United States Post Office |
| | Ms. Sheryl L. Stone |
| | Accounting Service Center - Finance Branch |
| | 2825 Lone Oak Parkway, Egan MN 55121-9610 |
| Telephone: | 651-406-1103 |
| Fax | 651-406-1259 |
| From: | Stamps.com |
| Name | |
| | *Address* |
| Telephone: | ###-###-#### |
| Fax: | ###-###-#### |

| Ref # | Description | |
|---|---|---|
| 1 | Previous Day Ending Account Balance | |
| 2 | ( + ) EFT Collections From Lockbox Bank | |
| 3 | ( + ) Credit Card Collections | |
| 4 | ( - ) Credit Card Fees | |
| 5 | ( - ) Total Meter Resettings | |
| 6 | ( - ) EFT Reversals | |
| 7 | ( - ) Credit Card Charge Backs | |
| 8 | ( - ) Postage Refunds | |
| 9 | ( + / - ) Miscellaneous Adjustments | |
| 10 | ( - ) Meter Company Funds | |
| 11 | Ending Account Balance | |

FIG. 39G

Stamps.com
Detail for the Daily Bank Activity Reconciliation (DBAR)

Activity Date:

Resubmitted Transactions for Meters Previously Reset but Subsequently Reversed

| Resubmission Date | Meter ID | Amount |
|---|---|---|
|  |  |  |
|  |  |  |
|  |  | $ |

Postage Purchases Processed for License Applications Pending Approval (Resetting to be Reported Upon Approval)

| Process Date | Meter ID | Amount |
|---|---|---|
|  |  |  |
|  |  |  |
| ost |  | $ |

Meter Resettings for Approved License Applications where Postage Purchases had Previously Been Processed

| Reset Date | Meter ID | Amount |
|---|---|---|
|  |  |  |
|  |  |  |
|  | se | $ |
|  | an | $ |

Rejected Transactions

| Effective Date | Meter ID | Amount |
|---|---|---|
|  |  |  |
|  |  |  |
|  | ac | $ |

Returned and Retired Transactions

| Process Date | Meter ID | Amount |
|---|---|---|
|  |  |  |
|  |  |  |
|  |  | $ |
|  |  | $ |

Credit Card Charge Backs

| Process Date | Meter ID | Amount |
|---|---|---|
|  |  |  |
|  |  |  |
|  |  |  |

FIG. 39H

Non-Captured Refund Requests

| Meter Number | Customer ID | Original Transaction ID | Original Transaction Date | Amount | Date Quit |
|---|---|---|---|---|---|
|  |  |  |  |  |  |
|  |  | Count |  | Total |  |

Payment Requests Report

| Meter Number | Customer ID | Transaction ID | Request Date | Type | Amount | Meter Status |
|---|---|---|---|---|---|---|
| | | | | ACH/Visa/MC | | |
| | | Count | | | Total | Status Count |

Account Disputes Resolved

| Meter Number | Customer ID | Transaction ID | Transaction Date | Amount | Date Resolved | Conclusion | Reason |
|---|---|---|---|---|---|---|---|
| | | | | | | | |
| | | Count | | Total | | | |

NOC Report

| Meter Number | Customer ID | Transaction ID | Request Date | Amount | Description |
|---|---|---|---|---|---|
| | | | | | |
| | | Count | | total | |

Transaction Search
Enter a Transaction ID # to search

Transaction ID #  [          ]

[Search] [Cancel]

FIG. 42A

Transaction Search Results

| Transaction ID # | Meter # | Process Date |
|---|---|---|
| 1234567 | 300001 | 06/16/1999 |

FIG. 42B

Transaction Details

| DTR Date | Transaction Date | Transaction ID # | Customer Name | Amount | Status | Code | Process Date |
|---|---|---|---|---|---|---|---|
| 06/18/1999 | 06/18/1999 | 06/18/1999 | John Doe | $100.25 | Returned | R-01 | 06/20/1999 |

Hit the "Submit" button to confirm this transaction reversal.

[Search] [Cancel]

FIG. 42C

Transaction Reversal Verification

Hit the "Submit" button to complete the reversal of this transaction. If this information is incorrect, hit the "Cancel" button.

| Name on Account | John Doe | |
|---|---|---|
| Transaction Amount | 100.25 | |
| Process Date | 06/20/1999 | |
| NACHA CODE | R-01 - Return | |

[Submit] [Cancel]

FIG. 42D

Transaction Search

Enter a Transaction ID # to search

Transaction ID #

| Date | Meter # | Customer ID | Customer Name | Phone | Refund Amount ($) | Reason | Manager Name |
|---|---|---|---|---|---|---|---|
| | | | | | | | Person who initiated |
| | | Count | | | Total ($) | | (if applicable) |

FIG. 58    /234

| Date of Request | Meter # | Customer ID | Customer Name | Phone | Refund Amount | Pending Transaction ID # | Manager Name |
|---|---|---|---|---|---|---|---|
| Withdrawn Meters | | | | | | | |
| | | | | | | N/A | Person who initiated |
| | | Count | | | Total ($) | | (if applicable) |
| Meters that could not be Withdrawn | | | | | | | |
| | | | | | | | |
| | | Count | | | Total ($) | | |

Form PS 3601-C    /270

Postage Meter Activity Report

| Activity (check one) |
|---|
| 1. Installation |
| 2. Replacement |
| 3. Withdrawal |
| Manufacturer Code |
| A. Reason for Meter Activity (check one) |
|     1. New Meter |
|     2. License Revocation |
|     3. Mechanical Failure (Not QAR) |
|     4. Question of Accurate Registration |
|     5. Model Change |
|     6. Fire/Flood |
|     7. Electronic Failure (Not QAR) |
|     8. Change of PO |
|     9. Cancellation |

FIG. 60

B. Licensee Information
  1. Customer Name (as it appears on license certificate)
  2. LPO City, State, and Zip Code
  3. License Number
  4. Manufacture Customer Account Number
  5. Manufacture Reference Only

C. Meter Location
  1. Street Address
  2. City, State, ZIP+4
  3. Contact Person Name
  4. Phone Number
  5. Contact Person's Signature (optional)
  6. Name of Post Office/Classified Branch and State
  7. Zip Code Designation

D. Withdrawn Meter Information
  1. Model Number
  2. Date Withdrawn
  3. Serial Number

Type of Meter (check one)
  4. Decimal (.001)/Non-Decimal (.01)
  5. CMRS
  6. Penalty CMRS
  7. Manual Set
  8. Penalty Manual Set
  9. CMRS Account Number
  10. Fed. Agency Code - Cost Code
  11. Locking Serial Number

Register Readings at Time of Installation (format =ddd.ccc)
  12. Ascending Register
  13. Descending Register
  14. Control Total
  15. MATS Total

E. Installed Meter Information
  1. Model Number
  2. Date of Install

Type of Meter (check one)
  3. Mechanical failure (Not QAR)
  4. Decimal (.001)/Non-Decimal (.01)
  5. CMRS
  6. Penalty CMRS
  7. Manual Set
  8. Penalty Manual Set
  9. CMRS Account Number
  10. Fed. Agency Code - Cost Code
  11. Locking Serial Number

Register Readings at Time of Installation (format =ddd.ccc)
  12. Ascending Register
  13. Descending Register
  14. Control Total
  15. MATS Total

FIG. 60 (continued)

| |
|---|
| F. Refunded/Transferred Postage (format =ddd.ccc) |
| 1. Amount of Refund |
| 2. Amount of Transfer to Installed Meter |
| 3. Amount of Credit to CMRS Account |
| Refund/Transfer was (check one) |
| 4. Issued |
| 5. Not Issued |
| Not Issued Reason (check one) |
| 6. Exceeded Local Limits |
| 7. Not Determined |
| 8. Refund Request Forwarded to USPS Office (City and State) |
| 9. CMRS Account Number |
| 10. CMRS Clear Code |
| 11. Address to Where Refund Check Should be Mailed (if different than the meter location) |
| G. Manufacture's Authorized Representative |
| 1. Telephone Number |
| 2. Dealer/Branch Office Code |
| 3. Date |
| 4. Signature of Manufacture's Authorized Representative |
| H. Postal Service Representative |
| 1. Printed Name |
| 2. Title |
| 3. Signature |
| 4. Finance Number |
| 5. Stamp |

FIG. 60 (continued)

| DATA FORMAT INDICIA VERSION NUMBER | | |
|---|---|---|
| System Type | Indicia Type | Hexadecimal Value |
| Open | Regular | 0x00 |
| | Correction | 0x01 |
| | Redate | Not applicable |
| | Refund | 0x02 |
| Closed | Regular | 0x10 |
| | Correction | 0x11 |
| | Redate | Not applicable |
| | Refund | 0x12 |

FIG. 61

| DATA FORMAT ALGORITHM ID | |
|---|---|
| Algorithm Type | Hexadecimal Value |
| DSA | 0x01 |
| RSA | 0x02 |
| ECDSA | 0x03 |

Instant Adjustment

Instant Adjustment - will be processed immediately

Amount $ [  ] . [  ]          Reason [Select One]

● Credit          Comment [        ]
    ○ Debit

[Submit]

| Date | Customer ID | Customer Name | CSR Name | Reason | Comment | Amount |
|------|-------------|---------------|----------|--------|---------|--------|
|      |             |               |          |        |         | Total  |

CUSTOMER NAME

| Date | Support Rep Name | Reason | Amount Credited |
|------|------------------|--------|-----------------|
|      |                  |        |                 |
|      |                  |        | Total           |

| Error Type | Approach 1 | Approach 2 | Approach 3 |
|---|---|---|---|
| 1. Postal Server Network<br>2. Internet Connection | • CSR logs request as per normal in CRS software<br>• CSR or Payment Administration accesses the server error log on a daily basis (log contains only error and time of error) using a printout only<br>• CSR manually scans log to verify request and failure, and match time of error<br>• If request is verified, CSR updates record through CS interface. This causes automatic e-mail to notify customer of credit. This interface records reason of credit, and is free-flow. Does not explicitly credit the print transaction.<br>• If request is not verified, refer to Misprints Policy (CSR can override)<br>• If customer calls back, CSR can override with credit. | • CSR has real-time access to the server error log. Log is parsed and generated based on meter # and customer ID<br>• The log can be queried by date and/or by customer ID and/or by meter ID and/or by error type<br>• Verifiable requests can be approved instantly<br>• Non-verifiable requests are at CSR's discretion<br>• Credits can be made directly to meter, rather than service account | • Same as approach 2 except CSR also has access to the customer's profitability score (an A, B, C score based on metrics such as pricing plan, any fees paid, customer service usage, etc.)<br>• For non-verifiable requests, A's are automatically granted refunds<br>• B's and C's are handled at CSR's discretion |
| 3. Customer's hardware/ client software | • CSR logs request as per normal in CRS software<br>• Client mails misprint, if available<br>• CSR validates receipt and updates customer record<br>• If error can't be verified, refer to Misprints Policy<br>• CSR can override this at their discretion | • CSR has real-time access to a client error log (similar to server error log). Client log is maintained on server, and is updated on each print<br>• The log can be queried by date and/or by customer ID or Meter ID and/or by error type<br>• Verifiable misprints can be approved instantly<br>• Non-verifiable requests are at CSR's discretion<br>• Credits can be made directly to meter, rather than service account | Same as Postal Server Network / Internet Connection |
| 4. Printer Connection<br>5. Printer | • CSR logs request as per normal in CRS software<br>• Client mails misprint, if available<br>• CSR validates receipt and updates customer record<br>• If no misprint available, refer to Misprints Policy<br>• CSR can override this, at their discretion | • CSR has near real-time access to the customer's request/refund history (shows date/time of request, error type, amount, if it was granted, and reason)<br>• Based on results, CSR can automatically grant or deny the request<br>• If the request seems questionable, CSR can still ask for misprint to verify<br>• Credits can be made directly to meter, rather than service account | • CSR has real-time access to the customer's request/refund report as well as the customer's profitability score (an A, B, C score based on metrics such as pricing plan, any fees paid, customer service usage, etc.)<br>• A's are automatically granted refunds for Reimbursement Postage<br>• B's and C's are handled at CSR's discretion |

FIG. 70

| Code | Envelope State | Description | Server Action |
|---|---|---|---|
| 00 | No 2$^{nd}$ Scan | Passed, no problems | Log Date - No status change |
| 01 | Not Passed | Other, requires manual entry | Suspend Customer |
| 02 | Not Passed | Indicia Scanned but Misprinted | Suspend Customer |
| 03 | Not Passed | FIM Error | Suspend Customer |
| 04 | Not Passed | Address Error | Request Customer send another envelope, reset expected time to 20 days |
| 05 | Not Passed | Postnet Barcode Error | Request Customer send another envelope, reset expected time to 20 days |
| 06 | Not Passed | Damaged Envelope, not scannable, but looks fine | Request Customer send another envelope, reset expected time to 20 days |

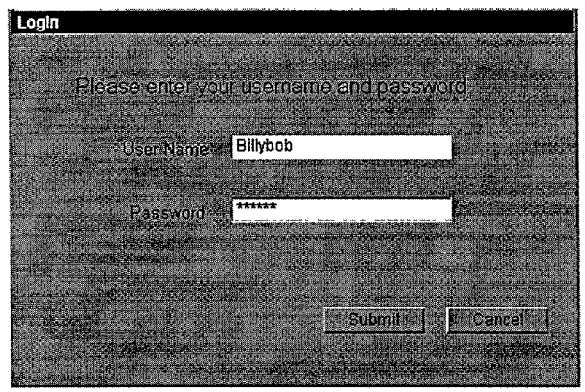

| Meter Event | Status Date & Time | Event Log Comment | Description |
|---|---|---|---|
| Meter Assigned | Date of Registration | | Meter assigned to a customer without a license |
| Meter Leased | Date of License Approval | | Meter assigned to a customer with a license |
| Meter Suspended | Suspension Date | Reasons:<br>• Forms not received<br>• QA Envelope not received<br>• QA Envelope not passed<br>• Fees not paid<br>• Administrative hold<br>• Suspected fraud | Meter Administrators can suspend and unsuspend meters for these reasons |
| Meter Withdrawal Requested | Request Date | Source:<br>• User<br>• Customer Support | User has requested meter be terminated |
| Meter Withdrawn | Withdrawal Date | | User request that meter be terminated has completed |
| Meter Suspended | Date of Suspension | Comment: reason for suspension | Meter has been suspended by USPS |
| Meter Revoked | Date of Revocation | Comment: reason for revocation | License has been revoked by USPS |

| PaymentStatus | Status Date & Time | Payment Status Comment | Description |
|---|---|---|---|
| Requested | Date of request | | |
| Pending | Date of submission to Citibank or credit card processor | Bank payment sent to | |
| Returned | Date of return notification | Citibank fax ID# or CC code | Bad Account # or NSF |
| Rejected | Date of rejection notification | Citibank fax ID# or CC code | Bad ABA # for ACH, authorization rejection or capture rejection for credit cards |
| Approved | Date of approval | NOC if applicable | ACH approval after ACH wait period |
| Authorized | Date of authorization | Approval code (CC only) | Credit card approval |
| Captured | Date of capture | | Credit card value has been captured |

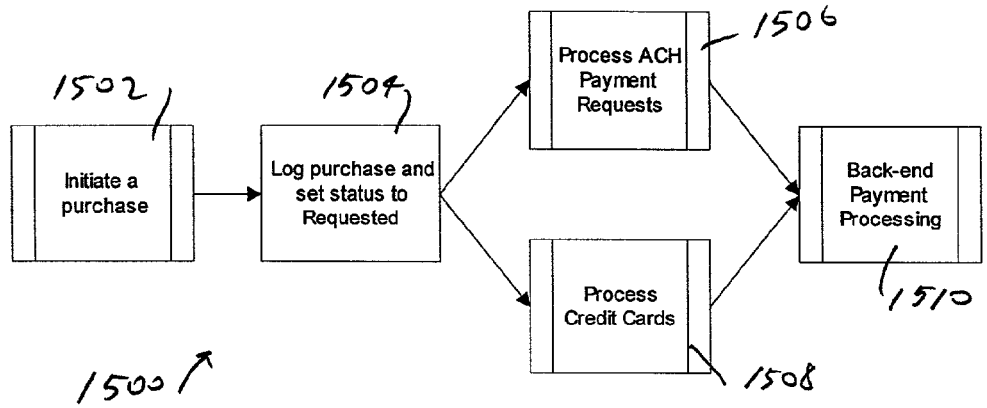
FIG. 78
| Card | Length | Begins With |
|---|---|---|
| VISA | 13 or 16 | 4 |
| MasterCard | 16 | 51-55 |
| American Express | 15 | 37, 34 |
| Diners Club | 14 | 30, 36, 38X |
| Carte Blanche | 14 | 389 |
| Discover/Novus | 16 | 6011 |
| JCB | 16 | 352800-358999 |
| JAL | 15 | 1800, 2131 |
FIG. 79
| Card number | 5 | 0 | 0 | 1 | 2 | 3 | 4 | 5 | 6 | 9 | 8 | 9 |
|---|---|---|---|---|---|---|---|---|---|---|---|---|
| Weight | 2 | 1 | 2 | 1 | 2 | 1 | 2 | 1 | 2 | 1 | 2 | 1 |
| Interim result | 10 | 0 | 0 | 1 | 4 | 3 | 8 | 5 | 12 | 9 | 16 | 9 |
| Digit sum | 1+0+0+0+1+4+3+8+5+1+2+9+1+6+9= 50 ||||||||||||
| MOD10 check | 50/10 = 5, Check Digit Is Valid ||||||||||||
FIG. 80
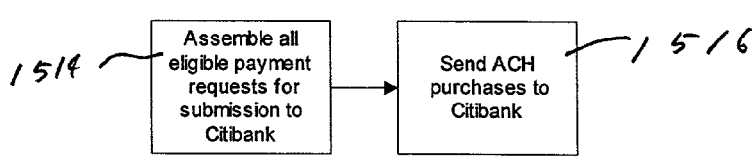
FIG. 81

| Field | Description | Type |
|---|---|---|
| Plan Number | Number used to track each plan | Number |
| Plan Name | Name presented to the customer | String |
| SKU Number | Internal stock keeping unit number. Refer to SKU Numbering requirements document | 32-bit Integer |
| Description Text | Text of plan description sent to client | String |
| Description URL | URL for additional pricing plan description text sent to the client | String |
| Contract Text | Text of plan contract sent to client. While this is defined on a per plan basis, only the text from Plan #1 is used for all plans | String |
| Plan Category | Information on grouping the pricing plans together | String |
| Minimum Purchase | Minimum amount which customers are allowed to reset into their meters at one time | $ |
| Maximum Purchase | Maximum sum of new purchases, pending purchases, and meter contents | $ |
| Annual Fee | Prepaid fee for year of use | $ |
| Monthly Base Usage | Total dollar amount of postage that customers can print in each month for the Monthly Base Fee | $ |
| Monthly Base Fee | Charge this minimum amount every month | $ |
| Charge per Print | Charge this amount for all postage printed that exceeds the Monthly Base Usage | % |
| Monthly Fee Cap | Maximum amount that can be charged per month | $ |
| Free Postage | Reset the meter with the given amount (paid for out of the Stamps.com account) after the customer is given a license and has purchased postage | $ |
| Free Starter Kit | Customer receives starter kit (labels, etc.) after receiving a license | Y/N |
| Store Discount | Associated discount at the Stamps.com store | % |
| No billing if quitting within first billing cycle | Customer is not billed if they quit within the first billing cycle after registration.<br>Y = Do not bill the customer<br>N = Bill the customer<br>This applies only to the first billing cycle. After the first billing cycle, use the process detailed in Error! Reference source not found. | |
| Display Plan to User | Display/hide plan on the client. The plan that the customer is currently billed under should also be displayed on the client even if this flag is "N" for that plan | Y/N |
| Offer Valid Start Date | Customer is able to sign up for the plan beginning on this date | Date |
| Offer Valid End Date | Customer can no longer sign up for the plan after this date | Date |
| Purchase Required | Postage purchase required during registration | Y/N |
| Preferred Type | Billing plans are normally displayed in the client in the order that they are listed in the database. Place the preferred billing plan at the top of the selection list in the client | Y/N |

FIG. 85

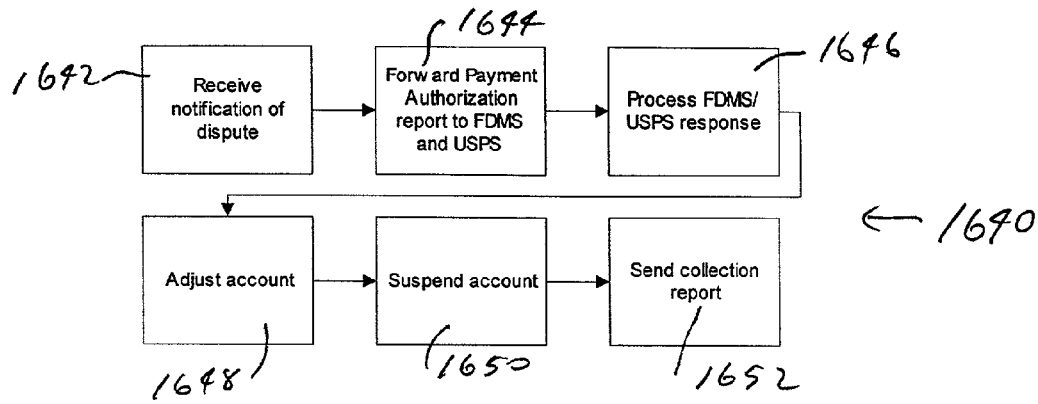

FIG. 89

DTR/DBAR Fax
PC POSTAGE

ACCOUNT BALANCE

Activity Date: *MM/DD/YY*

| | | | |
|---|---|---|---|
| To: | United States Postal Service<br>Ms. Sheryl L. Stone<br>Administrator<br>Accounting Service Center – Finance Branch<br>Boulevard<br>2825 Lone Oak Pkwy<br>Eagan, MN 55121-9610 | From: | Stamps.com<br>Payment Processing<br>3420 Ocean Park<br>Suite 1040<br>Santa Monica, CA 90405 |
| Telephone: | (651) 406-1103 | Telephone: | (310) 581-7200 |
| Facsimile: | (651) 406-1259 | Fax: | (310) 314-8533 |

| Ref # | Description | Amount ($) |
|---|---|---|
| 1 | Previous Day Ending Account Balance | $ 0.00 |
| 2 | ( + ) ACH Debt Collections From Lockbox Bank | $ 0.00 |
| 3 | ( + ) Credit Card Collections | $ 0.00 |
| 4 | ( - ) Total Meter Resettings | $ 0.00 |
| 5 | ( - ) ACH Debit Reversals | $ 0.00 |
| 6 | ( - ) Credit Card Charge Backs | $ 0.00 |
| 7 | (+ / - ) Miscellaneous Adjustments | $ 0.00 |
| 8 | Ending Account Balance | $ 0.00 |

_____    _____
Signature                 Date

FIG. 90

Stamps.com
Detail of Reconciling Items on the DBAR

Activity Date _____

Resubmitted Transactions for Meters Previously Reset but Subsequently Reversed

| Resubmission Date | Meter ID | Amount |
|---|---|---|

Net Difference Between EFT Collections and Meter Resettings    $    -

Rejected Transactions

| Effective Date | Meter ID | Amount |
|---|---|---|

Total Rejected Transactions    $    -

Returned and Retired Transactions

| Process Date | Meter ID | Amount |
|---|---|---|

Total Returned and Retired Transactions    $    -

Total ACH Reversals    $    -

Credit Card Charge Backs

| Process Date | Meter ID | Amount |
|---|---|---|

Total Credit Card Charge Backs    $    -

| Line Item Ref | Term | Definition |
|---|---|---|
| 1 | Previous Day Ending Account Balance | Total amount of customer deposits within CMRS database. Set amount to zero ($0.00) since customers do not have the option of depositing funds with the USPS |
| 2 | ACH Debit Collections from Lockbox Bank | Total amount of ACH debit file. Total of all ACH postage transactions submitted for processing during the 24-hour reporting cycle, including customer purchases, free postage, credits, etc. (if applicable) |
| 3 | Credit Card Collections | Total amount of credit card transaction processed for day. Total of all credit card postage transactions submitted for processing during the 24-hour reporting cycle, including customer purchases, free postage, credits, etc. (if applicable). This applies to both Merchant and Agent Models |
| 4 | Total Meter Resettings | Total amount of funds reset on customer meters. Total amount added to customers' accounts during the 24-hour reporting cycle |
| 5 | ACH Debit Reversals | Total amount of funds removed from customer's account as a result of a returned ACH transaction. (Details should be provided on a separate sheet). Individual postage purchase transactions that were rejected by the ACH processor should be listed in a section labeled "Rejected Transactions" on the attached schedule (see "DBAR Detailed Schedule"), including the effective date that the transaction was originally submitted, the device identification number, and the amount. Individual postage purchase transactions that were returned and retired should be listed in a section labeled "Returned and Retired Transactions" on the attached schedule (see "DBAR Detailed Schedule"), including the date the returned transaction was processed by Stamps.com, the device identification number, and the amount. The "Total ACH Reversals" should be derived from the subtotals of "Rejected Transactions" and "Returned and Retired Transactions" and included on the attached schedule (see "DBAR Detailed Schedule") |
| 6 | Credit Card Charge Backs | Total amount of fatal credit card transactions. Individual credit card postage purchase transactions that were subsequently identified as being returned as a charge back should be listed in a section labeled "Credit Card Charge Backs" on the attached schedule (see "DBAR Detailed Schedule"), including the date that the transaction was processed by Stamps.com, the device identification number, and the amount |
| 7 | Miscellaneous Adjustments | Total amount of adjustments made to DDA not in any of the above categories. Based on the current design of the postal system, this line item should not apply to Stamps.com |
| 8 | Ending Account Balance | Amount should be zero since we do not give customers the option of depositing funds with the USPS |

POSTAL SYSTEM INTRANET AND COMMERCE PROCESSING FOR ON-LINE VALUE BEARING SYSTEM

CROSS-REFERENCE TO RELATED APPLICATIONS

This patent application claims the benefit and the filing date of U.S. Provisional Patent Application Ser. Nos. 60/154,523, filed Oct. 19, 1999 and entitled "USER ADMINISTRATION FOR ON-LINE POSTAGE SYSTEM", 60/160,036, filed Oct. 18, 1999 and entitled "COMMERCE PROCESSING FOR ON-LINE POSTAGE SYSTEMS", 60/160,491, filed Oct. 20, 1999 and entitled "SECURE AND RECOVERABLE DATABASE FOR ON-LINE POSTAGE SYSTEM", 60/160,703, filed Oct. 20, 1999 and entitled "SCALABLE ON-LINE POSTAGE SYSTEM"; 60/160,112, filed Oct. 20, 1999 and entitled "INTERNET POSTAL METERING SYSTEM"; 60/160,563, filed Oct. 20, 1999 and entitled "SERVER ARCHITECTURE FOR ON-LINE POSTAGE SYSTEM," the entire contents of which are hereby expressly incorporated by reference.

The present application contains subject matter related to the subject matter in the following commonly assigned copending patent applications: U.S. patent application Ser. Nos. 09/585,025, filed Jun. 1, 2000 and entitled "ONLINE VALUE BEARING ITEM PRINTING", 09/688,451, filed Oct. 16, 2000 and entitled "AUDITING METHOD AND SYSTEM FOR AN ON-LINE VALUE-BEARING ITEM PRINTING SYSTEM", 09/688,452, filed Oct. 16, 2000 and entitled "ROLE ASSIGNMENTS IN A CRYPTOGRAPHIC MODULE FOR SECURE PROCESSING OF VALUE-BEARING ITEMS"; 09/690,456, filed Oct. 16, 2000 and entitled "CRYPTOGRAPHIC MODULE FOR SECURE PROCESSING OF VALUE BEARING ITEMS"; 09/690,066, filed Oct. 16, 2000 and entitled "CRYPTOGRAPHIC MODULE FOR SECURE PROCESSING OF VALUE-BEARING ITEMS"; 09/690,083, filed Oct. 16, 2000 and entitled "CRYPTOGRAPHIC MODULE FOR SECURE PROCESSING OF VALUE-BEARING ITEMS", 09/690,243, filed Oct. 17, 2000 and entitled "METHOD AND APPARATUS FOR ON-LINE VALUE-BEARING ITEM SYSTEM", 09/690,796, filed Oct. 17, 2000 and entitled "SECURE AND RECOVERABLE DATABASE FOR ON-LINE VALUE-BEARING ITEM SYSTEM", 09/692,746, filed Oct. 18, 2000 and entitled "METHOD AND APPARATUS FOR DIGITALLY SIGNING AN ADVERTISEMENT AREA NEXT TO A VALUE-BEARING ITEM", 09/692,829, filed Oct. 18, 2000 and entitled "POSTAL SYSTEM INTRANET AND COMMERCE PROCESSING FOR AN ON-LINE VALUE BEARING SYSTEM", 09/788,069 filed Feb. 16, 2001 and entitled "ON-LINE VALUE-BEARING INDICIUM PRINTING USING DSA", and 10/083,236 filed Feb. 26, 2002 and entitled "SECURED CENTRALIZED PUBLIC KEY INFRASTRUCTURE", and published U.S. Application Nos. 2001/0034716 A1, published on Oct. 25, 2001 entitled "SECURE ON-LINE TICKETING" and 2002/0023057 A1, published on Feb. 21, 2002 and entitled "WEB-ENABLED VALUE BEARING ITEM PRINTING".

FIELD OF THE INVENTION

The present invention relates to secure printing of value-bearing items (VBI) preferably, such as postage, tickets, and coupons. More specifically, the invention relates to administration and commerce processing of users of an on-line postage system for validating and printing value-bearing items indicia in a Wide Area Network (WAN) environment. Although postage printing is used as an example through out this document, those skilled in the art will recognize that any value-bearing item such as tickets, gift certificates, currency, vouchers, checks and the like may be printed instead of postage.

BACKGROUND OF THE INVENTION

A considerable percentage of the United States Postal Service (USPS) revenue is from metered postage. Metered postage is generated by utilizing postage meters that print a special mark, also known as postal indicia, on mail pieces. Generally, printing postage and any VBI can be carried out by using mechanical meters or computer-based systems.

With respect to computer-based postage processing systems, the USPS under the Information-Based Indicia Program (IBIP) has published specifications for IBIP postage meters that identify a special purpose hardware device, known as a Postal Security Device (PSD) that is generally located at a user's site. The PSD, in conjunction with the user's personal computer and printer, functions as the IBIP postage meter. The USPS has published a number of documents describing the PSD specifications, the indicia specifications and other related and relevant information. There are also security standards for printing other types of VBIs, such as coupons, tickets, gift certificates, currency, voucher and the like.

A significant drawback of existing hardware-based systems is that a new PSD must be locally provided to each new user, which involves significant cost. Furthermore, if the additional PSD breaks down, the PSD must be replaced or service calls must be made to the user location. In light of the drawbacks in hardware-based postage metering systems, a software-based system has been developed that does not require specialized hardware for each user. The software-based system meets the IBIP specifications for a PSD, using a centralized server-based implementation of PSDs utilizing one or more cryptographic modules. The system also includes a database for all users' information. The software-based system, in turn, however, has brought about new challenges. These challenges include the need for effective and efficient user administration, commerce processing and management of the relatively large amount of data associated with the Internet Postage. A compelling reason for individuals and business to use Internet postage is for the great convenience it offers. Without robust and largely automated back office procedures, including user administration, commerce processing and database and information management, the advantages of Internet Postage can quickly fade.

Therefore, there is a need for a new method and apparatus for implementation of an IBIP postage meter and other value-bearing items over a WAN that does not require the special purpose hardware device at the user site.

Furthermore, there is a need for a secure and recoverable database in an on-line VBI system that is capable of preventing unauthorized access and handling minor and catastrophic database failures without impacting the integrity of the system.

The software-based system should be able to handle secure communications between users and the database. The software-based system should also be user friendly for the operators of the system as well as for customers, and should provide a postal system Intranet that allows effective process flow and operator interfaces, should provide for meter refunds and service withdrawals, should include misprint processing management, and should provide for quality assurance envelope management.

The software-based system should also be feature rich and enabled to handle a variety of backroom commerce processing operations, such as payment processing, credit card processing, CMRS processing, and billing processing.

SUMMARY OF THE INVENTION

In accordance with the present invention, a secure central database in an on-line VBI system has been designed. The central database includes account balances and other information for all of the on-line value-bearing item system customers and is capable of preventing access by unauthorized users.

A further aspect of the invention is a software-based system and method that is user friendly for the operators of the system as well as for customers, and should provide a postal system Intranet that allows effective process flow and operator interfaces, should provide for meter refunds and service withdrawals, should include misprint processing management, and should provide for quality assurance envelope management.

The software-based system and method should also be feature rich and enabled to handle a variety of backroom commerce processing operations, such as payment processing, credit card processing, CMRS processing, and billing processing.

It is to be understood that the present invention is useful for printing not only postage, but any value bearing items, such as coupons, tickets, gift certificates, currency, voucher and the like.

BRIEF DESCRIPTION OF THE DRAWINGS

The objects, advantages and features of this invention will become more apparent from a consideration of the following detailed description and the drawings, in which:

FIG. 8 is an exemplary customer support header;

FIG. 9 is a screen print of search results;

FIG. 10 is a customer detail screen;

FIG. 12 is a screen print of the password recovery verification;

FIG. 13 is a postage transaction history screen print;

FIG. 14 is an account credit screen print;

FIG. 15 is an account credit verification screen print;

FIG. 16 is a License Detail screen print;

FIG. 17 is an Account Status History screen print;

FIG. 18 is an E-mail History Screen print;

FIG. 19 a screen print of an Account Statement History;

FIG. 20 is an Account Statement Details screen print;

FIG. 21 is a Convenience Fee Waive (or Suspense) screen print;

FIG. 22 is a Fee Waive Verification screen print;

FIG. 23 is a Convenience Fee Adjustment screen print;

FIG. 25 is a screen flow for CSR Managers;

FIGS. 27 and 27A-27C are various reports pages Customer Support Home/Search portion of the Postal System Intranet;

FIGS. 30A-C are various screen prints for MA;

FIGS. 32A-B are screen prints of accounts activated and verified, respectively;

FIGS. 34A-F are various screen prints in the file transfer and download process;

FIGS. 35A-B are QA envelope screens;

FIGS. 36A-E are various report screens in MA;

FIGS. 38C-E are various screen and tables for ACH transaction;

FIGS. 39A-L are various screen prints of reports in the Payment Administration process;

FIGS. 42A-D are various screen prints of the ACH Transaction Reversal process;

FIG. 43 is a system configuration screen print;

FIG. 52 is a screen print of a Withdrawal Request Report;

FIG. 53 is a screen print of a Withdrawn Meters Report;

FIG. 58 is a screen print of a Withdrawal Request Report;

FIG. 59 is a screen print of a Withdrawal Meters Report;

FIG. 60 is a table of the specifications for form PS 3601-C;

FIGS. 61 and 62 is a table of refund indicia data;

FIG. 63 shows the five places involved in the printing chain of events that can cause indicia to misprint or not print at all;

FIGS. 65-67 are screen prints for misprint processing;

FIGS. 68 and 69 are report screen prints for misprint processing;

FIG. 70 is a table listing three approaches to handling misprints.

FIG. 71 is a chart of codes representing various envelope states for QA Envelope Management;

FIG. 73 is a login screen of the Scan Screen flow;

FIGS. 76 and 77 are table of information associated with Commerce Processing;

FIG. 78 is a payment process flow;

FIGS. 79 and 80 are tables of credit card information;

FIG. 81 is a flowchart showing ACH batch processing;

FIG. 85 is a table of pricing plans;

FIG. 89 is a flowchart showing the disputed charge process;

FIG. 90 is a sample DTR/DBAR Fax;

FIG. 91 is a form for details for reconciling items on DBAR;

FIG. 92 is a table of definitions for DBAR for FIG. 90;

DETAILED DESCRIPTION

The unique features of the on-line postage system and method include a postal system intranet which provides for efficient information process flow, meter refund and withdrawal processing, misprint processing, Quality Assurance management, and commerce processing.

An exemplary on-line postage system is described in U.S. patent application Ser. No. 09/163,993 filed Sep. 15, 1998, the contents of which are hereby incorporated by reference. The on-line postage system includes an authentication protocol that operates in conjunction with the USPS. The system utilizes on-line postage system software comprising user code that resides on a client system and controller code that resides on a PSD server system. The on-line postage system allows a client to print a postal indicium at home, at the office, or any other desired place in a secure, convenient, inexpensive and fraud-free manner. The system comprises a user system electronically connected to a PSD server system, which in turn is connected to a USPS system. For purposes of explanation, the USPS is discussed. However, the system and method of the invention could be used with other postal authorities IBIP type of programs and systems.

Figure 1:
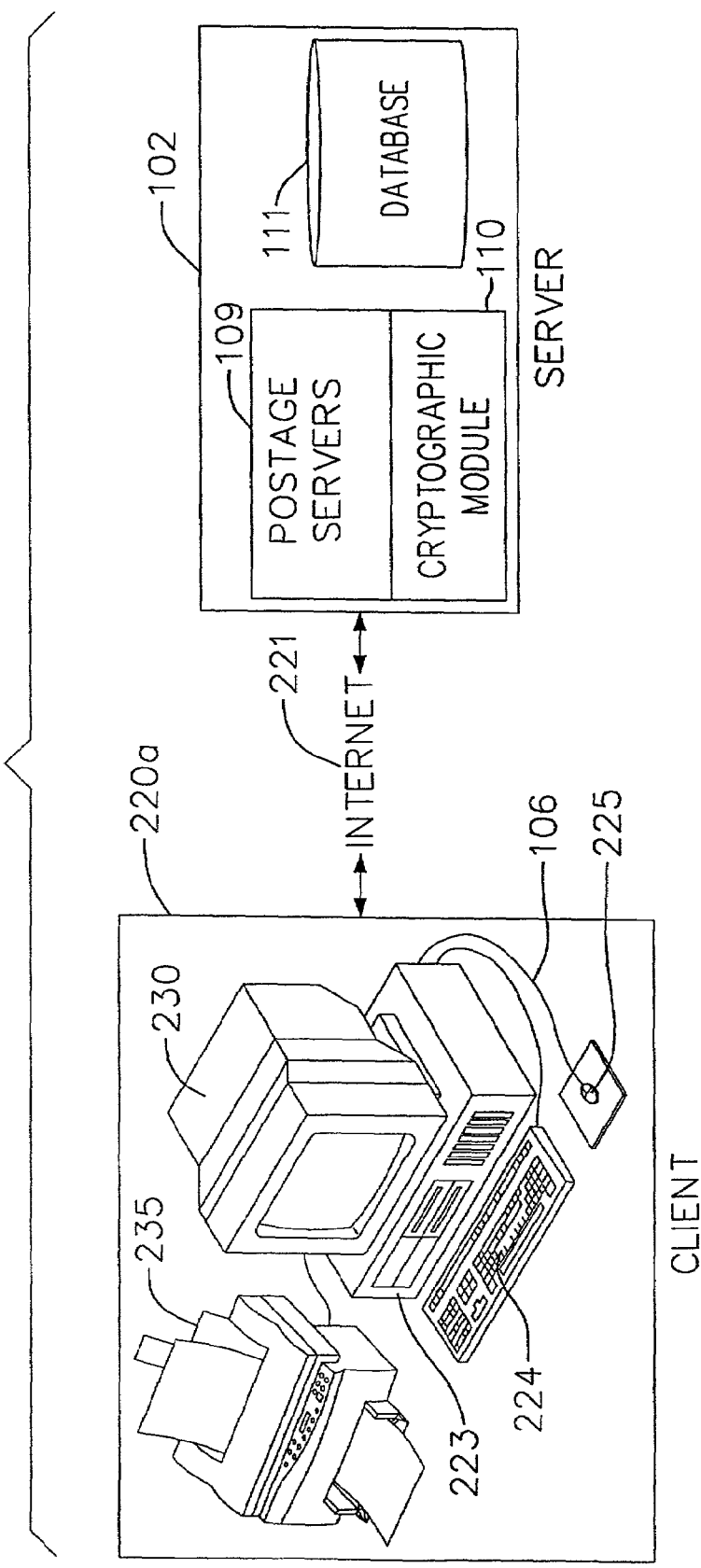
FIG. 1 is a block diagram for the client/server architecture of one embodiment of the invention.

In one embodiment, the server system is remotely located in a separate location from the client. All communications between the client and the server are preferably accomplished via the Internet. FIG. 1 illustrates a remote client system 220a connected to a server system 180 via the Internet 221. The client system includes a processor unit 223, a monitor 230, printer port 106, a mouse 225, a printer 235, and a keyboard 224. Server system 102 includes Postage servers 109, Database 111, and cryptographic modules 110. Postage servers 109 provide indicia creation, account maintenance, and revenue protection functionality for the on-line postage system. The Postage servers 109 include several physical servers in several distinct logical groupings, or services as described below. The individual Postage servers could be located within one facility, or in several facilities, physically separated by great distance but connected by secure communication links.

Cryptographic modules 110 are responsible for creating PSDs and manipulating PSD data to protect sensitive information from disclosure, generating the cryptographic components of the digital indicia, and securely adjusting the customer registers. When a user wishes to print postage or purchase additional postage value, a user state is instantiated in the PSD implemented within one of the cryptographic modules 110. Database 111 includes all the data accessible on-line for indicia creation, account maintenance, and revenue protection processes. Postage servers 109, Database 111, and cryptographic modules 110 are maintained in a physically secured environment; such as a vault.

A client, preferably licensed by the USPS (or some other postal authority) and registered with an IBIP vendor (such as Stamps.com), sends a request for authorization to print a desired amount of postage. The PSD server verifies that the client's account holds sufficient funds to cover the requested amount of postage, and if so, grants the request. The server then sends authorization to the client system. The client system then sends image information for printing of a postal indicium for the granted amount to a printer so that the postal indicium is printed on an envelope or label.

When a client system sends a postage print request to the PSD server, the request must be authenticated before the client system is allowed to print the postage, and while the postage is being printed. The client system sends a password (or passphrase) entered by a user to the PSD server for verification. Also, the PSD server system communicates with a system located at the USPS for verification and authentication purposes. The information processing components of the on-line postage system include a client system, a postage server system located in a highly secure facility, a USPS system and the Internet as the communication medium among those systems. The information processing equipment communicates over a secured communication line.

The on-line postage system does not require any special purpose hardware for the client or user system. The client system is implemented in the form of software that can be executed on a user computer (client system) allowing the user computer to function as a virtual postage meter. The server system is capable of communicating with one or more client systems simultaneously.

The on-line postage system is based on a client/server architecture. Generally, in a system based on client/server architecture the server system delivers information to the client system. That is, the client system requests the services of a generally larger computer. A primary reason to set up a client/server network is to allow many clients access to the same applications and files stored on the server system.

The on-line postage system includes the following subsystems: the Database subsystem, the Postal Server subsystem, the Provider Server subsystem, the E-commerce subsystem, the Staging subsystem, the Client Support subsystem, the Decision Support subsystem, the SMTP subsystem, the Address Matching service (AMS) subsystem, the SSL Proxy Server subsystem and the Web Server subsystem. Preferably, the Database, Postal Server, Provider, E-commerce, Client Support Services, SMTP, AMS, SSL Proxy Server, Web Server subsystems, and Staging subsystems reside in the vault while the Decision Support Services reside outside the vault. Postage servers 132 include a string of servers connected to the Internet, for example, through a T1 line, protected by a firewall.

Figure 2:
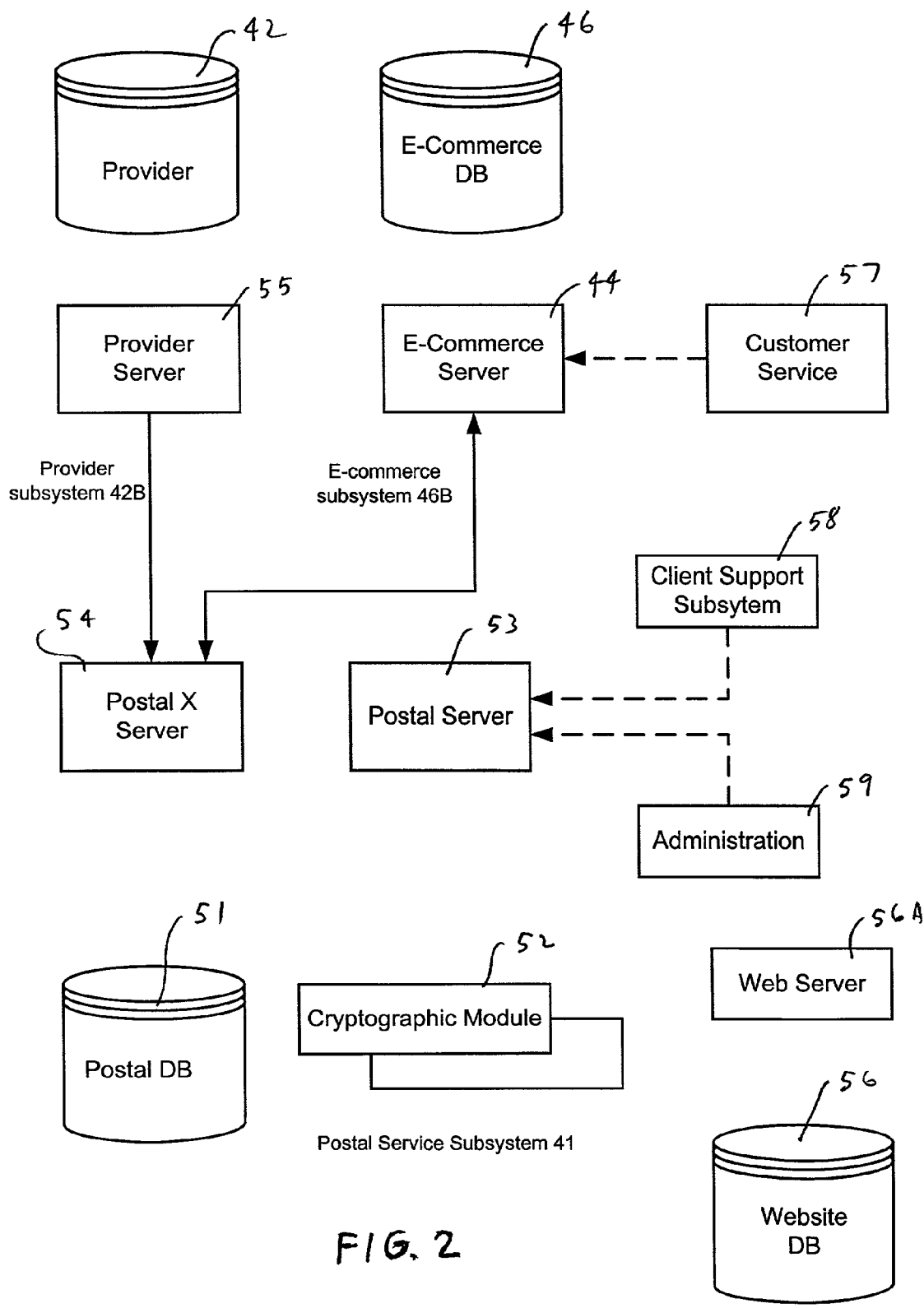
FIG. 2 is a block diagram of one embodiment of postage servers.

Turning to FIG. 2, the Database subsystem includes a Postal Database 47, a Postal Database Management System 47A, a Provider Database 42, a Provider Database Management System 42A, an E-commerce Database 46, an E-commerce Database Management System 46A, a Membership Database 48, a Membership Database Management System 48A, a Staging Services Database 49, a Staging Services Database Management System 49A protected by firewall 40. Different portions of the Database subsystem are described below.

The Postal Server subsystem 41 manages client and remote administration access to server functionality, authenticates clients and allows clients to establish a secure connection to the on-line postage system. The Postal Server subsystem also manages access to USPS specific data such as PSD information and a user's license information. The PostalX Services provide business logic for postal functions such as device authorization and postage purchase/register manipulation. The PXS services require cryptographic modules to perform all functions because the PXS services are vital to the system's integrity and are protected by encryption.

The Postal Database Management System 47A manages access to the Postal section of the Database subsystem where USPS specific data such as meter and licensing information is stored. The Postal Database 47 is a secure database that stores all information for the Postal Server subsystem. The Postal portion of the Database subsystem contains the postal-specific information such as licensing, registration, and meter-specific data for all of the customers. Access to the Postal portion of the Database subsystem occurs through the Postal Server subsystem. Each piece of client software has a unique software serial number, which will be generated and kept in the database during product registration.

Provider subsystem 42B provides reporting and external communication functionality for the Postal Information System. Preferably, the Provider subsystem is located on the PRVNET along with the Database Subsystem and communicates directly with the Database Subsystem when the Provider Subsystem services request Database subsystem information. Provider Subsystem 42B includes Provider Server 55 and Provider Database 42. The Provider Subsystem 42B includes the following services: Central Metering License Services (CMLS), Central Meter Resetting Services (CMRS), Automated Clearing House (ACH) transactions, Credit Card services and Billing services.

The CMLS service forwards license applications to and processes requests from the CMLS in the USPS through a CMLS/CMRS communication link. The CMRS service provides meter movement and meter resetting information through the CMLS/CMRS communication link to the USPS Computerized Meter resetting infrastructure. The ACH Service submits ACH postage purchase requests through an ACH communication link to a USPS lockbox account at a bank. The Credit Card Service is invoked by the E-commerce services to authorize and capture funds from the customer's credit card account and transfer them to a designated merchant bank. The Billing Service provides bills through e-mail to customers based on selected billing plans. All of the Provider subsystem's communication with external devices is secure, since the communication is encrypted.

The Provider Database Management System 42A manages access to the Provider section of the Database subsystem where Provider specific data such as Meter resetting records, Postage Value Download (PVD) information, batch status information and CMLS license information is stored. The PVD information is included in the log file that is sent to the USPS on a regular basis.

The Provider Database 42 is a secure database that stores all information for the Provider Server subsystem. The Provider portion of the Database subsystem contains Provider subsystem specific data such as Meter resetting records, PVD information, batch status information and CMLS license information.

As shown in FIG. 2, the E-commerce subsystem 46B provides functionality for the E-commerce related services required by Customer Support personnel and system administrators. The Customer Support personnel and system administrators access the on-line postage system through the E-commerce subsystem. E-commerce subsystem 46B communicates with the Database subsystem through the Postal Server subsystem and preferably is connected to a Public Network. The E-Commerce subsystem also provides commerce-related services, such as payment processing, pricing plan support and billing, as well as customer care functionality and Lightweight Directory Access Protocol (LDAP) membership personalization services.

Figure 3:
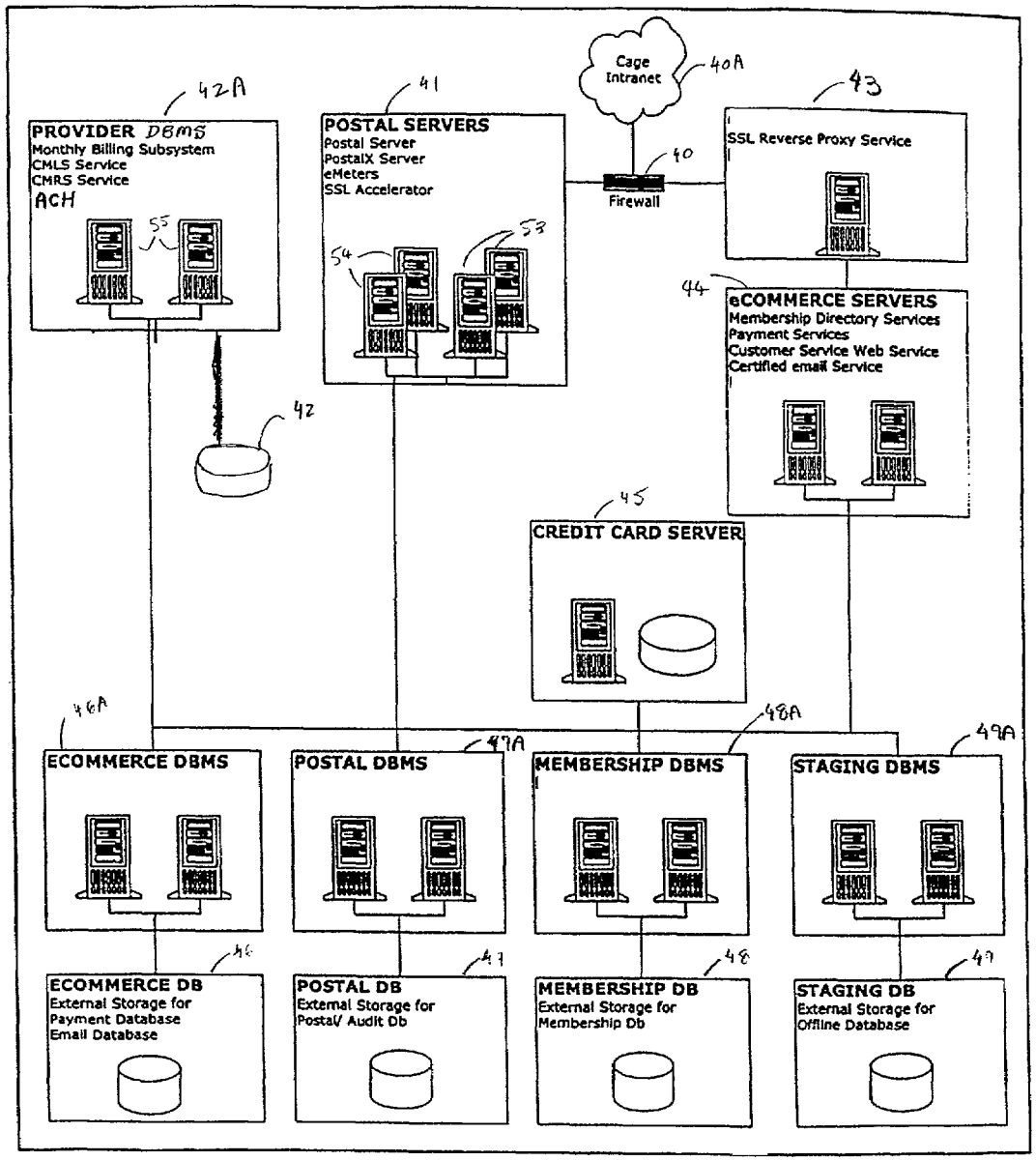
FIG. 3 is a block diagram of servers, databases, and services provided by one embodiment of the invention.

As shown in FIG. 3, E-Commerce subsystem 46B also includes a group of servers and databases including the Proxy Services 43, E-commerce Servers 44, E-commerce Database 46, Membership Database 48, E-commerce Database Management System 46A, Membership Database Management System 48A, and Credit Card Server 45.

Proxy Services 43 provide Customer Support and authenticated access for administrators to the E-Commerce Servers. The E-commerce Services, such as payment processing, pricing plan support, billing, customer care functionality and LDAP membership services run on the E-commerce Servers 44.

E-commerce Database Management System 46A manages access to E-commerce Database 46 where commerce related information is stored, as shown in FIG. 3. E-Commerce Database 46 includes information on non-postal commerce transactions, credit card validations, customer invoicing, etc. E-commerce Database Management System 46A is scalable and may easily be expanded to meet the needs of the system. The E-commerce portion of the Database subsystem includes specific data such as purchase transactions, pricing plans, billing information, and customer account information.

Membership Database Management System 48A provides access to Membership database 48. The Membership Database Management System manages access to the LDAP membership directory database that hosts specific customer information and customer membership data. The Membership Database contains all customer and internal user profile information, plus security information for all internal system users. The Membership Database Management System is scalable and expands to meet the needs of the system.

The SSL Proxy server 43 allows secure HTTP access from a web browser and is used by the system administrators to access the e-commerce subsystem. Web Server 56A is used to maintain the website, facilitate the customer support activities and distribute the client software to interested parties. Web Server 56A communicates with the clients 58 through the Internet 221 and the internal departments via the Intranet LAN 40A. The information for maintaining the website and tracking affiliate performance is located in Website Database 56. An Affiliate Database (not shown) stores client software versions, affiliate profiles and tracking codes and Advertising and Marketing tracking numbers.

Figure 4:
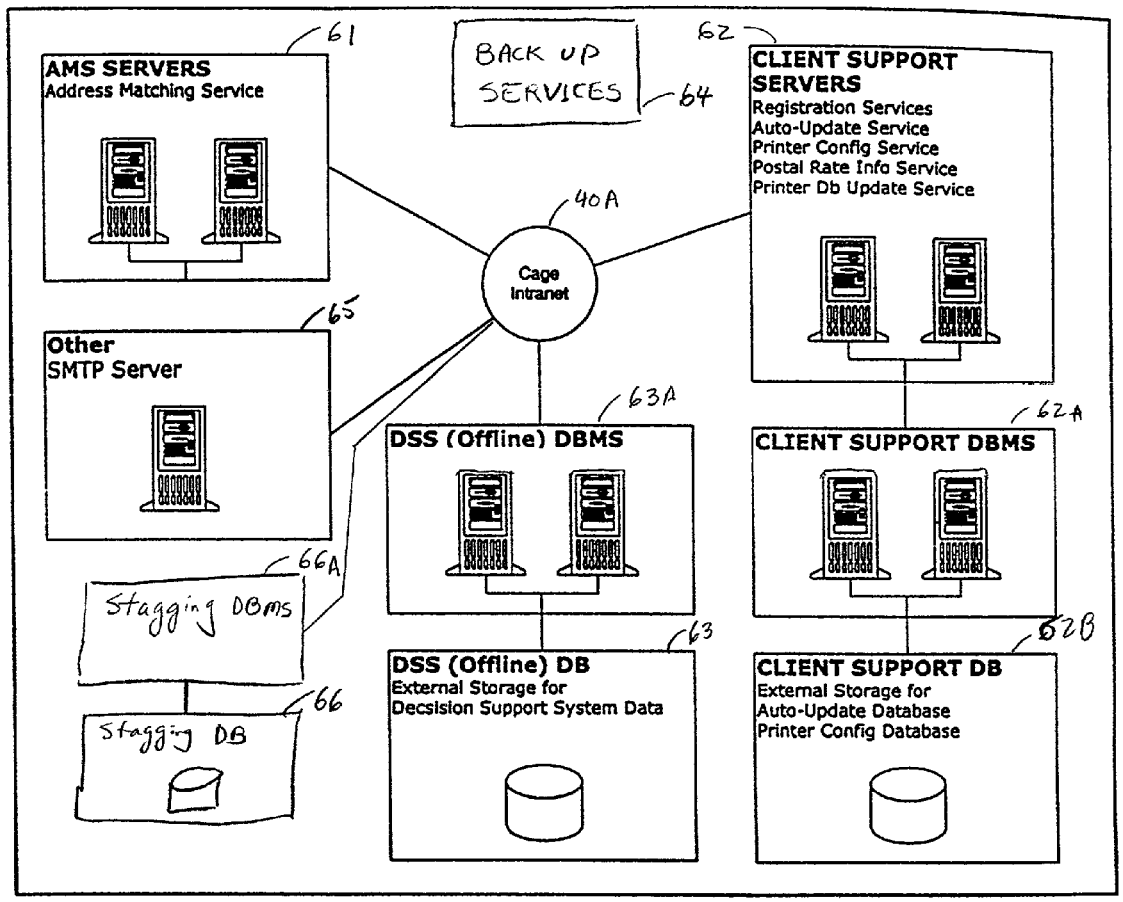
FIG. 4 is a block diagram of servers, databases, and services provided by one embodiment of the invention.

FIG. 4 illustrates more subsystems of the on-line postage system, namely, AMS servers 61, Client Support Servers 62, Client Support Database Management System 62A, Client Support Database 62B, the Decision Support Services (DSS) Database Management System 63A, DSS database 63, Staging Database Management System 66A and Staging Database 66, SMTP server 65, and Backup Services 64.

SMTP server 65 runs the internal and external E-mail systems. The Staging Services subsystem coordinates aggregation of business data. Preferably, each night, all of the changes made in the Database subsystem in the last 24 hours are loaded into Staging Database 66. Staging Services Database Management System 66A manages access to Staging Database 66. After gathering changes in the databases, Staging Services Database Management System 66A strips out all of the critical data such as credit card numbers and critical USPS specific information, and moves the changes to offline databases. Staging Services Database Management System 66A is scalable and may be easily be expanded to meet the needs of the system.

Backup Services subsystem 64 provides the data backup for the Database subsystem. The AMS subsystem 61 validates source and destination addresses against a USPS table to verify the mail is being sent to a recognized location. This service is utilized each time the user attempts to print postal indicia. The AMS system is used when a user enters a delivery address or a return address using the client software. The user does not need the address matching database on the user's local machine to verify the accuracy of the address. The client software connects to the Postage Server and uses a central address database obtained from the USPS to verify the accuracy of the address. If the address is incorrect, the client software provides the user with a prioritized list of addresses to match the correct address. Preferably, these choices are ranked in order according to the type of match.

Referring back to FIG. 2, the Client Support Services subsystem 58 is comprised of the client services that typically do not require secure transactions. Client Support Services subsystem 58 includes the Client Support Servers 62, the Client Support Database Management System 62A, and the Client Support Database 62B as shown in FIG. 4. The services that execute on the Client Support Servers preferably include, Registration Services, Auto-Update Service, Printer Configuration Service, Postal Rate Info Service, and Printer DB Update Service. The Client Support Services are typically low in volume, however, the number of servers and the capacity of the database can be readily scaled according to the workload of the system.

The Registration Services includes supported payment type and billing plan information. The Auto-Update Service updates the client software when new client software versions are released. The Printer Configuration Services assist in setting up the printer to guarantee that the indicia printed meets USPS criteria. The Rates Service calculates the correct rate for the client based on class, destination and weight. The Printer Database Service updates the on-line postage system with any new printer or printing information.

Client Support Database 62B is an external storage component for the Client Support Services subsystem 58. Transactions executing on the Client Support Servers requiring storage utilize the CSD 62B. The data storage size requirements for CSD 62B are relatively low. As the number of Client Support Services transactions grows, the database will grow. The database schema design allows for the data to be partitioned across multiple physical databases.

Figure 5:
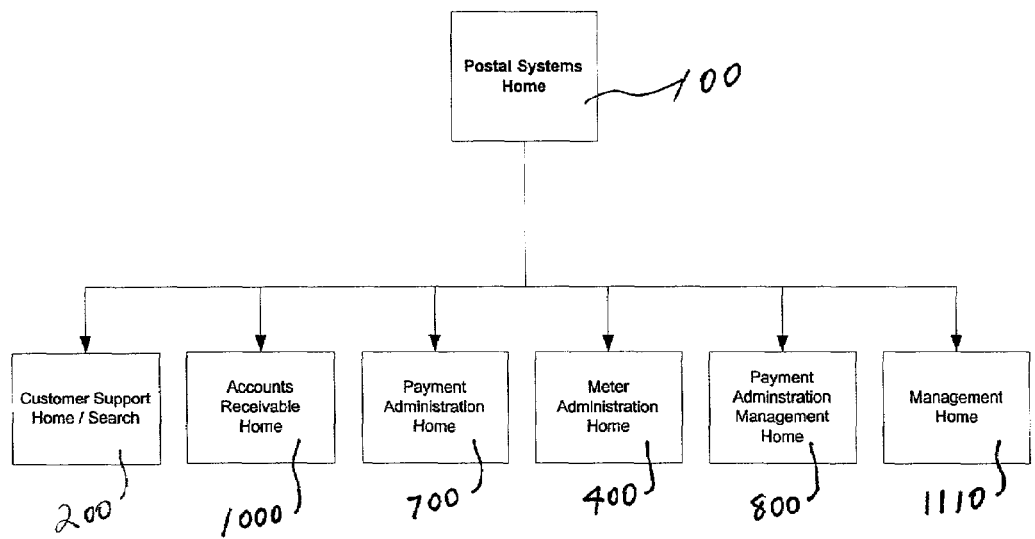
FIG. 5 is a block diagram of a postal system intranet of the invention.

The Decision Support System (DSS) includes the DSS Database Management System 63A and the DSS Database 63, as shown in FIG. 5. The DSS allows restricted (read-only, time delayed) access to the postal data. The DSS Database Management System 63A controls access to DSS Database 63. In one embodiment, the DSS various accounting tasks for the Staging Services Database Management System. The DSS Database 63 is preferably offline and includes most or all of the user's profile information.

The Postal System Intranet of the invention has the following process flow and user interfaces. Below is described the screens available on the Postal Information Systems Intranet. Preferably, all screens are HTML and generated through ASP, but other languages and protocols can also be used.

Screen Flows outline the functions and menu levels available to a particular user group. From the Main Home Page users can link to their "Group" Home page.

Process Flows outline the underlying logic that applies to an action transaction. Individual screens and possible messages are shown after each Process Flow. There are typically two screens and at least two messages involved with a single process, as follows:

Identification Screen—asks for relevant information and positively identifies customer.

Verification Screen—asks user to verify that what he entered is correct. This may require re-entry of identification information.

Confirmation—visually confirms that the data entered was correct and/or the intended transaction was completed successfully.

Negative Confirmation—visually confirms a system error or data error. The transaction has not been processed and must be re-entered.

Certain of the Screens are actual screen captures of HTML interfaces as they are currently programmed, or are Visio mock-ups that have yet to be programmed. The Intranet can conveniently be broken up by user group. Each User group has access to their screens only. Access can be limited by the user's certificate.

As an overview, the Stamps.com databases hold information that is valuable to all departments of the company and outside services and partners. Disseminating this information in an easy and efficient way is imperative to keep the company and its suppliers instantly informed about users, trends and trouble spots. In addition, there are database administration and information distribution tasks that need to be performed on a routine basis to outside suppliers and the USPS (or other postal authority.)

In a preferred embodiment of the invention, Postal Intranet system users (Commerce, Customer Support, etc.) will access HTML pages through the Stamps.com Intranet via a browser, such as Netscape Navigator 4.5 or a later version, provided by Netscape Communications. Navigator presently provides secure 128 bit SSL encryption and handle security certificates more securely than IE. All screen resolutions may be set to a minimum of 800×600 pixels, with high color. This allows for maximum security and maximum information display area. Of course, this may change.

In one embodiment, each Customer Support Representative will be assigned a unique Smartcard for access to the Postal Intranet. Each workstation is required to have a Smartcard reader installed. Users will not be able to login without a Smartcard, the corresponding user name and password. Smartcards assignment will be controlled inside the vault and maintained by Network Operations.

User Interface can conveniently comprise all text, quick display HTML, viewable through Netscape browser using SSL security. As much information as possible should be included on each screen to reduce the need to switch screens. All reports and history logs should be exportable into standard tab-delimited file format.

Referring to FIG. 5, each Usergroup starts at the Postal Information Systems Home Page, then goes to their Usergroup Home page. From a Postal Systems Home 100 page, users can go to Customer Support Home/Search 200, a Meter Administration Home page 400, a Payment Administrative Home page 700, an Accounts Receivable Home 1000, a Payment Administration Management Home page 800, and a Management Home page 1100.

Figure 6:
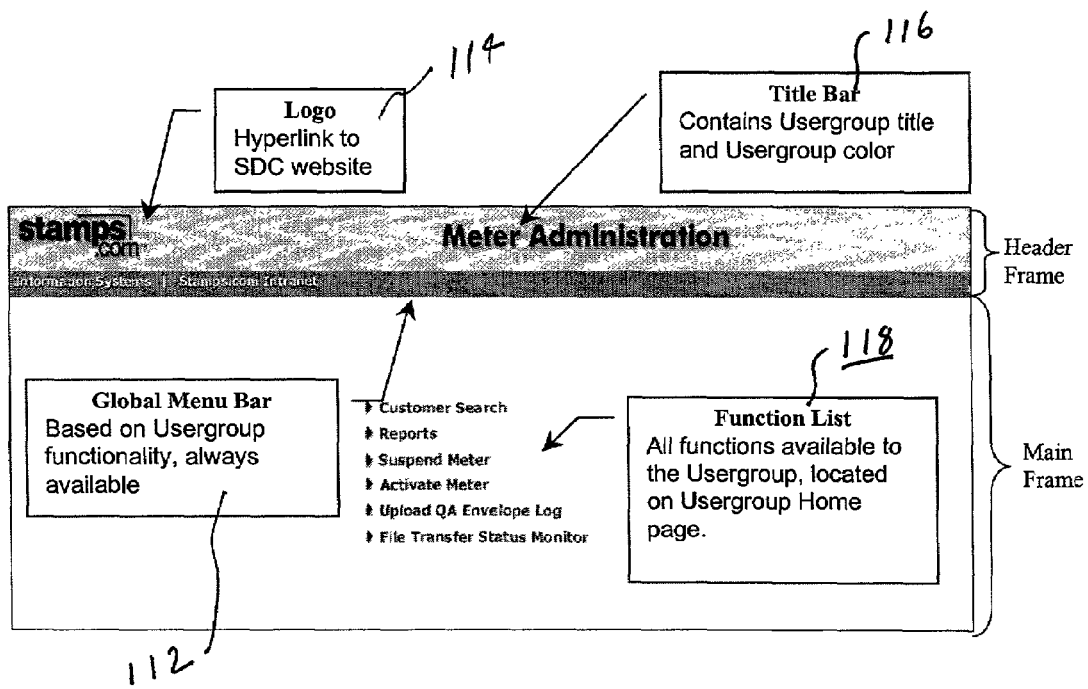
FIG. 6 is a standard screen layout for the GUI.

Turning to FIG. 6, there is displayed a standard screen layout 110 (in this case, a screen display for "Meter Administration".) The standard screen layout has a global menu bar 112, a logo hyperlink 114 which links to the postage server website (e.g. Stamps.com), a title bar 116 which contains Usergroup title (and optionally a predetermined Usergroup color), and a function list 118 which lists all functions available to the Usergroup located on the Usergroup home page. Having described some of the basic background structure, the various usergroup modules will now be described.

Figure 7:
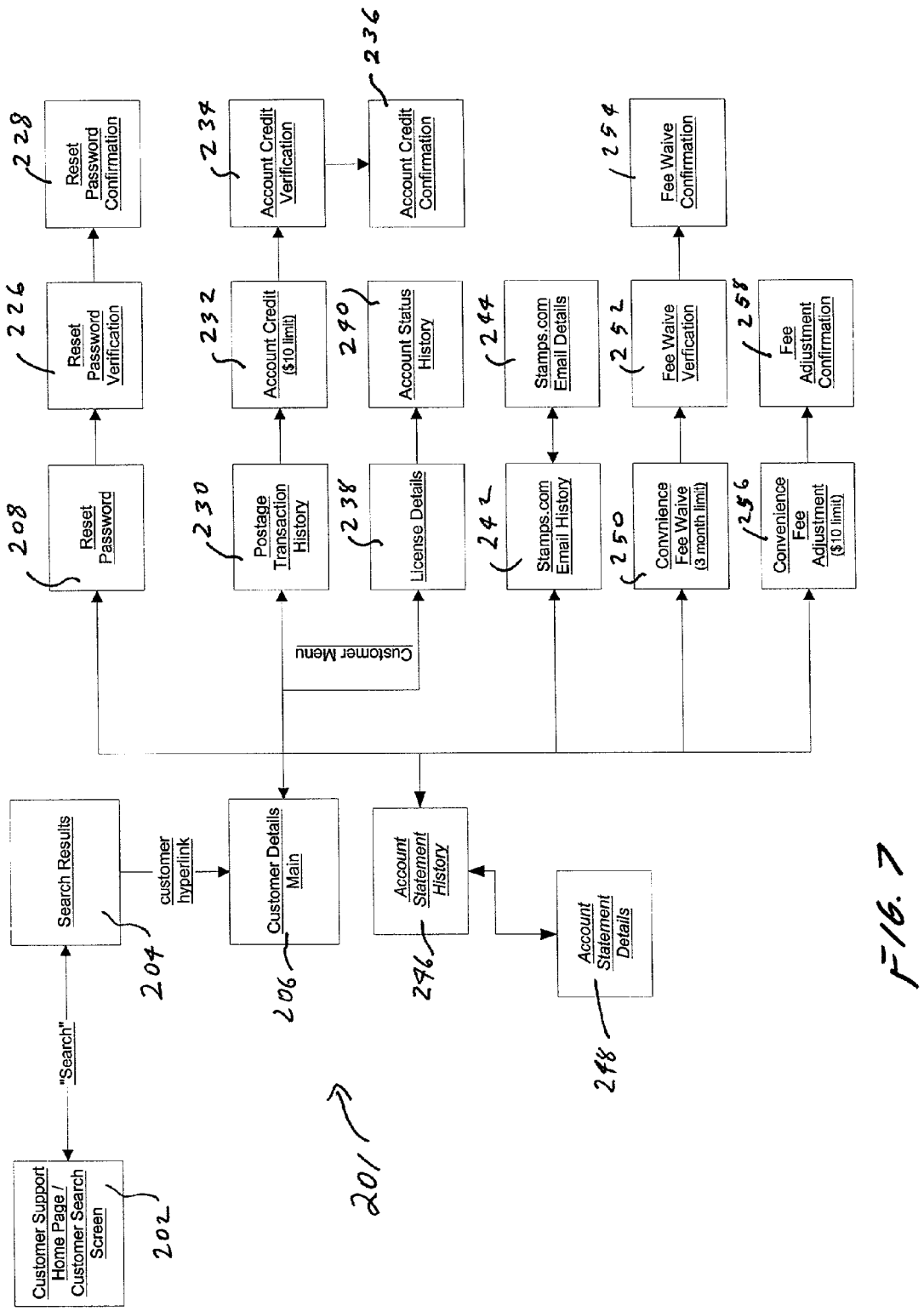
FIG. 7 is a screen flow for a customer support department.

FIG. 7 is a screen flow for a customer support department 201, and FIGS. 7-27 are various additional details of the customer support department 200. The Customer Support (CS) department needs access to user profile information. The CS department should be able to find this customer information quickly to reduce time on the telephone. The main functions of this system permit the following activities to take place:

Look up a user profile, view purchase history, view account history, view license information and account status, reset customer passwords, view QA envelope status, add credits to the user's account or method of payment, and directly credit or suspend convenience fees.

Figures 8, 9:
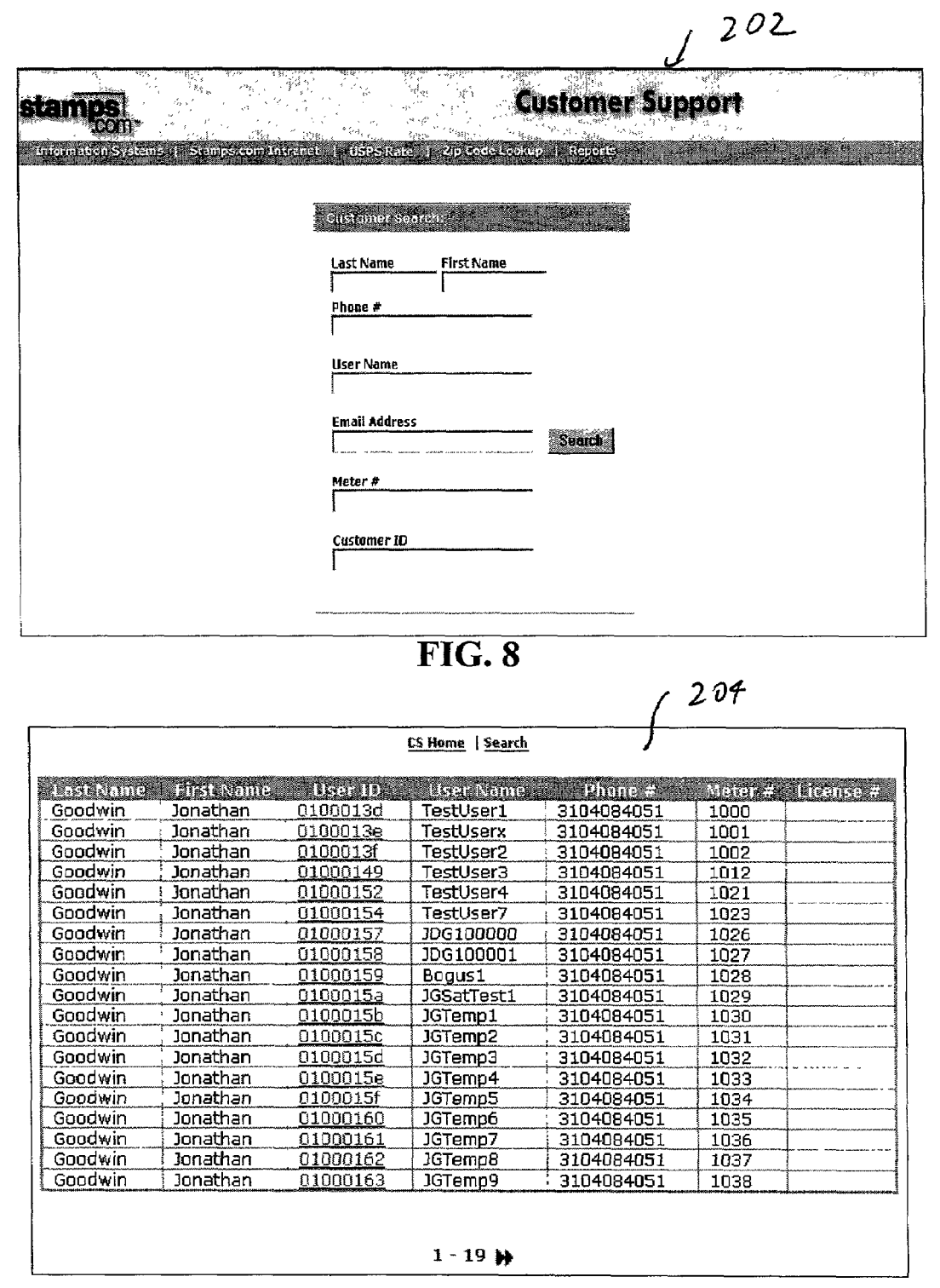

FIG. 8 is one exemplary Customer Support Header, which preferably can appear on all screens. All fields are preferably free-flow text. The user can search for a wildcard or specific customer. If the user does not use a wildcard search and there is an exact match to their query, the Customer Details will be called. If there is not an exact match, or the user specifies a wildcard, a list of "close" results will appear, for example as shown in FIG. 9, which is a screen print of Search Results. This screen shows a list of results based on the query information provided on the Search screen. This list shows the closest match first, followed by the next closest matches, in numerical or alphabetical order. This list shows all searchable criteria, and preferably has the following features:

Each line will be an active hyperlink. Clicking on a line record will take the user to Customer Details for that customer. User can also go back to a previous Search screen. Information previously filled in will remain intact until user makes changes. User can also start New Search, which will open new blank Search screen. If no matches whatsoever are found, there will be a Search Results Negative Confirmation. The Message Text in such instances can read, for example, "No records could be found that match your search criteria, please try again." An "OK" button/hyperlink "OK" which directs the user "Back to Search.", is not shown.

Referring to FIG. 10, clicking the hyperlink on any User ID in the Search Results screen will open that Customer Detail screen. This information will appear in the Main Frame of the HTML screen. Editable fields include, Job Title, Company, Billing Address, Billing City, State, ZIP, Email, Phone, Fax #, Alt Phone, Comment, and Send Marketing Material. From this screen, a user can get more detail on a particular customer by selecting a button to take them to a desired screen. The Screen prompts the customer service representative (CSR) that upon any address change that the customer must also change address in the client to initiate license changes.

Figure 11:
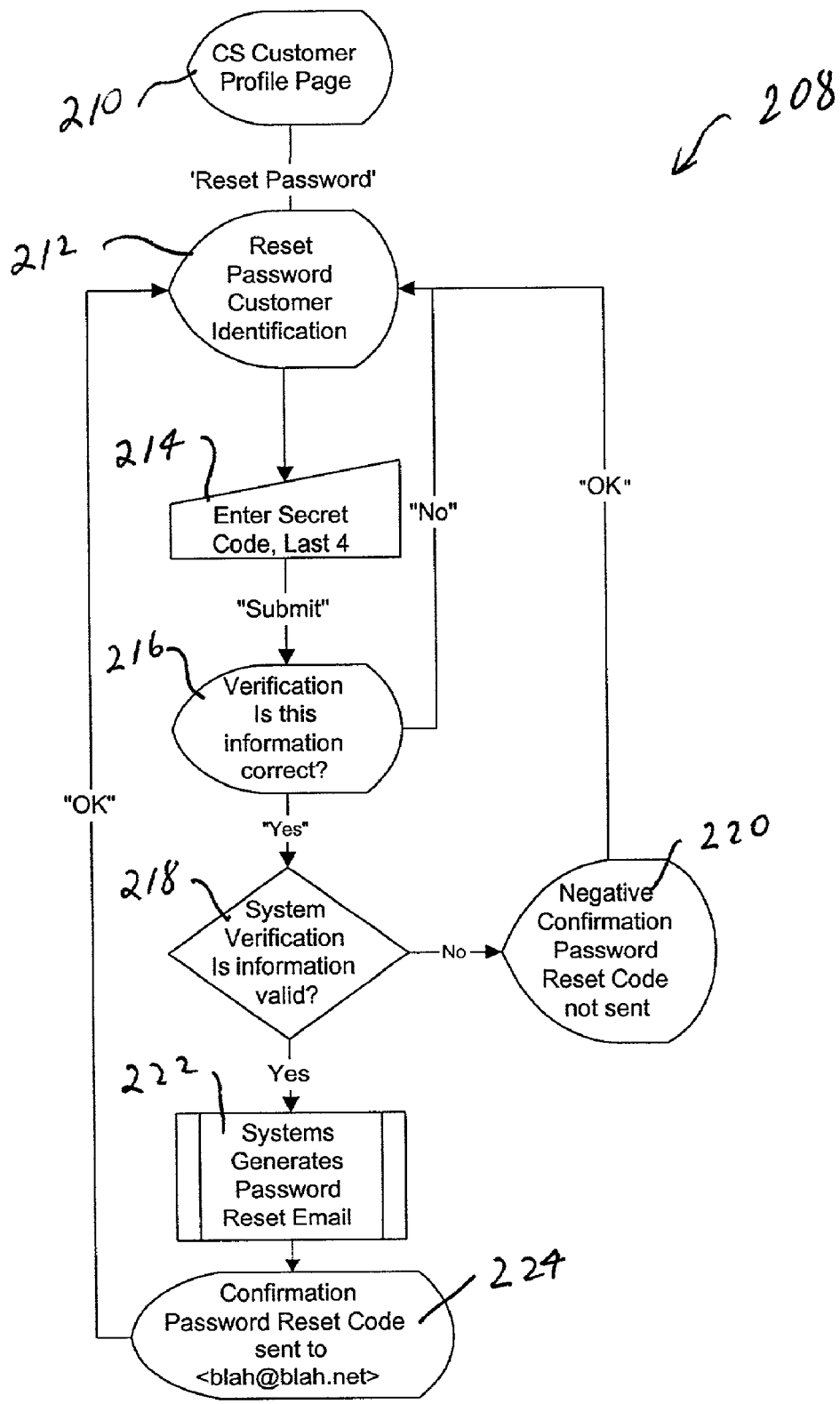
FIG. 11 is a reset password process flow.

Turning to FIG. 11, there is shown a Reset Password process flow 208. Starting from the CS Customer Profile 210, "Reset Password" is selected, and the Reset Password Customer is identified 212. A secret code is entered 214 and submitted. In a verification step 216, if the information is incorrect, then the CS representative must re-enter the customer identification information at step 212. If the information is correct, a system verification step 218 takes place. If the System verification information is invalid, a negative confirmation password reset code 220 is not sent and the CS representative must re-enter the customer identification information at step 212. If the information is correct, then the system generates a password reset Email 222, and a confirmation password reset code is sent to the email of the customer 224.

A screen print of the password Recovery Verification 226 is shown in FIG. 12.

Figures 14, 15:
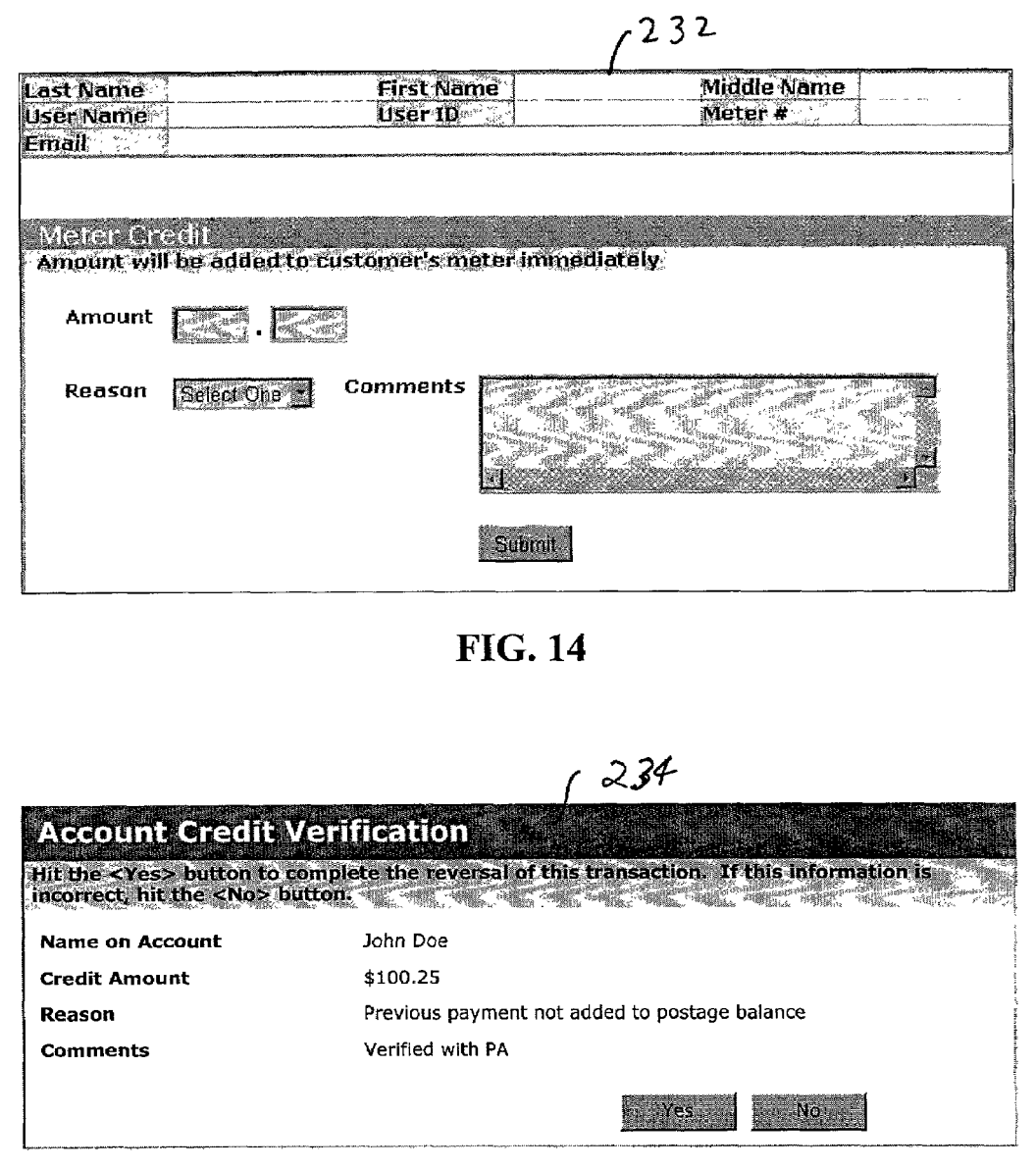

Turning to FIGS. 13 and 14, there are shown a screen print of the Postage Transaction History screen print 230, and an Account Credit screen print 232. Reasons/types of account credits include: an account refund credit, charter member credit, customer payment not credited previously, a demo account, a disputed amount paid, a marketing promotion, a misprint credit, to prevent account closure, free postage for a service that is not initially added, dissatisfaction with the experience, and a valued customer credit.

FIG. 15 is an Account Credit Verification screen print 234. An account credit confirmation is also provided 236 which will indicate that the customer's account has been credited as specified. Other screens can be provided, as follows (but not shown): If the account credit is over limit, then the screen can give the user a message such as "You have entered an amount greater than <limit>. You may only enter an amount less than this. If you need to enter a greater amount, please consult a manager." "OK", and provide to a "Back to Account Credit" Screen. Also, there can be provided an Account Credit Overload screen which can give the user a message such as "You have entered an amount that would cause the account balance to exceed <limit>. Please reduce the amount and resubmit this transaction." "OK" and provide to a "Back to Account Credit" Screen. There can be provided an Account Credit Error screen "ERROR: <error reason> The entry was not processed. Please process this transaction again." "OK", and provide to a "Back to Account Credit" Screen.

FIG. 16 is a License Detail screen print 238, FIG. 17 is an Account Status History screen print 240, and FIG. 18 is an Email History Screen print 242. The listed status will be one of 5 possible strings depending on the status code from the email database. The logic will first check the message queue for messages that are being sent (when available), then query the email database. These statuses are as follows: Queued-(x retries)—Where 'x' is the number of retries in the message queue; Sent—Not Confirmed; Sent—Server Receipt; Sent—Client Receipt; and Rejected. Clicking the hyperlink on any email in the Email History screen will reconstruct that particular email and display it exactly as the customer sees it.

Turning to FIG. 19, there is shown a screen print of an Account Statement History Screen 246. FIG. 20 is a screen print of an Account Statement Details Screen 248. Clicking the hyperlink on any email in the Account Statement History screen will preferably reconstruct that particular email and display it exactly as the customer sees it.

FIG. 21 is a screen print of a Convenience Fee Waive (or Suspense) screen 250. The CSR can be limited to a predetermined time period (e.g. three months.) Reasons for fee waive can include the following reason: Charter Member privileges; demo Account; employee; Failed Transaction Fees; Improperly Charged For Previous Fees; Marketing Promotion; Prevent Account Closure; Unhappy With Experience; Valued Customer; and Other.

FIG. 22 is a Fee Waive Verification screen print 252. A Fee Waive Confirmation should also take place, with an exemplary possible message to the CSR being "The Customer's Fees have been waived as specified." "OK" "Back to Account History." If the CSR attempts to waive the fee over a predetermined limit, there can be a Fee Waive Over Limit option that can read "You have entered a waive time over <time limit, units>. You may only enter a time equal to or less than this. If you need to waive fees for a longer period please consult a manager." "OK". "Back to Fee Waive Screen." If there is a Fee Waive Error, a message can be outputted "ERROR: <error reason> The entry was not processed. Please process this transaction again."

"OK." "Back to Waive Screen."

FIG. 23 is a screen print of a Convenience Fee Adjustment screen 256. Reasons for Service Fee Adjustment (credit or debit) can include the following: Charter Member; Demo Account; Employee; Failed Transaction Fees; Marketing Promotion; Not Charged For Previous Fees; Other Adjustment; Over-Charged For Previous Fees; Prevent Account Closure; Unhappy With Experience; and Valued Customer. A Convenience Fee Confirmation 258 can then be generated, e.g. "The entry has been submitted successfully. The adjustment will appear in the customer's next regular statement." "OK." "Back to Account Statement History." If the Convenience Fee is over limit, a message can be generated, such as "You have entered an amount greater than <limit>. You may only enter an amount less than this. If you need to enter a greater amount, please consult a manager." "OK." "Back to Adjustment Screen." If there is a Convenience Fee Error, a message can be generated, such as "ERROR: <error reason> The entry was not processed. Please process this transaction again." "OK." "Back to Adjustment Screen."

Figure 24:
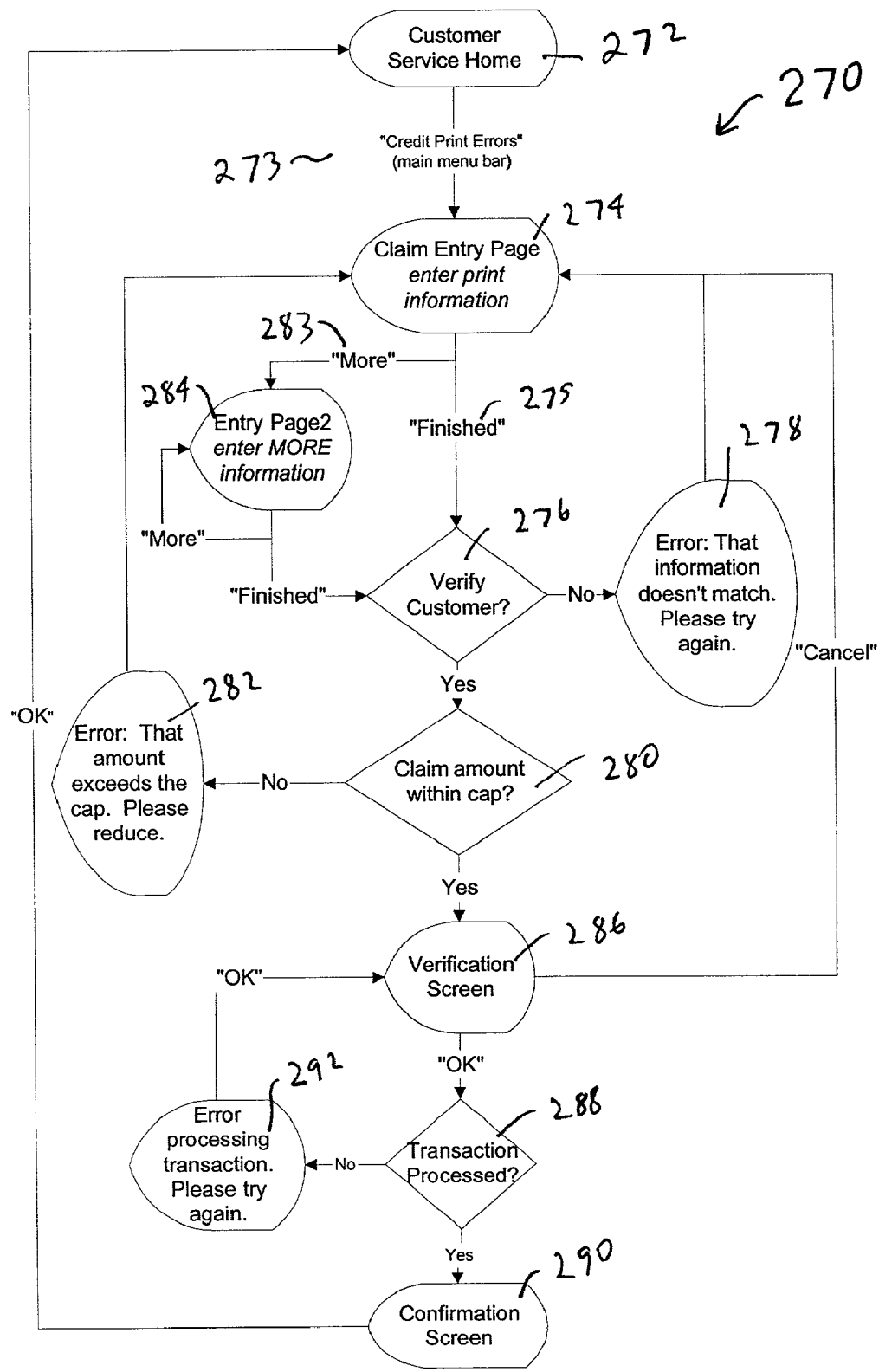
FIG. 24 is a process flow for a Print Error Credit module.

FIG. 24 is a process flow for a Print Error Credit module 270. From the customer service home page 272, the user will select a "Credit Print Errors" button on the main menu bar 273, and will see a Print Error Claim Entry screen 274, an exemplar of which is shown on FIG. 24A. If finished entering information, the user will select the "Finished" button 275, and then there will be a verification step 276. If there is an error and the information does not match, then the user will be asked to try again 278. If the customer is verified, then there is a test to determine if the claim amount is within the predetermined maximum cap 280. If not, then an error message will be displayed indicating that the amount exceeds the cap 282. If at the Print Error Claim Entry page 274 there is insufficient space to enter all entries, the user may select the more button 283 and be directed to a Printer Error Claim—Additional Entries page 284 (an exemplar being shown in FIG. 24B.) A user may use as many additional pages as necessary, and when completed, the user can be directed back to the verify customer step 276. If the claim amount is within the cap, then the user is directed to a Print Error Claim Verification screen 286 (an exemplar being shown in FIG. 24C.) If the user wishes to proceed and selects a "Process" button 288 and the print error is successfully processed, a Print Error Claim Confirmation 290 is displayed, and the claim is added to the customer's account. If the transaction fails, then an Error message is displayed, and the user is directed back to a verification screen 286.

The above described screens are accessible to Customer Service Representatives (CSRs.) For more sensitive matters and/or for matters which involve more discretion, certain screens and functions will be available to Customer Support Representative Managers (CSR Managers). The main differences between CSRs and CSR Managers are the ability to run selected reports, the ability to make instant account adjustments, and the ability to withdraw accounts. The limits imposed on all credit/debit screens are also higher than the same screens available to CSRs.

The Screen Flow 300 for CSR Managers is shown at FIG. 25. At a Customer Support Home Page/Customer Search screen 302, the CSR Manager utilizes a global menu 304 to generate reports 306, and by selecting report and date ranges, can monitor customer support credits 310, withdrawal request activity 312 and instant credits to ACH customers 314, and can download tab-delimited reports 315. From the Customer Support Home Page/Customer Search screen 302, the user can conduct a search and obtain search results 316. Via a customer hyperlink 317, the user can be directed to a customer details main page 318, and select from various options in a customer menu 319, including reset password 326, close account 334, postal transaction history 340, license details 346, Stamps.com Email history 350, Convenience Fee Waiver 354, and Convenience Fee Adjustment 358. From the reset password page 326, there will be a reset password verification 328, and a reset password confirmation 330. A reset password history log 332 will be displayable as well (an example of which is shown in FIG. 25E.) From the close account screen 334, the next screen is a withdrawal verification screen 336 and then a withdrawal confirmation page 338. From a Postal transaction history screen 340, next flows a credit account page 342 and a credit account confirmation page 344. From the license details page 346 there can be selected an account status history page 348. From the Stamps.com Email history page 350 next is the Stamps.com Email details page 352. From the Convenience Fee Waive page 354 there is a Fee Waive Confirmation page 356. Finally, from the Convenience Fee Adjustment page 358 there follows a Convenience Fee Adjustment confirmation page 360.

Figures 25A, 25B:
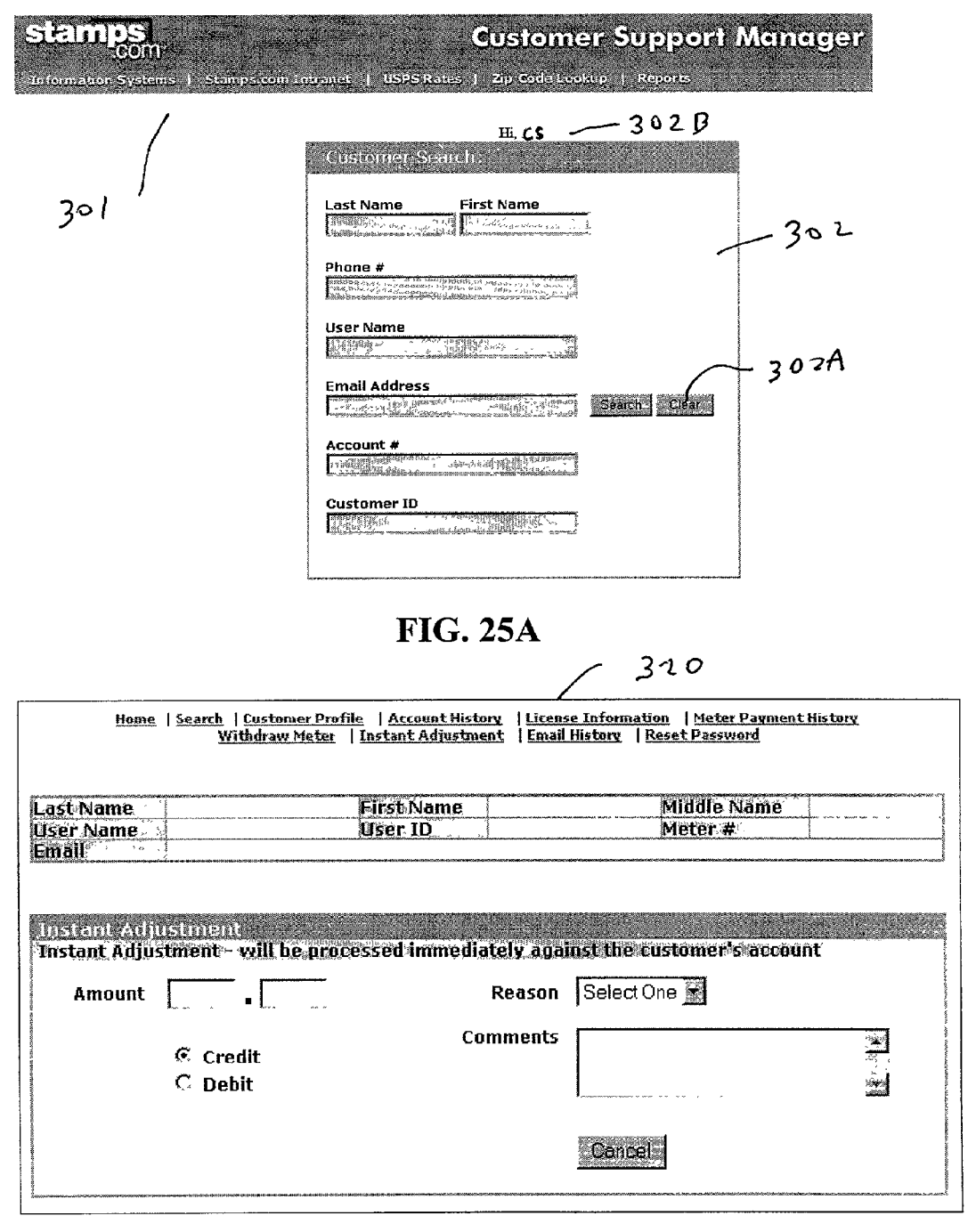

FIG. 25A is a representative screen print showing a Customer Support Manager Header 302. The header 301 preferably appears on all Customer Support Manager screens. All fields are preferably free-flow text. The user can search for a wildcard or specific customer. Wild cards are preferably only used at the end of a string. If the user does not use a wild card search and there is an exact match to their query, the Customer Profile or Customer Details Main page 318 will be called. If there is not an exact match, or the user specifies a wildcard, a list of "close" results will appear—Search Results 316 (FIG. 25.) The "Clear" button 302A clears all fields in the screen so that the user can start a new search. The "Hi, CS" 302B above the screen title 302C will be updated based on the user name of the person logged into the system. The Customer Support Header text can preferably be color coded to match the other screen headers.

Turning to FIG. 25B, there is shown a screen print of the Instant Adjustment page 320. The CSR Manager Limit for this screen can be set at some limit, such as $50.00. Reasons for Instant Adjustment (credit or debit) can include the following reasons: Account Refund; Charged For Fraudulent Use Of Account; Charter Member; Credit For Non-Receipt Of Product/Service; Over-Charged For Previous Convenience Fees; Purchase Refund; Valued Customer; or Other.

FIG. 25C is a screen print of the Instant Adjustment Verification page 322. Upon submitting this information, an Instant Adjustment Confirmation will be generated, e.g., "The Customers <payment type> has been adjusted as specified. If the customer is using Direct Account Withdrawal (ACH) a check will be mailed to them in about 2 weeks." "OK", "Back to Customer Details." If there is an Instant Adjustment Over Limit, there can be a screen print which displays something like "You have entered an amount greater than <limit>. You may only enter an amount less than this. If you need to enter a greater amount, please consult a manager." "OK" "Back to Instant Adjustment Screen". If there is a Instant Adjustment Error, there can be a screen print which displays something like "ERROR: <error reason> The entry was not processed. Please process this transaction again." "OK" "Back to Instant Adjustment Screen."

FIG. 25D is a screen print of an Instant Adjustment History Log 324, and FIG. 25E is a screen print of a Reset Password History Log 332.

Figure 26:
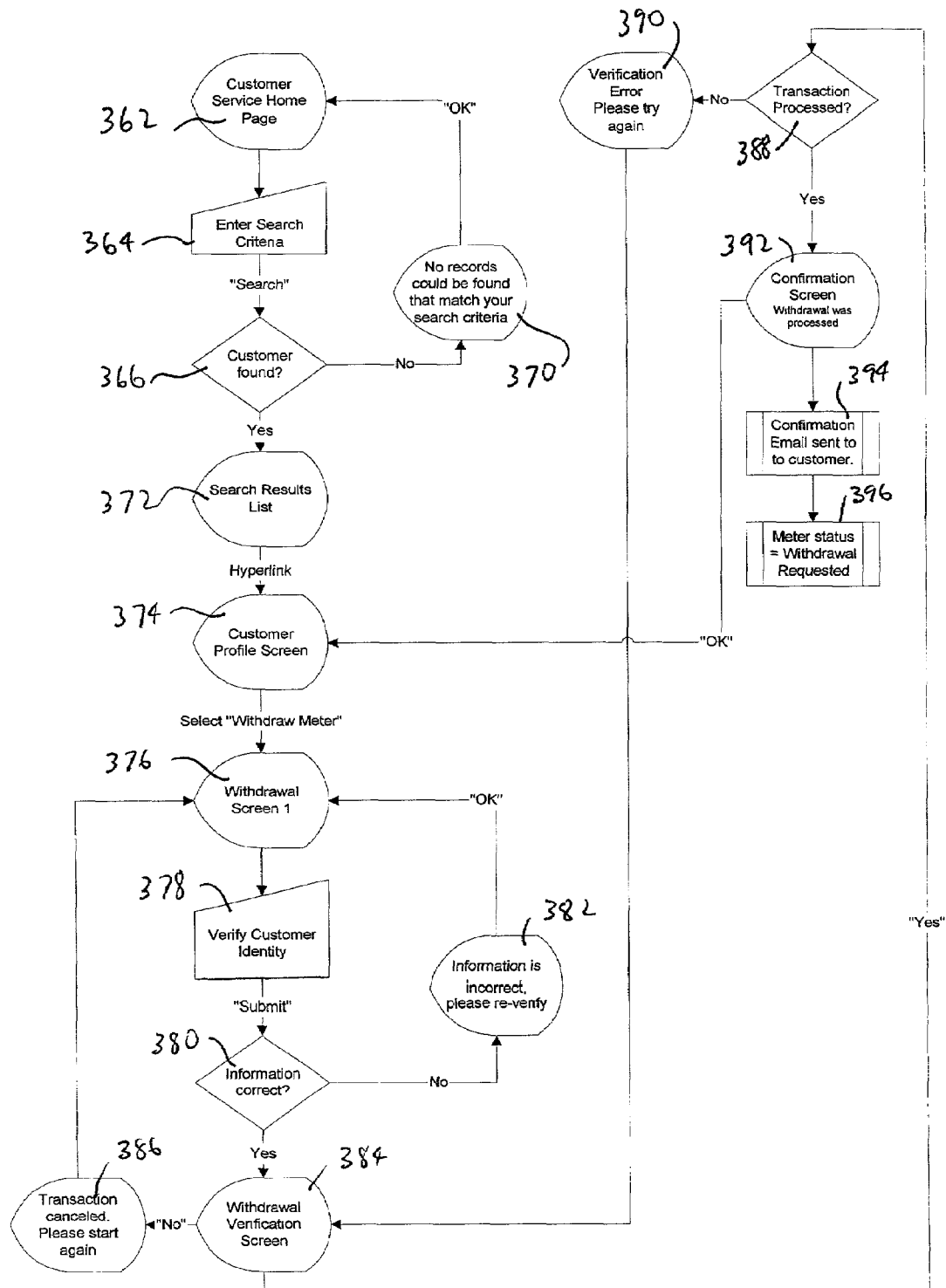
FIG. 26 is a process flow for an Account Withdrawal/Close Account.

The process flow for an Account Withdrawal/Close Account is shown in FIG. 26, and greatly expands upon steps 334 to 338 depicted on FIG. 25. For convenience of presentation, different reference numerals are shown other than those of FIG. 25, although several steps overlap those shown in FIG. 25. From the Customer Service Home Page 362, the user will enter the Search Criteria 364 and select "Search". A "Customer Found" decision takes place 366. If no records can be located that matches the search criteria 370, then the user is directed back to the Customer Service Home page 362. If the customer is found, then the Search Results are listed 372. The user will select the desired customer, and be directed there by a hyperlink to the Customer Profile Screen 374. The user will select "Withdraw Meter" and be directed to an Account Withdrawal identification Screen 376 (an example of which is shown in FIG. 26A) and verify the customer identity 378 and submit it. As an aside, the user can provide the necessary information to fill the fields about the customer. However, if the customer can access the withdrawal features in their software, then the customer must generally initiate the withdrawal at his end, and the CSR Manager will confirm the information. The customer will be asked questions, such as:

Why are you canceling Stamps.com Service?

No use for software anymore; Too expensive; Difficulty connecting; Too much lost postage due to printing mistakes; No support for windowed or pre-addressed envelopes; incompatibility with other software; Requires printing of address and 'stamp' together; No longer have significant mail volumes; Poor customer support; or Other-free flow text What product/service will you now use for your postage needs?

Regular stamps; Postage meter; Alternative Internet Postage product; or Other-free flow text.

If the information is incorrect as determined by a decision tree 380, an appropriate message such as "Information is Incorrect, please re-verify" 382 is given, and the user is directed back to the Withdrawal screen 376. If the information is correct, then the user will be directed to a withdrawal verification screen 384 (an exemplar of which is shown at FIG. 26B.)

If at the withdrawal verification screen 384 the user decides to cancel the transaction, the user may cancel the transaction 386 and be redirected back to the withdrawal screen 376. If the user desires to proceed, the software will determine if the transaction has been processed 388. If not, a Verification error message 390 will be generated and displayed to the user, and the user will be directed back to the withdrawal verification screen 384. If the withdrawal is processed correctly, then a Withdrawal Confirmation will appear 392, such as "The customer's information has been confirmed, their account has been closed and their account has been flagged for withdrawal. We will process their account balance refund within 14 days and send this information to the USPS. The customer will receive a check directly from the USPS in 6-8 weeks." "OK", and the customer profile will be adjusted. Thereafter, a confirmation message (e.g. an Email) will be sent to the customer 394, and then the meter status will be updated to indicate that the customer has been withdrawn 396.

Turning to FIGS. 27, and 27A-27C, there are shown a Reports page 306 with option buttons for Customer Support Credits, Withdrawal Request Activity, and Instant Credits ACH Customers (FIG. 27), and pages for Customer Support Credits (FIG. 27A), Withdrawal Request Activity (FIG. 27B), and Instant Credits ACH Customers (FIG. 27C). That completes the Customer Support Home/Search portion of the Postal System Intranet.

Figure 28:
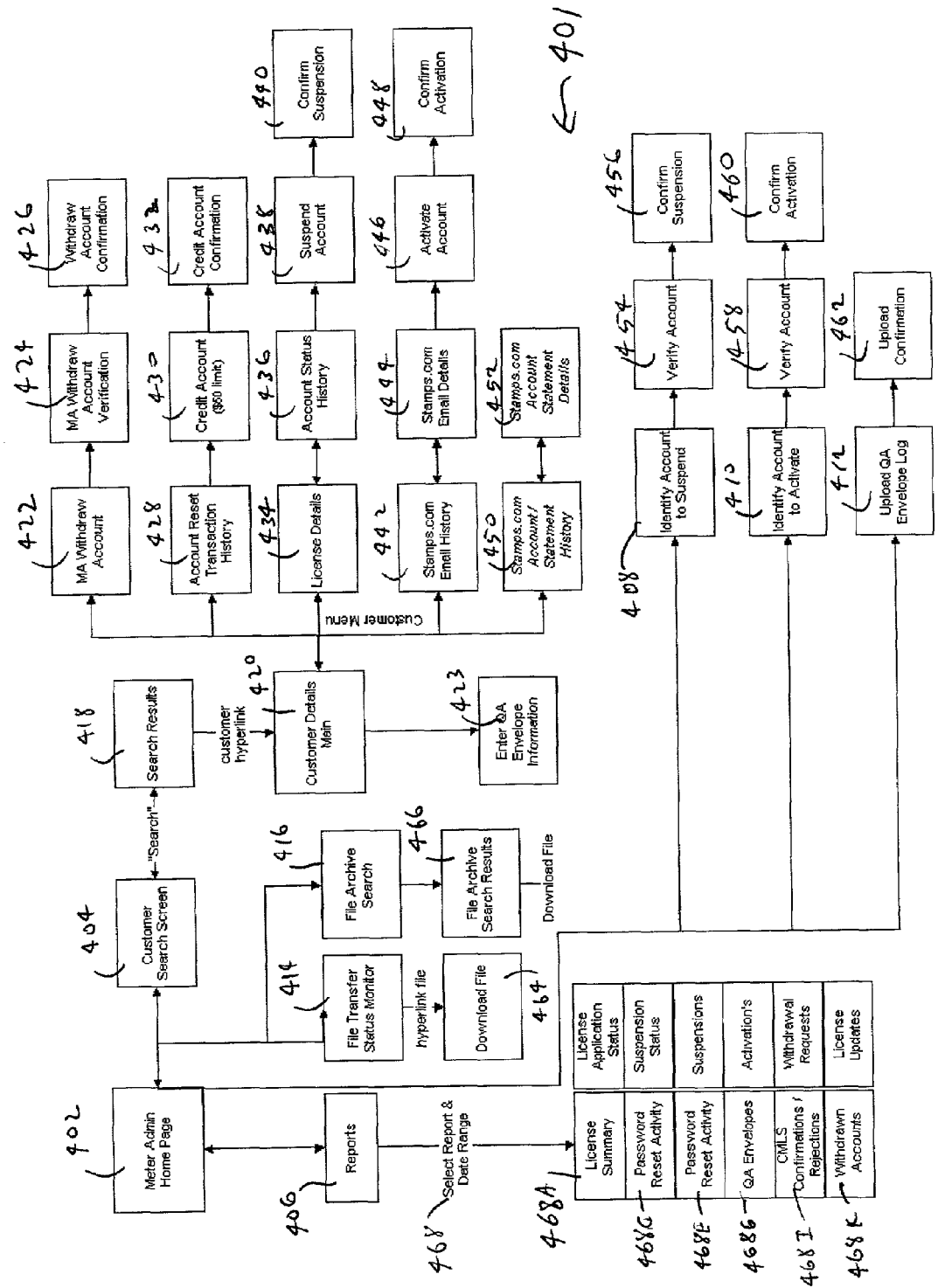
FIG. 28 is a screen flow showing the Meter Administration System.
Figure 28A:
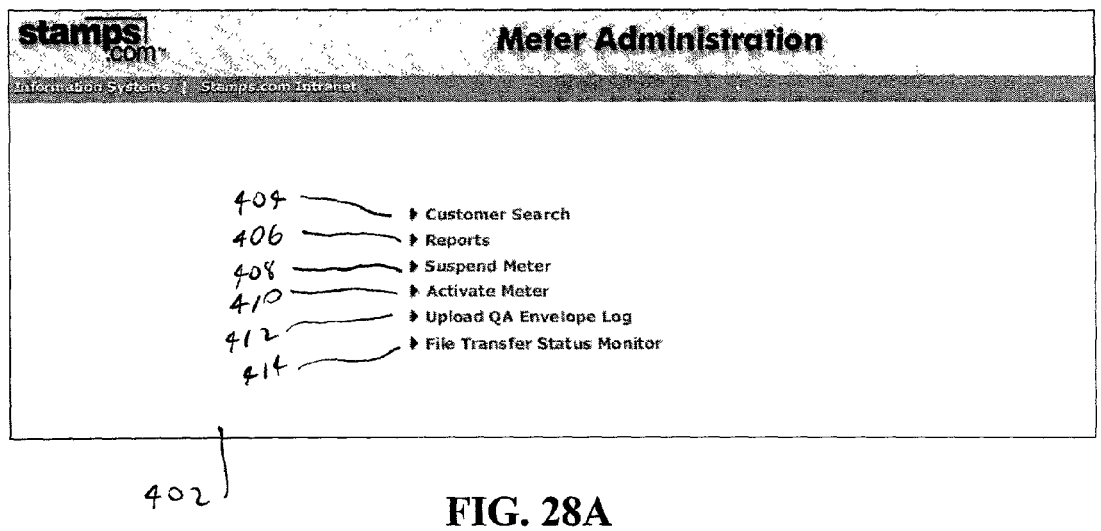

Turning to the next major section of the Postal System Intranet, FIG. 28 is a screen flow showing the Meter Administration System 401 showing the organization and logical flow. Starting from the Meter Administration Home Page 402 (an exemplar of which is shown in FIG. 28A), the user can select Customer Search 404, Report 406, Suspend Meter 408, Activate Meter 410, Upload QA (Quality Assurance) Envelope Log 412, and File Transfer Status Monitor (and File Archive Search) 414 and 416. If user selects customer search button 404, a customer search screen will be displayed, much like that shown in FIG. 8. The user can then select "search" and display Search Results 418, much as shown in FIG. 9. The user can select a customer hyperlink, and display a Customer Details main page 420, which can be similar to that shown in FIG. 10. The user can then enter QA Envelope information 423, if not already completed. As part Of the process of establishing new customers, the new customer must print a QA envelope and send it Stamps.com to assure that the user's printer is properly printing the postage indicia and other information.

Figure 29:
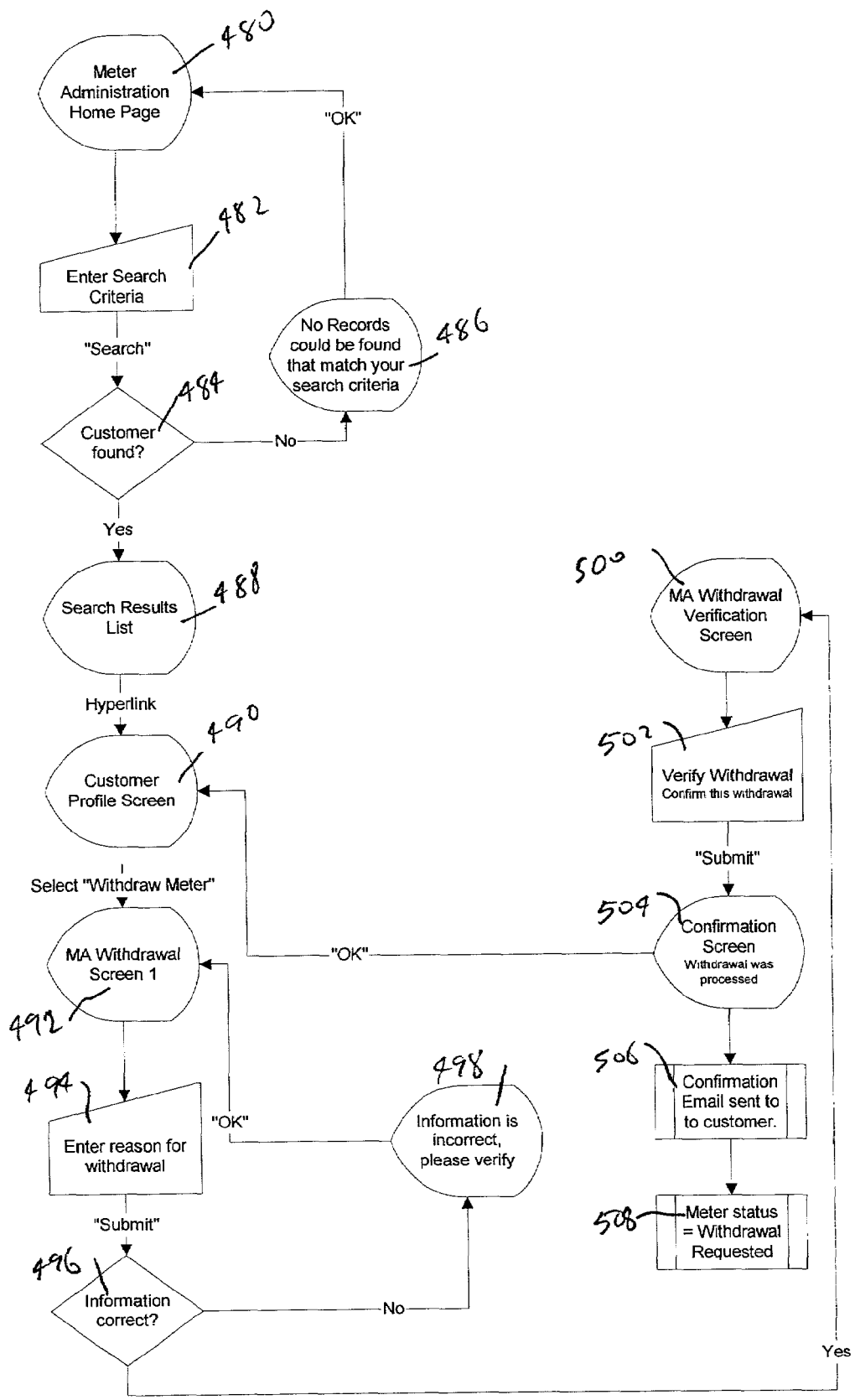
FIG. 29 is a process flow for MA Account Withdrawal.

Turning to FIG. 29, there is shown a process flow for MA Account Withdrawal. This process is accessed by navigating through the Customer Detail Main page 420, and its basic steps of selecting Meter Administration (MA) Withdrawal Account 422, which generates a MA Withdrawal Account Verification 424 and finally a Withdrawal Account confirmation 426 in FIG. 28. This process is shown in greater logical and process flow detail in FIG. 29. While some of the steps are the same as shown on FIG. 28, for convenience of presentation, unique reference numerals are used in describing the steps and process flow of FIG. 29. Starting from Meter Administration Home Page 480, a user enter search criteria 482 and searches. A logic step 484 determines if customer is found. If not, then message is displayed that no records could be found that match the search criteria 486, and the user is redirected to the Meter Administration Home Page 480. If the customer is found, then a Search Results List 488 is displayed. By selecting a hyperlink, the user is directed to a Customer Profile Screen 490. By selecting "Withdraw Meter", a MA Withdrawal Screen 492 is displayed, which is then submitted. A decision tree 496 determines if the information is correct. If not, a message is displayed that "Information is incorrect, please verify" 498, and the user is re-directed to the MA Withdrawal Screen 492. An exemplary screen print of the MA Withdrawal Screen 492 is shown at FIG. 29A. If the information is correct, the user is directed to a MA Withdrawal Verification Screen 500. The user is asked to verify the withdrawal 502 and submit. An exemplary screen print of the MA Account Withdrawal Verification Screen 492 is shown at FIG. 29B. At a confirmation screen 504 a message displays that the withdrawal was processed, and the user is directed back to the Customer Profile Screen 490. In addition, a confirmation Email is sent to the customer and the meter status is set to =withdrawal requested.

Figures 30, 31:
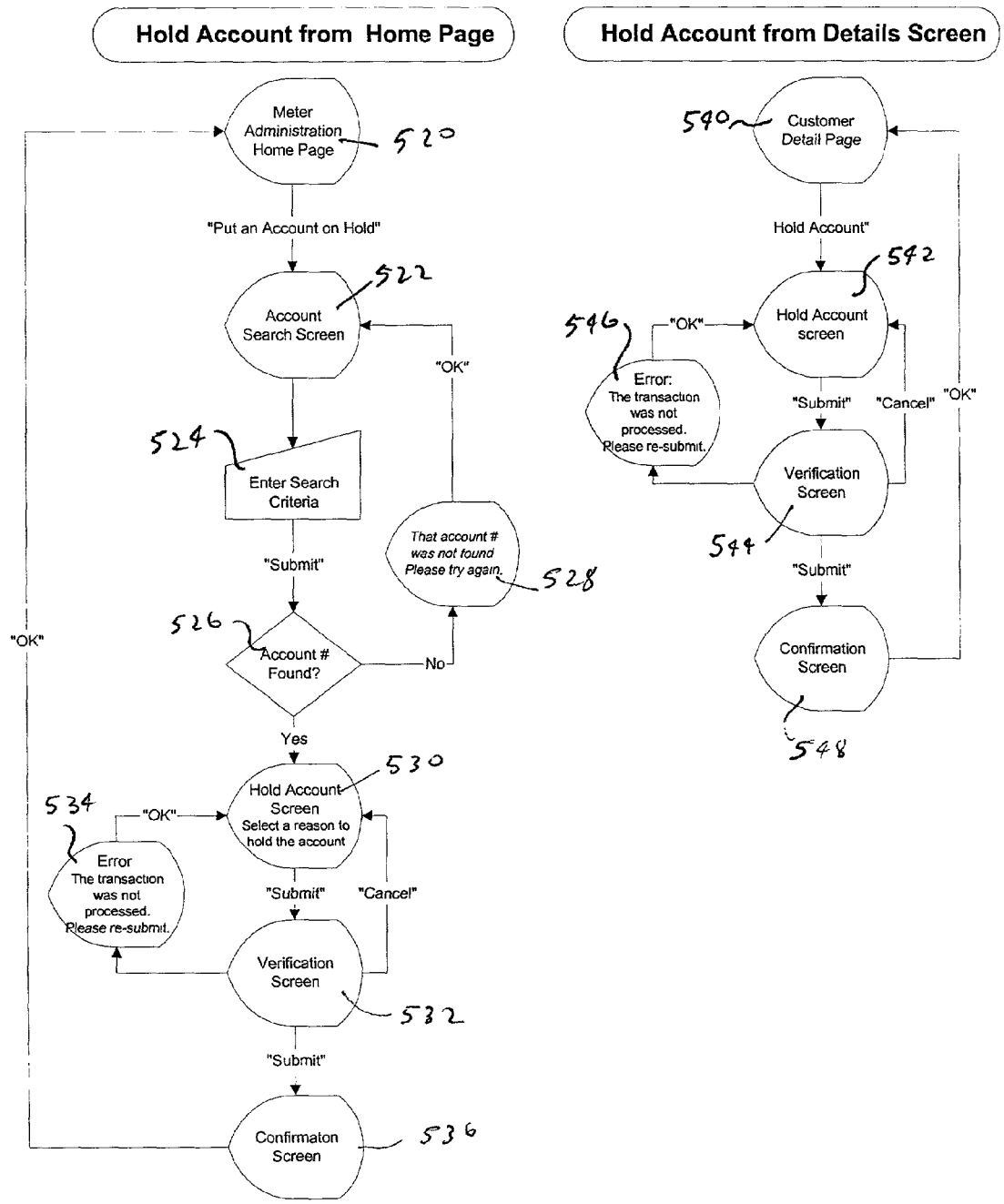
FIGS. 30 and 31 are process flows for administrative hold/suspend.

Turning back to FIG. 28, the screen flow of an administrative hold/suspend from the MA Home page begins at the MA Home page 402, then goes to identify account to suspend 408, verify account 454 and confirm suspension screen 456. Alternately, an administrative hold/suspend can be accessed through the Customer Detail Main screen 420, then go to the License Details page 434, an Account Status History page 436, a Suspend Account page 438, and finally a Confirm Suspension page 440. These two alternative process flows are described in great detail with respect to FIGS. 30 and 31, respectively, wherein FIG. 30 is a process flow administrative hold/suspend from the MA Home page, and FIG. 31 is a process flow administrative hold/suspend from the Customer Details Main page 420. For convenience sake, the reference numerals used in describing FIGS. 30 and 31 are different than those used in FIG. 28.

Figure 30A:
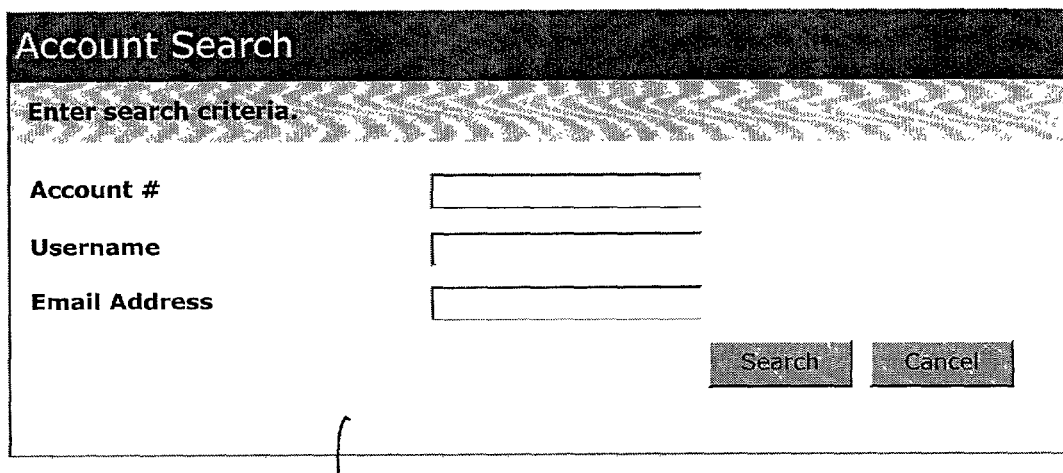
Figure 30B:
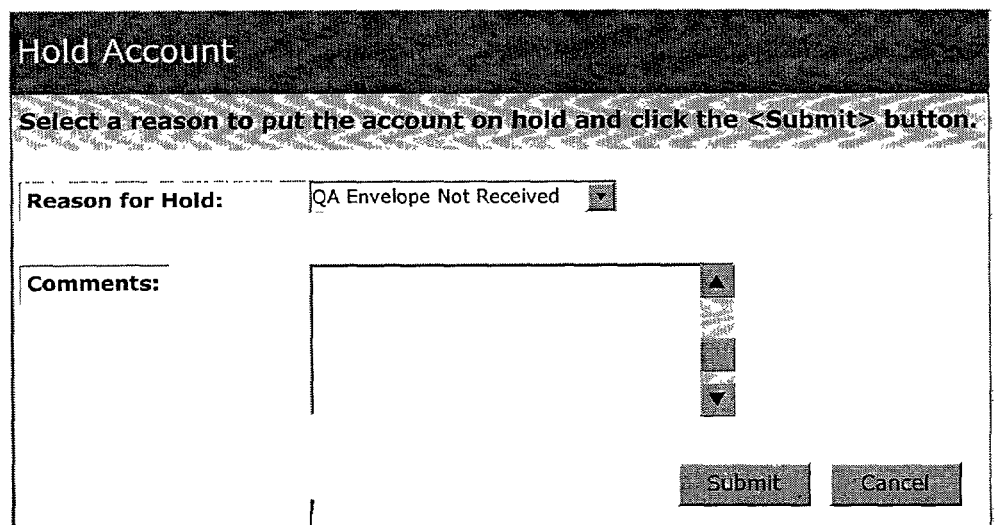

Beginning from the MA Home page 520, a "put an account on hold" button is selected and the account search screen 522 is displayed. FIG. 30A is a screen print of the account search screen. The User will enter the search criteria 524 and submit it. At the decision tree 526, a decision will be made whether the account number was found. If it is not found, a message will be displayed that the account was not found, please try again 528, and the User will be re-directed back to the account search screen 522. If the account number is found, the hold account screen 530 will be displayed, and FIG. 30B is an exemplary screen print of the hold account screen. The User will need to select reasons to hold the account. Some reasons to hold the account are, a demo account, license revoked, license suspended, non-approved printer, non-payment postage, non-payment service fees, QA envelope failed, QA envelope not received, suspected fraud, or general. The User will then submit the information and a verification screen 532 will be displayed, an exemplary sample of which is shown in FIG. 30C. If there is an error in the transaction and the information is not processed, the usual "get an error message" 534 and will be re-directed back to the hold account screen 530. If the information on the verification screen is correct, however, the User will submit it and will be taken to a confirmation screen 536 and then be directed back to the MA Home page 520.

Turning to FIG. 31, the User begins at the Customer Detail page 540, and selects "hold account." The User will be then taken to a hold account screen 542 (such as shown in FIG. 30B) and submit the information. A verification screen 544 will be displayed (e.g., as shown in FIG. 30C). If there is an error in the transaction and it cannot be processed, the User will see an error message 546 and the User will be re-directed back to the hold account screen 542. If the information on the verification screen 544 is correct, the User will submit it and the User will see a Confirmation Screen 548 and thereafter will be redirected back to the Customer Detail page 540.

Figures 32, 33:
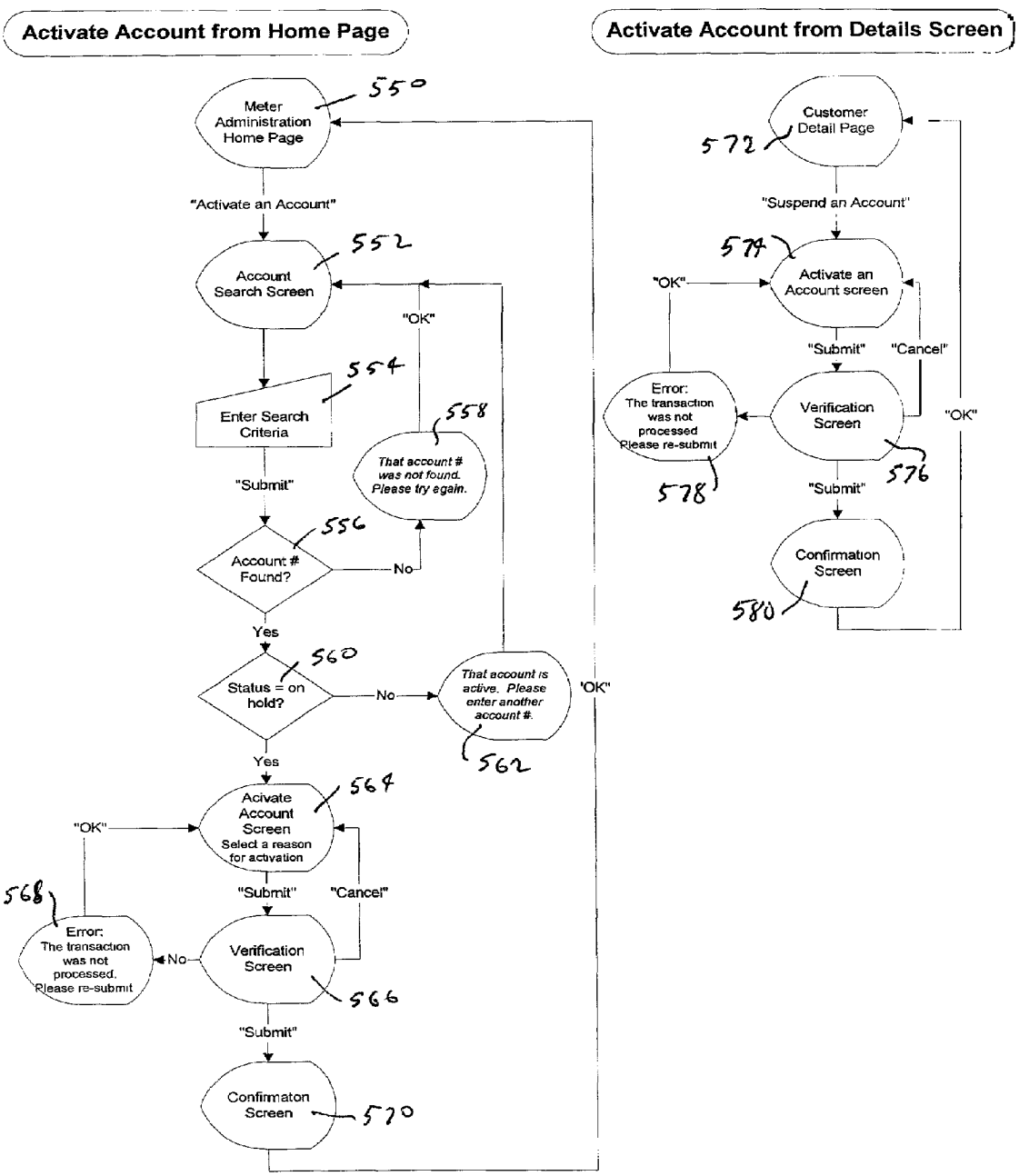
FIGS. 32 and 33 are two alternate routes to activate an accounts in the MA.

Turning back to FIG. 28, there are two routes to activate an account from the MA Home page, 402, the User will identify an account activate 410, verify the account 458, and confirm the activation 460. From the Customer Details Main page 420, the User will go to the Stamps.com e-mail history page 442, next go to the Stamps.com e-mail details page 444, select activate account 446, and finally confirm the activation 448. These two alternate routes to activate an account are explained in greater details with a reference to FIGS. 32 and 33, respectively. In order to activate an account from the Home page, as shown in FIG. 32, the User will begin at the MA Home page 550, will select "activate an account" button, and see the account search screen 552. The User will enter the search criteria 554 and submit this information. At decision tree 556, it will be determined whether the account number was found. If not, a message will be displayed that the account number was not found 558, and the User will be re-directed back to the account search screen 552. If the account number is found, a decision tree will determine if the status is set to "on hold." If not, a message will be given that account is active and to select another account number 556, and the User will be re-directed back to the account search screen 552. If the status is equal to on hold, then an activate account screen 564 will be displayed, an exemplar of which is shown in FIG. 32A. The User needs to select a reason for activation. Such reasons can include demo account re-opened, license cleared, printer approved, outstanding postage paid, outstanding service fees paid, QA envelope pass, QA envelope received, no fraud found, or general, and the User will submit the information, and verification screen 566 will be displayed. An exemplary screen print of such a verification screen 566 is shown in FIG. 32B. If the transaction cannot be processed, an error message will indicate that the transaction was not processed 568, and will re-direct the User back to the activate account screen 564. If upon submission, the transaction is processed, the User will see a confirmation screen 570 and will be re-directed back to the MA Home page 550.

FIG. 33 is a process flow to activate an account from the customer details screen 572. Beginning with a customer detail page 572, User will select suspend an account and will see activate an account screen 574. The User will submit the information and see a verification screen 576. If the User decides to cancel the transaction, the User will be re-directed back to the activate an account screen 574. If the information is incorrect, and the transaction cannot be processed 578, the User will also be re-directed back to the activate an account screen 574. If submission of the verification screen information is successfully processed, a confirmation screen 580 is displayed and then the User is re-directed back to the customer details page 572.

Figure 34:
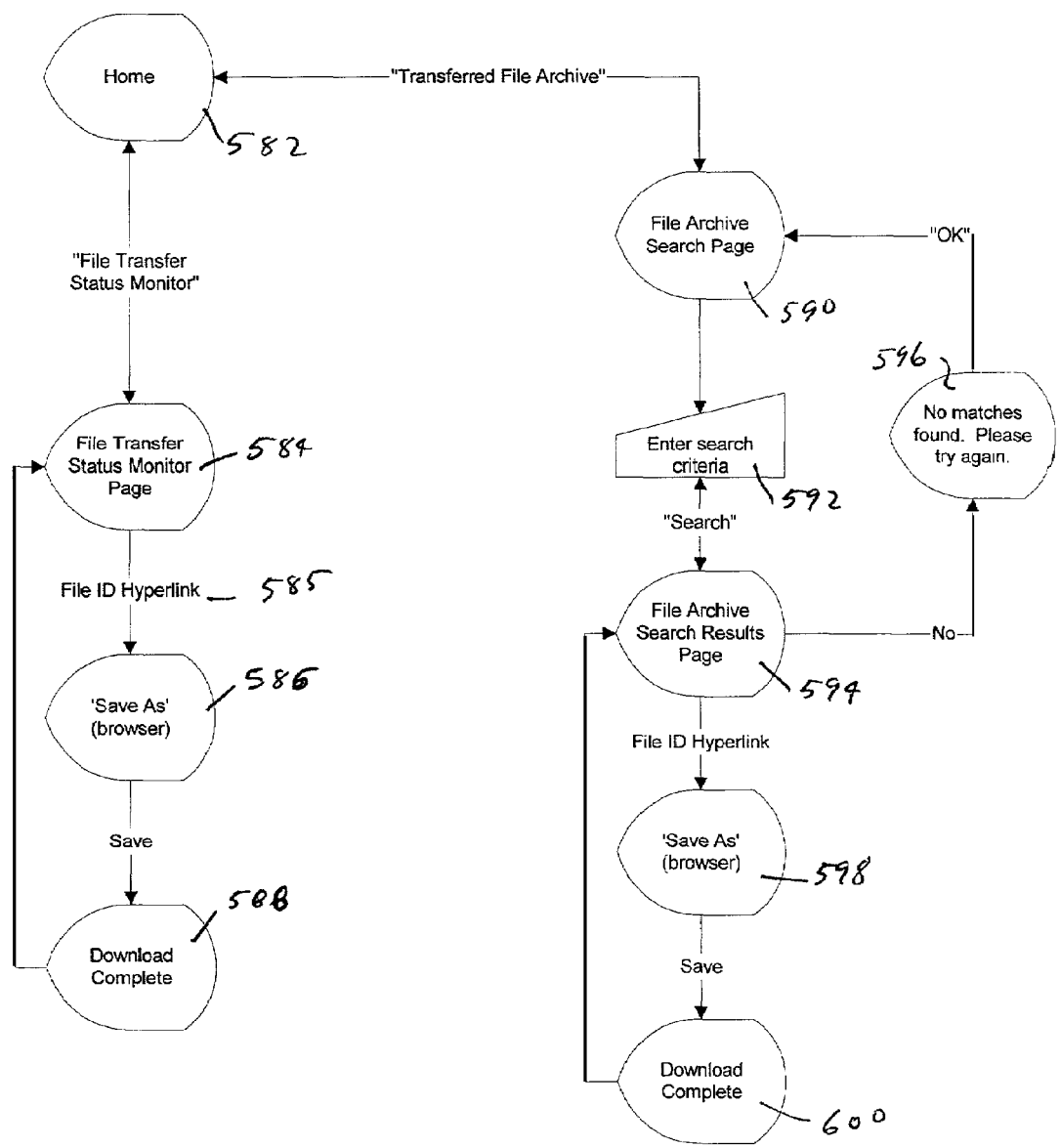
FIG. 34 is a file transfer and download process.
Figure 34F:
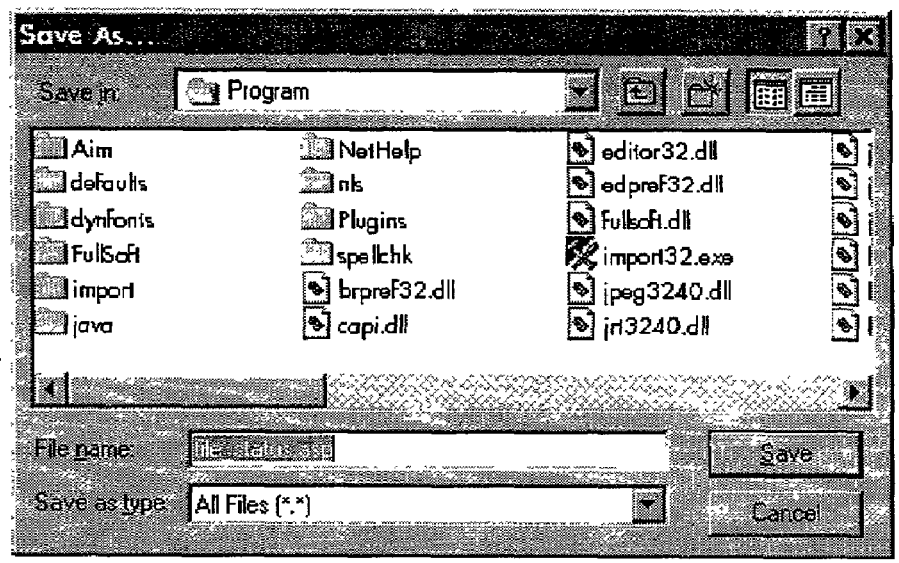

The file transfer status and file download process is shown in brief in FIG. 28. From the MA Home page 402, the User will select file transfer monitor 414 or file archive search 416. From the file transfer status monitor 414, the User can select download file 464 and from the file archive search 416, the User can select file archive search result 466, and then download the file. These processes are shown in greater detail in FIG. 34. From the MA Home page 582, in order to initiate the file transfer status monitor, the User will select the file transfer status monitor page 584, an exemplar of which is shown in FIG. 34A. The file transfer status monitor page includes a file ID number 585, the expected time of transfer 585A, the status of the file currently 585B, the time of the last status change 585C. The available files include CMLS License applications, CMLS License confirmation, CMLS approvals, CMRS address, CMRS movement, CMRS resetting, Citibank ACH, Citibank Receipt, Chase ACH, and Chase receipt. By hyper-linking on a file ID 585 from this screen, the User can download the selected file. FIG. 34B is a table listing the various statuses and their definitions. Turning back to FIG. 34, from the file transfer status monitor page 584, User will select the file ID hyper-link 585, and will re-direct it to a save as browser 586, an exemplary screen print which is shown in FIG. 34C. If there is a download file error, an error message will be displayed and the User can try again. If everything is correct, User can save the information and the download is complete 588, and the User will be directed back to the file transfer status monitor page 584. In order to implement the transferred file archive from the MA Home page 582, the User will select file archive search page 590 (an exemplary copy of which is shown in FIG. 34D), and the User will enter search criteria 592 and press search. There will be displayed the file archive search results page 594, a sample screen print of which is shown in FIG. 34E. By selecting a file ID hyper-link, the User will be taken to a save as browser 598, a sample screen print of which is displayed as FIG. 34F, and the User can save this information at which point the download is complete 600 and the User is directed back to the file archive search results page. If however at the file archive search results page, no matches can be found 596, an appropriate message will be displayed, and the User will be redirected back to the file archive search page 590.

Figure 35:
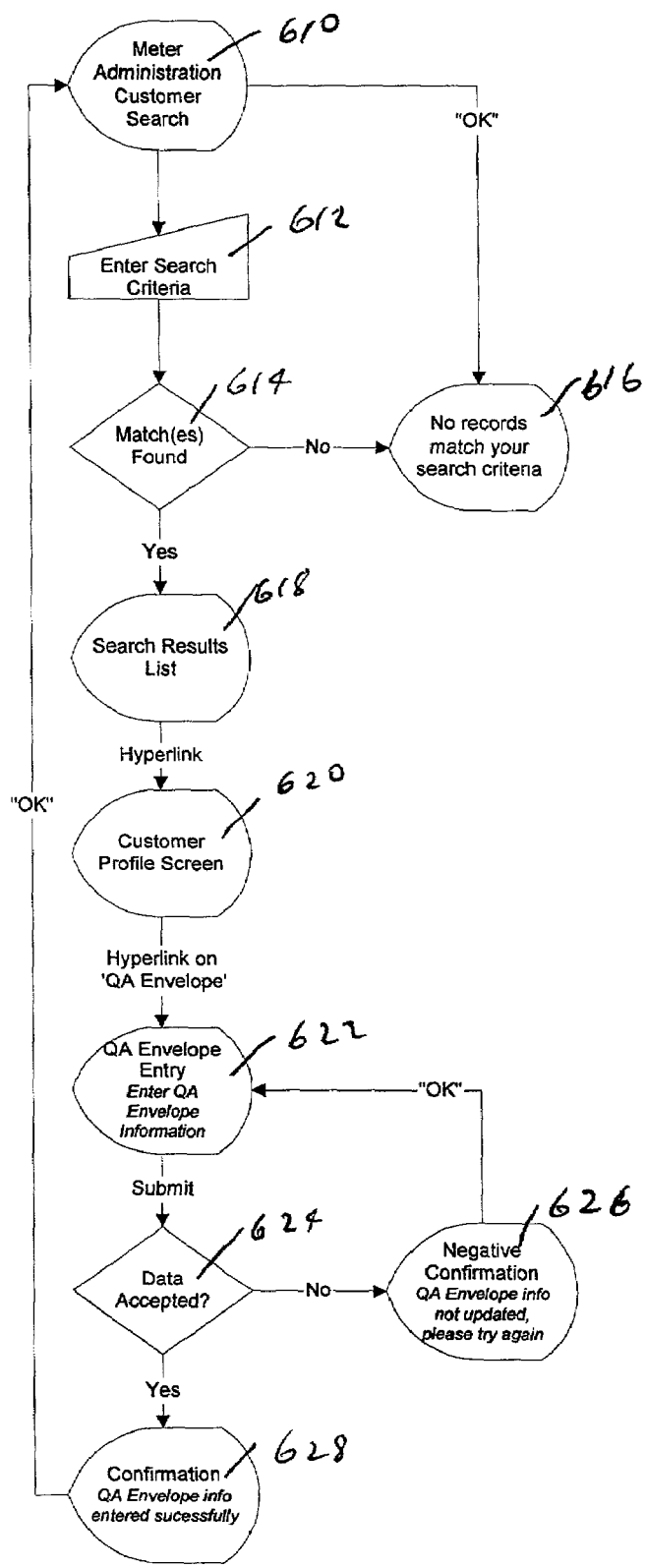
FIG. 35 is a QA envelope manual entry process flow.

Turning back to FIG. 28, the process flow of the QA envelope, the User can access the enter QA envelope information page 423 from the customer details main page 420. Or alternately, from the MA Home page from the upload QA envelope log 412 and then the upload confirmation 462. The QA envelope-manual entry process flow is shown in greater detail in FIG. 35. Again, for simplicity of the presentation, unique reference numerals are used in connection with this figure. Beginning at the MA customer search page 610, the User will enter search criteria 612, and be directed to a decision tree matches found 614. If no matches are found, a message will be displayed that no records match the search criteria 616, and the User will be re-directed back to the MA customer search page 610. If matches are found, then a search results list 618 will be displayed, and the User will select the hyper-link to the desired customer which will direct the User to a customer profile screen 620. The User can select a hyper-link on QA envelope and be directed to a QA envelope entry page 622, an exemplar of which is shown in FIG. 35A. The User will enter the QA envelope information on this page and submit it. At a decision tree 624, there is a determination whether the data is accepted. If not, a negative confirmation 626 is given and the User is directed back to the QA envelope entry page 622. If the data is accepted, a confirmation message that the QA envelope information has been successfully entered 628 is given, and the User is directed back to the MA customer search page 610. To upload the quality assurance envelope log, the User will begin at the MA Home page 402. An exemplar of the upload QA envelope log 412 is shown in FIG. 35B, and an upload confirmation 462 is given upon successful processing of the file upload. If an upload error occurs, then an appropriate message will be delivered.

Figure 36:
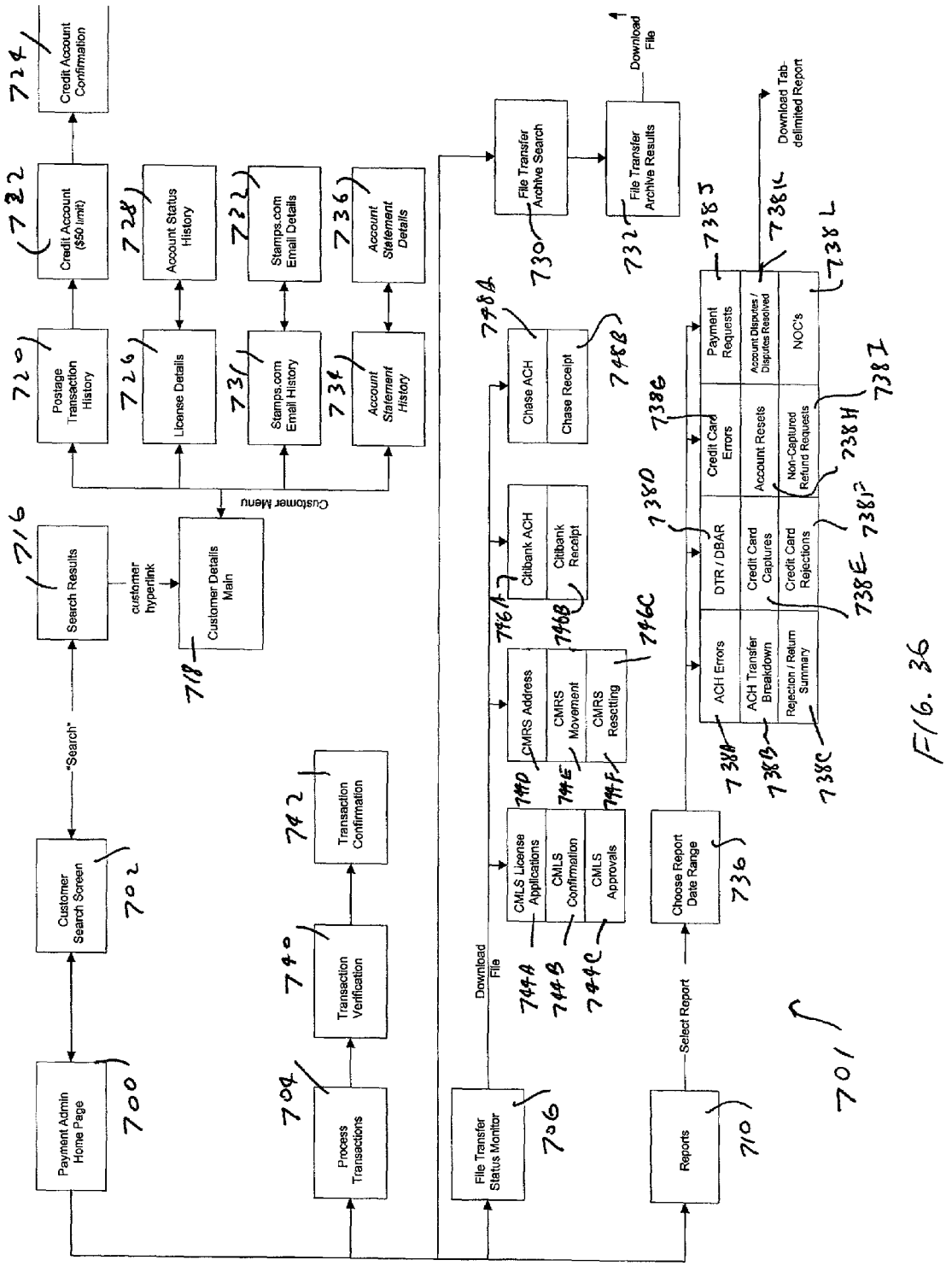
FIG. 36 is a payment administration process flow.

Turning back to FIG. 28, in order to access reports, the User will begin at the MA Home page 402, will select reports 406, and select the report and date range desired, and have the option to choose among various reports including licensee summary 468A (a screen print of which is shown in FIG. 36A), license application status 468B (an exemplar of which is shown in FIG. 36B), a password reset activity report 468C, a suspension status report 468D, a password reset activity report 468E, a suspension report 468F, a QA envelopes log report 468G (a sample screen print of which is shown in FIG. 36C), an activations report 468H, a VMLS confirmations/rejections report 468I (a sample screen print of which is shown in FIG. 36D), a withdrawal request report 468J (a sample screen print of which is shown in FIG. 36E), a withdrawn accounts report 468K, and finally a license updates report 468L. Lastly, from the customer details main page 420, a User can get an account reset transaction history 428, then select credit account 430, and finally credit account confirmation 432. Also, the User can get a Stamps.com account/statement history 450 and a Stamps.com account/statement details screen 452.

Figure 37A:
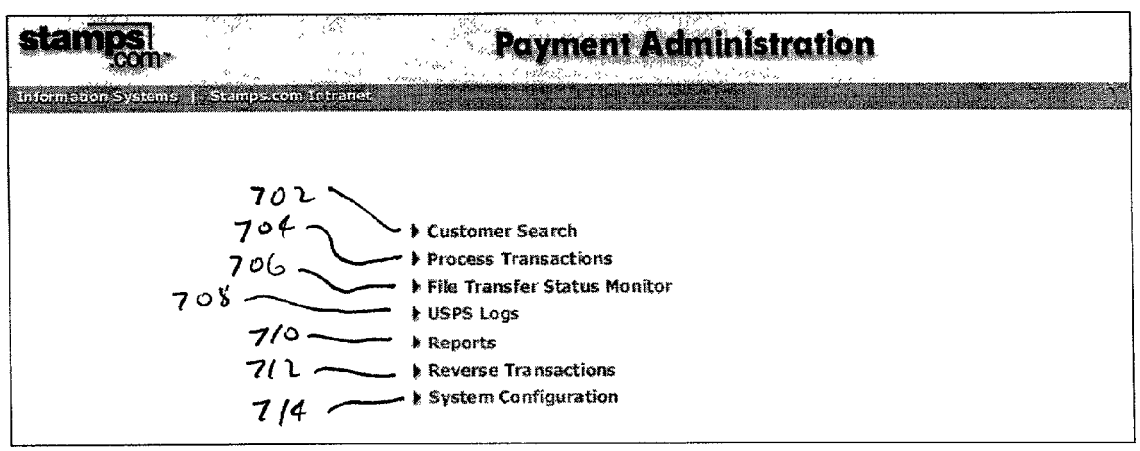
FIG. 37A is a screen print of the payment administration home page.

The next main part of the postal system intranet is the payment administration module 701. FIG. 37 is a screen flow of a payment administration module. FIG. 37A is an exemplary payment administration home page 700 screen print, and includes a customer search button 702, a process transaction button 704, a file transfer status monitor button 706, USPS logs 708, reports 710, reverse transactions 712, and systems configuration buttons 714, Turning back to FIG. 37, from the payment administration home page, the user can select customer search screen 702 and conduct a search to display search results 716. By selecting a customer hyperlink, a customer details main page 718 can be displayed. These page blue prints can be basically as shown in corresponding pages in the customer support module. From the customer's detailed main page 718, the user can select postage transaction history 720, the credit account 722, and a credit account confirmation 724. Account credit over limit and account credit error messages can be displayed in association with these pages. When the customer details main page 718, licensee details 726 and account status history 728 can also be displayed. Likewise, from the customer details main page 718, Stamps.com e-mail history 730 and Stamps.com e-mail detail 732 can be displayed, with similar screen prints as shown in the customer support module. Lastly, from the customer's details main page 718, an account statement history 734 and accounts statement detail 736 pages can be displayed again similarly as shown in the customer support accounts last statement history pages described further above. From the payment administration home page, the user can select process transactions 704, then transaction verification 740 finally, transaction confirmation 742.

From the payment administration home page 700, file transfer status monitor 706 can be selected and various files can be downloaded including CMLS license application 744A, CMLS confirmation 744B, CMLS approvals 744C, CMLS address 744D, CMLS movement 744E, CMLS resetting 744F, Citibank ACH 746A, Citibank receipt 746B, Chase ACH 748A, and Chase receipt 748B, the banks names Citibank and Chase are names of possible banks that may be used for financial transactions. Of course, other financial institutions can be named and by no means is this system limited to these identified banks. From the payment administration home page 700, the user can also select file transfer archive search 731 from which file transfer archive results 732 can be obtained, and files can be downloaded.

Figure 38B:
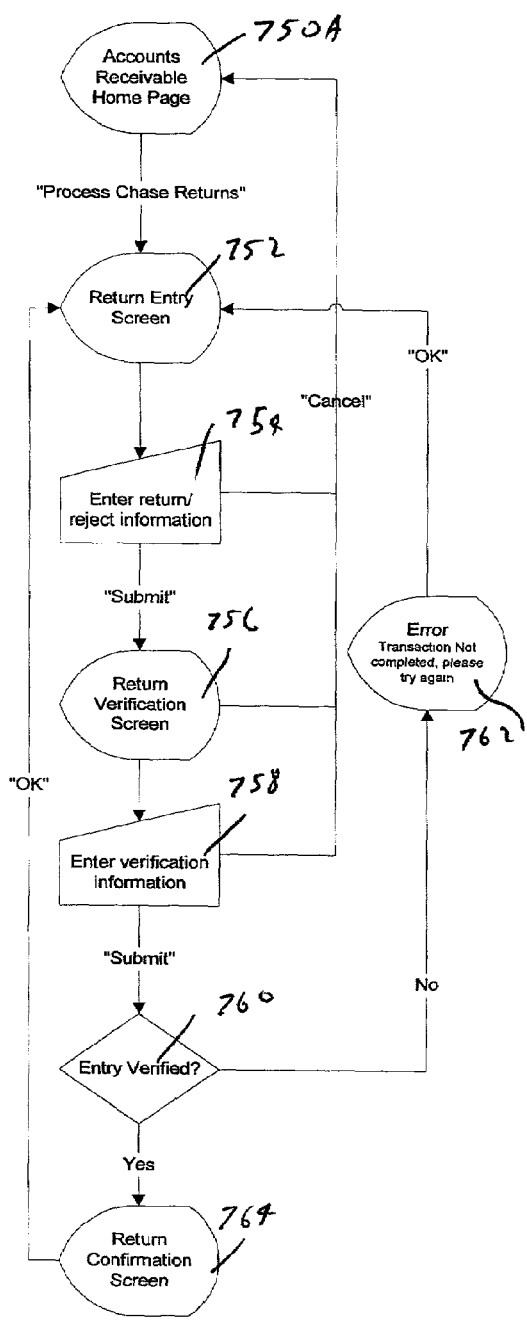
FIGS. 38A-B are process flows for ACH transaction processing.
Figure 38A:
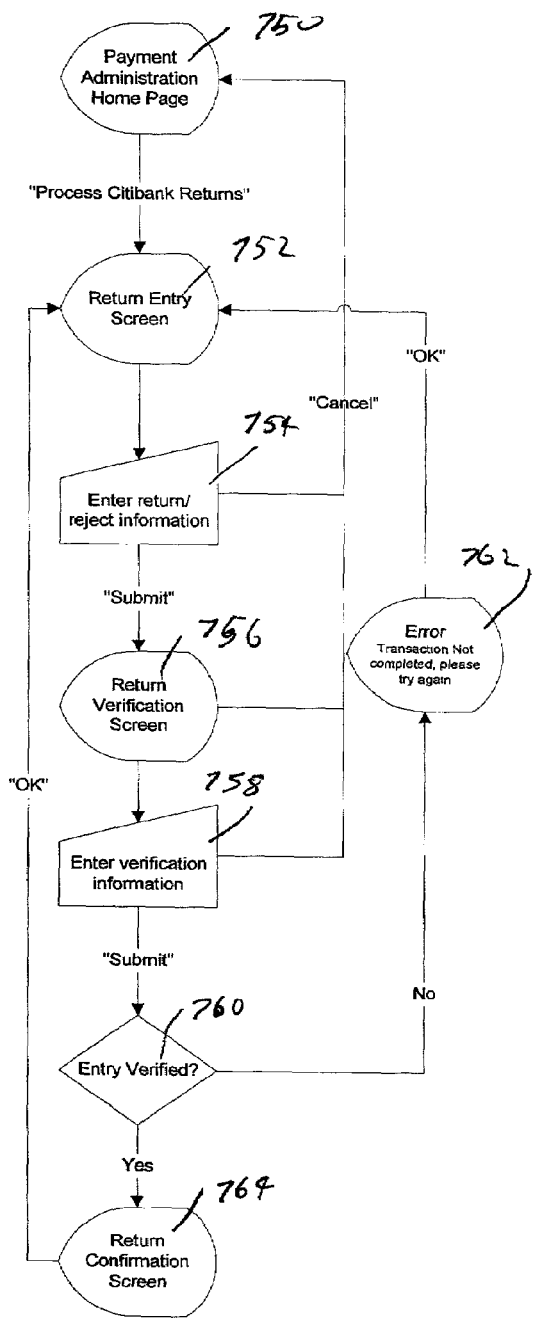

Turning now to FIGS. 38A and 38B, a process flow for ACH transaction processing is shown. Unique reference numerals are used in connection with the process flow of FIG. 38, even though this process begins with the payment administration home page. From the payment administration home page 750, the user will select "process Citibank returns", and a return entry screen 752 will be displayed. User will enter "return/rejection information" 754, i.e., via an entry screen, such as shown in FIG. 38B. Various ACH return and rejection codes are set forth in FIG. 38C. The information from the ACH transaction rejections and return screen FIG. 38A is submitted and the user will see a return verification screen 756. The user will then enter verification information 758 and submit the information. At a decision tree 760, the user will verify the entry, such as shown on exemplary page in FIG. 38D. If the information is not properly verified, an error message 762 will be given, the user will be returned to the return entry screen 752. If the entry is verified at 760, a return confirmation screen 764 will be displayed, and thereafter the user will be returned to the return entry screen. At any of the return entry/rejection information screens 754, return verification screen 756, or entry verification information screen 758, the user can cancel the process, and be returned to the payment administration home page 750. The process for Chase fees is identical, except that the process begins at an accounts receivable home page 750A, and the use will enter "Process Chase Returns" instead of "Process Citibank Returns" as shown in FIG. 38A.

Turning back to FIG. 37, from the payment administration home page 700, the user can select reports 710 and choose a report date range 736. Some of the available reports include ACH error reports 738A (an exemplary screen print of which is shown in FIG. 39A), ACH transfer breakdown 738B, a screen print of which is shown in FIG. 39B, and rejection/return summary 738C, a screen print of which is shown in FIG. 39C. Also accessible is a daily transaction report (DTR) and daily bank activity reconciliation (DBAR) reports, screen prints of which are shown in FIGS. 39G and 39H. Credit card captures report 738E is shown in FIG. 39D and a credit card rejections report 738F is shown in FIG. 39E. Additional reports include a credit card errors report 738G an accounts reset report 738H (see FIG. 39F), a non-captured refund requests report 738I (see FIG. 39I), a payment requests report 738J (FIG. 39J) an account dispute/disputes resolved reports 738K (FIG. 39K) and notice of cancellation (NOC report 738L, a screen print of which is shown in FIG. 39L).

Figure 40:
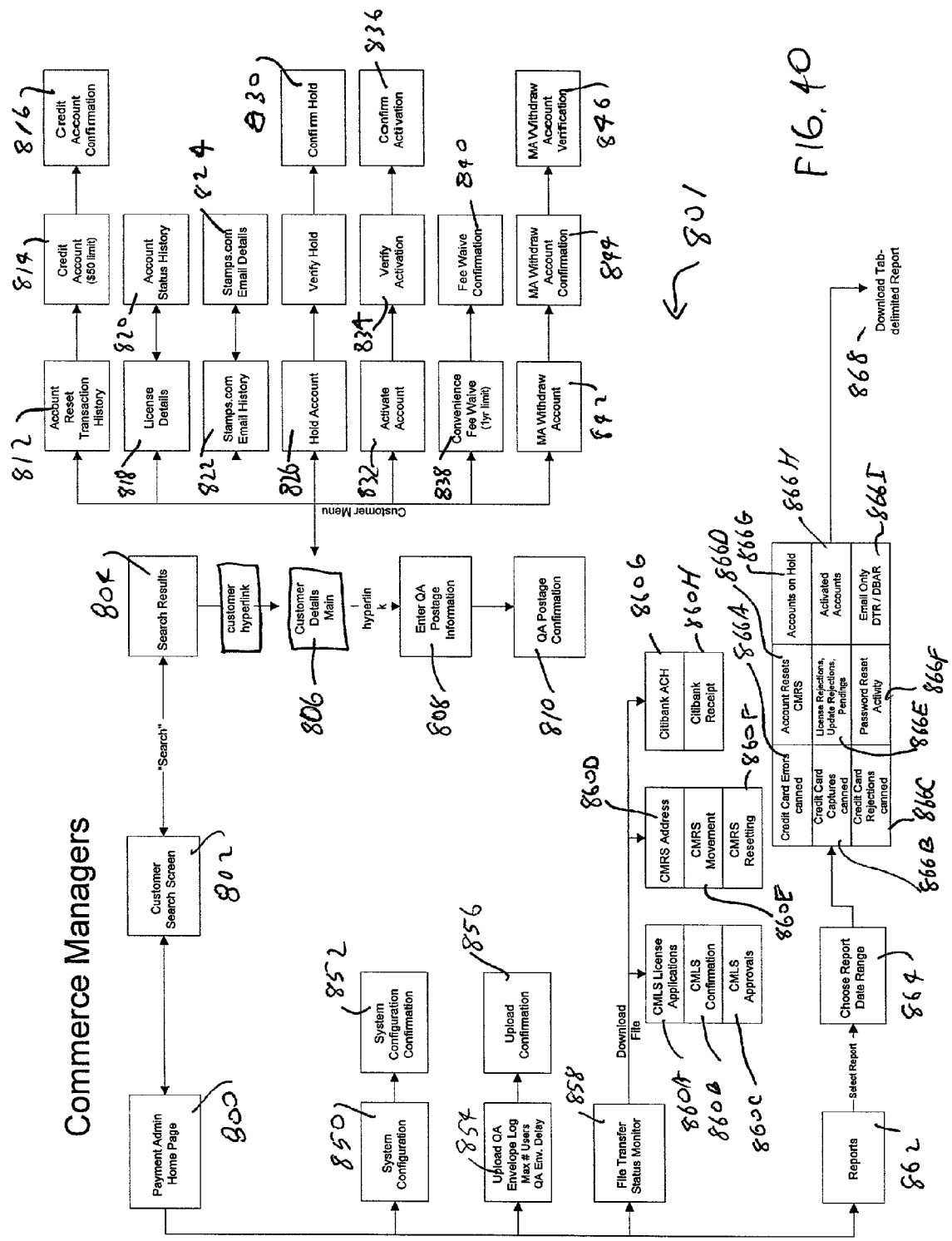
FIG. 40 is a process flow for Payment Administration Management.
Figure 41:
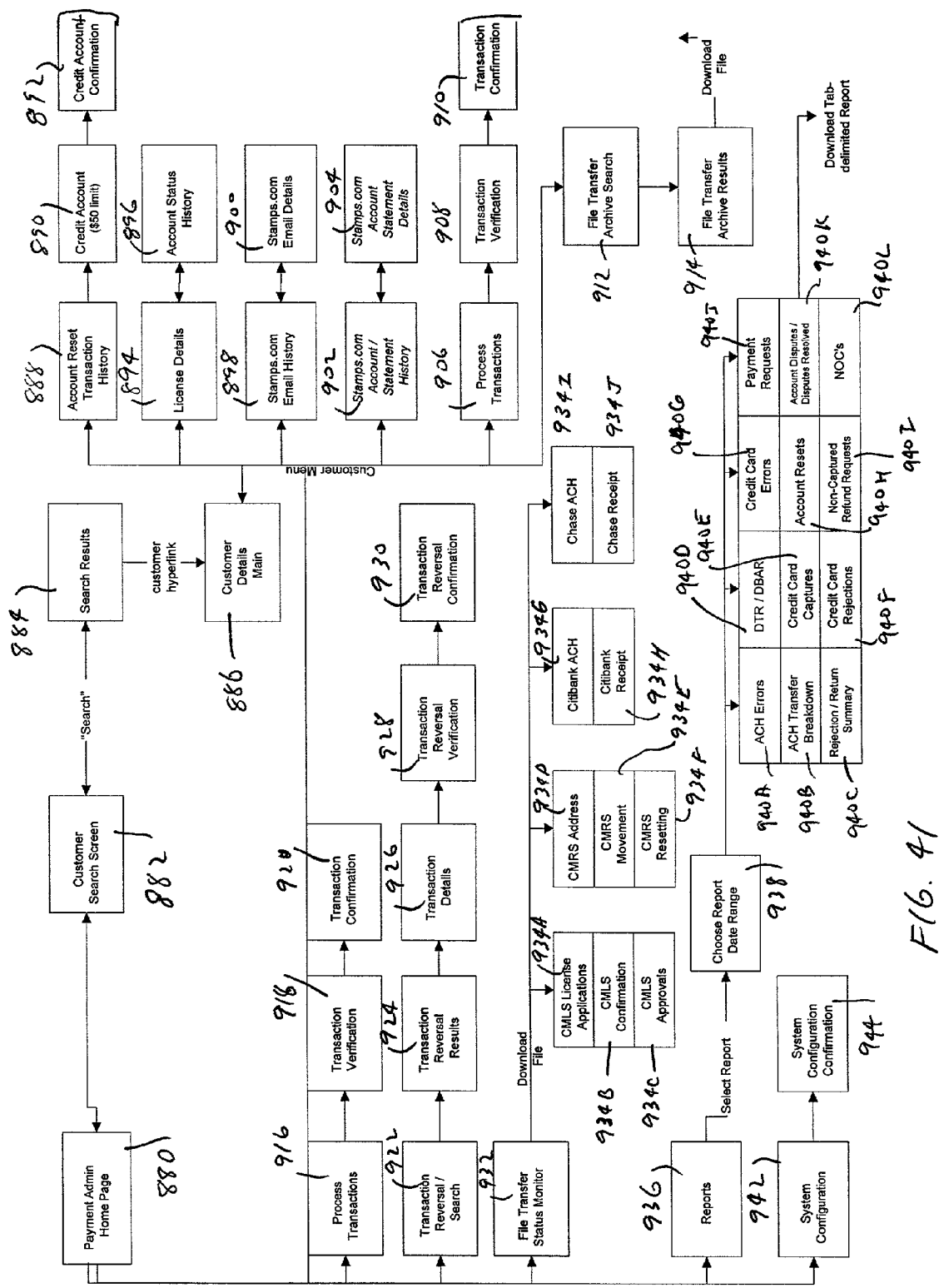
FIG. 41 is a process flow for Payment Administration Manager screen flow.

Payment Administration Managers (Commerce) Module 801, one embodiment of which is shown in FIG. 40. A second embodiment of a payment administration manager screen flow is shown in FIG. 41.

Turning first to FIG. 40, a user begins at the payment administration home page 800 and can select a customer search screen 802 and select search to see search results 804. By clicking on a customer hyperlink, the user is taken to the customer details main page 806. By entering on a hyperlink, user may enter QA postage information 808 and can obtain a QA postage confirmation 810. From the customer details main page, the user can access several screens. For example, the user can access the account research transaction history 812, from which the account credit screen 814 and then an account credit confirmation 816 can be viewed. Also, a licensee detail 818 and an account status history 820 can be seen. From the customer details main page 806, a Stamps.com email history page 822 and a Stamps.com email details page 824 can be displayed.

Also, from the customer details main page, the user can select "hold account" 826, verify the hold 828, and confirm the hold 830. Likewise, the user can activate the account 832, verify the activation 834, and confirm the activation 836. A convenience fee wave page 838 and a fee wave confirmation 840 can be displayed. Lastly, from the customer details main page, the user may select meter administration withdrawal account 842, meter administration withdraw account confirmation 844 and finally, meter administration withdraw account verification 846.

Starting from the payment administration home page 800, the user can select a system configuration page 850 and then get a system configuration confirmation 852, an exemplary screen print of the system configuration confirmation page 850 is shown in FIG. 43. From the payment administration home page 800, the user can upload QA envelope log 854 and display an upload confirmation 856.

The user can also from the payment administration home page 800, display the file transfer status monitor 858 and download various files including pages displaying CMLS license applications 860A, CMLS confirmation page 860B, CMLS approvals 860C, CMRS address 860D, CMRS movement 860E, CMRS resetting 860F, Citibank ACH 860G and Citibank receipt 860H. Lastly, from the payment administration home page 800, user can select reports 862, and select the report and choose a report date range 864 and access several different types of reports, including credit card error canned 866A, credit card captures canned 866B, credit card rejections canned 866C, account resets CMRS 866D, license rejections, update rejections and pendants 866E, password reset activity 866F, accounts on hold 866G, activated accounts 866H, and email only DTR/DBAR 866I. From any of these pages, the user can download tab-delimited reports 868.

Turning now to FIG. 41, from the payment administration home page 880, user can select the customer search screen 882, run a search and have displayed search results 884. By selecting a customer hyperlink, the user can be taken to the customer details main page 886. From the customer details main page, the user can display the account reset transaction history page 888, the credit account page 890, and then the credit account confirmation page 892. Also, a user can access a licensee details 894 and then the account status history 896. From the customer details main page 886, the user can also see the Stamps.com email history page 898 and from then the Stamps.com email details page 900. Further, the user can access the Stamps.com account/statement history page 902 and then the Stamps.com account/statement details page 904. Lastly, from the customer details main page 886, the user can have displayed the processed transaction page 906, the transaction verification page 908, and finally the transaction confirmation page 910. From the payment administration home page 880, user can also access the file transfer archive search page 912 and then a file transfer archive results page 914 and then download the selected file. From the payment administration home page 880, user can next select process transactions page 916 and then from there the transaction verification page 918 and finally a transaction confirmation page 920. From the payment administration home page 880, a user can also select transaction reversal/search page 922, a transaction reversal results page 924, transaction details page 926, a transaction reversal verification page 928, and finally a transaction reversal confirmation page 930.

From the payment administration page 880, the user can select file transfer status monitor 932 and then download various files, including a CMLS license applications 934A, CMLS confirmation 934B, a CMLS approvals 934C, and CSR address 934D, a CMRS movement 934E, a CMRS resetting 934F, Citibank ACH 934G, a Citibank receipt 934H, a Chase ACH 934I, and finally a Chase receipt 934J. These are just representative reports. Other reports can be downloaded as well.

From the payment administration home page 880, a user can also be directed to a reports page 936, select a report, choose a report date range 938 and from there select among twelve different reports, including ACH errors 940A, ACH transfer breakdown 940B, rejection/return summary 940C, DTR/DBAR report 940D, credit card captures 940E, credit card rejections 940F, credit card errors 940G, account resets 940H, non-captured refund requests 940I, payment requests 940J, account disputes/disputes resolved reports 940K, and finally NOC's reports 940L. The user may download tab-delimited reports.

Figure 42:
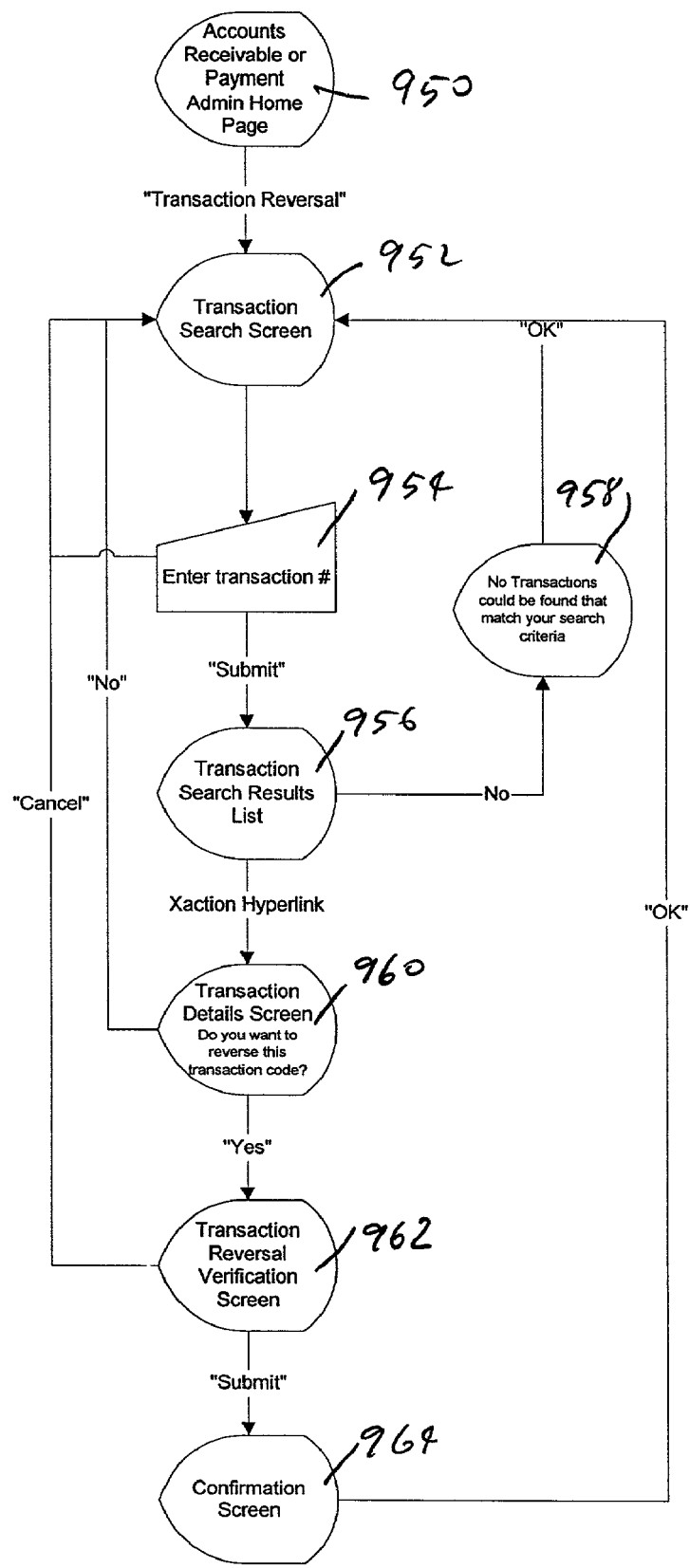
FIG. 42 is an ACH Transaction Reversal process flow.

Turning to FIG. 42, there is shown an ACH transaction reversal process flow 948. For convenience of presentation, unique reference numerals are used herein, although many of the steps are covered in process flows, discussed above. From the accounts receivable payment administration home page 950, a user will select transaction reversal, and be taken to a transaction search screen 952, a representative screen print of which is shown in FIG. 42A. The user will then enter the transaction number 954 and will submit it, enter a transaction search results list 956, a representative screen print of which is shown in FIG. 42B. If no transaction matches the search criteria 958, the user will be taken back to the transaction search screen 952. If there is a match, the user will hyperlink to a transaction details screen 960 and will be queried whether the user wishes to reverse the transaction code, and FIG. 42C is a representative screen print of this screen. If the user submits this information, a transaction reversal verification screen 962 will be displayed, and is shown in FIG. 42D. Upon submitting the information, a confirmation screen 964 is displayed, and the user is taken back to the transaction search screen 952. If the user does not submit the transaction reversal screen information, a message indicating that a transaction has not been reversed will be displayed and will inform the user that they need to revise the DBAR for the process date with the reversal and resubmit to the USPS finance. Likewise, if there is a transaction reversal error, a message will be displayed indicating that the transaction has not been processed and will indicate the error type and will instruct the user to resubmit the changes. Turning back to FIG. 41, from the payment administration home page 880, the user can select system configuration 942 and then the system configuration confirmation page 944. A sample screen print of a system configuration page 942 is shown in FIG. 43. That completes the discussion of the payment administration manager's pages.

Figure 44:
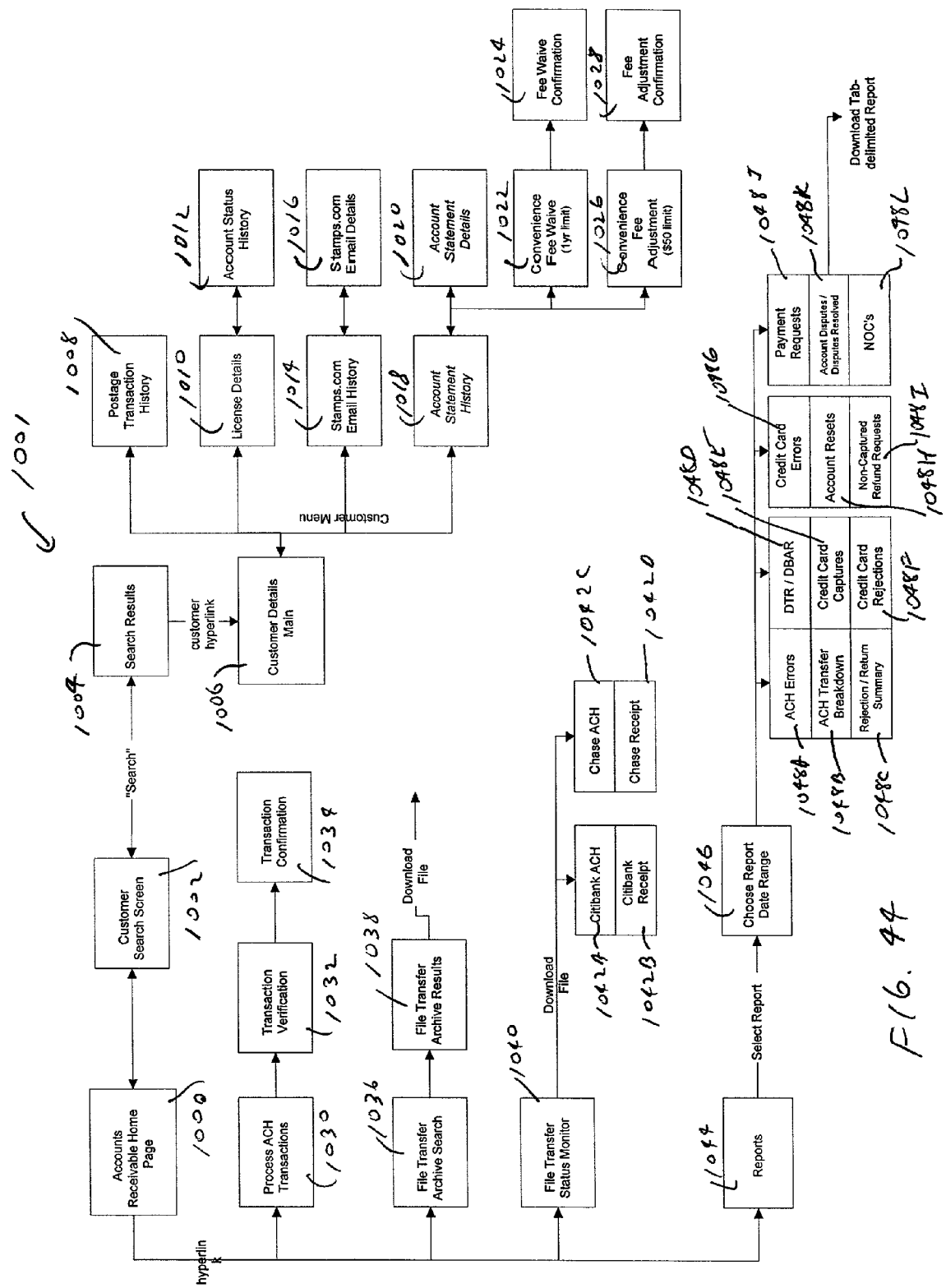
FIG. 44 is an Accounts Receivable screen flow.
Figure 45:
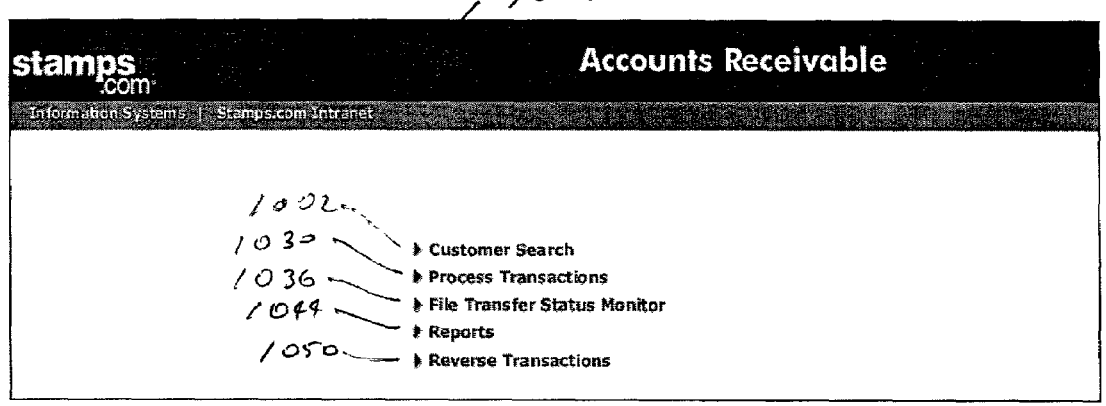
FIG. 45 is Accounts Receivable process.

The next major component of the system is the account receivable module, and FIG. 44 is a screen flow diagram thereof. From the accounts receivable home page 1000, a sample screen print of which is shown in FIG. 45, a user can select the customer search 1002, process ACH transactions 1030, file transfer archive search 1036, reports 1044, and reverse transactions 1050. Turning back to FIG. 44, from the accounts receivable home page 1000, a user can select customer search screen 1002, conduct a search, and be directed to a search results page 1004, click on a customer hyperlink to be delivered to a customer details main page 1006. From the customer details main page, the user can select postage transaction history 1008, or license details 1010 and then select account status history 1012, or Stamps.com e-mail history 1014, and then select Stamps.com e-mail details 1016, or finally select accounts statement history 1018. From the accounts statement history page 1018, a user can select an account statement details page 1020, or a convenience fee waiver page 1022 and then a fee waiver confirmation 1024, or a convenience fee adjustment page 1026 and then receive a fee adjustment confirmation 1028.

From the account receivables home page 1000, a user can be hyper linked to a process ACH transaction page 1030, then receive a transaction verification 1032 and then a transaction confirmation 1034. Likewise, a user can select file transfer archive search 1036, conduct a search and receive file transfer archive results 1038, and then download the desired file. A user can from the accounts receivable home page 1000, select file transfer status monitor 1040, and then download a file, can see screen prints for Citibank ACH 1042A, CitiBank receipts 1042B, Chase ACH 1042C, and Chase receipts 1042D. Finally, from the accounts receivable home page, the user can select reports 1044, select a report and choose a report date range 1046 and receive nine different reports, including ACH errors 1048A, ACH transfer breakdown 1048B, rejection/return summary 1048C, DTR/DBAR 1048D, credit card captures 1048E, credit card rejections 1048F, credit card errors 1048G, account resets 1048H, non-captured refund requests 1048I, payment requests 1048J, account disputes/disputes resolved reports 1048K, and NOC's 1048L. The user can then download a tab-delimited report. The screen prints for these various pages will be similar to those shown in the customer support home pages and/or the payment and administration home pages.

Figure 46:
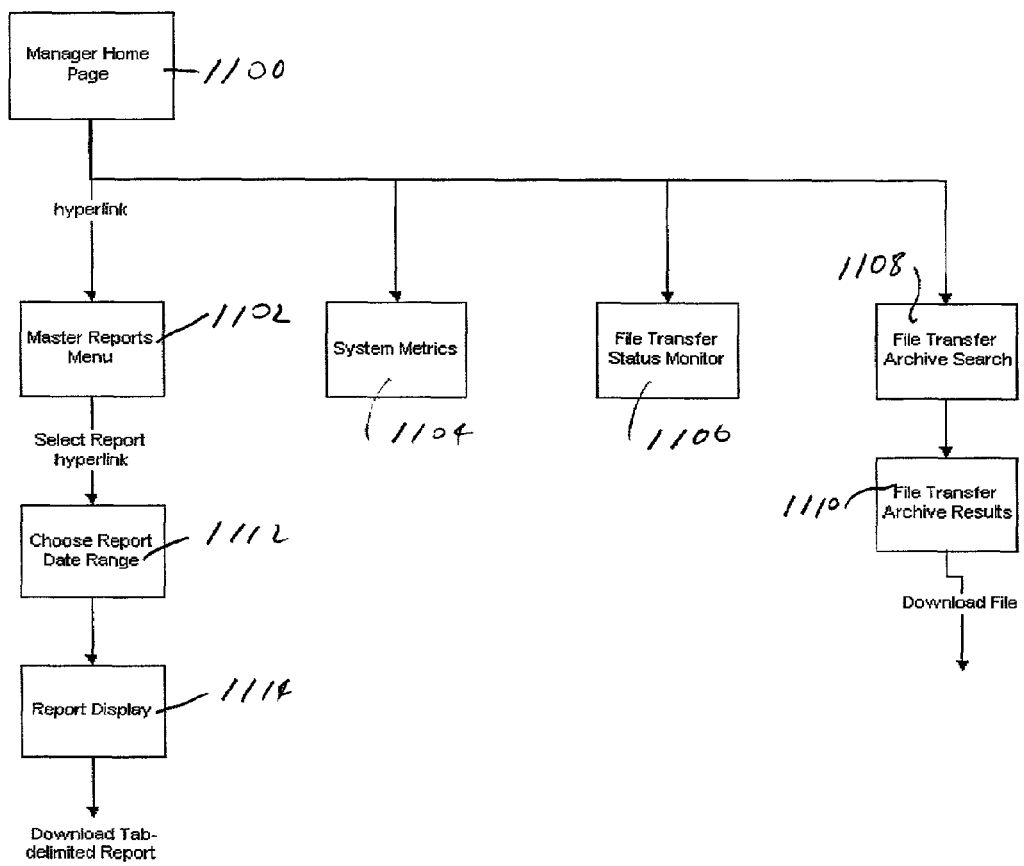
FIG. 46 is a Management screen flow.
Figures 47, 48:
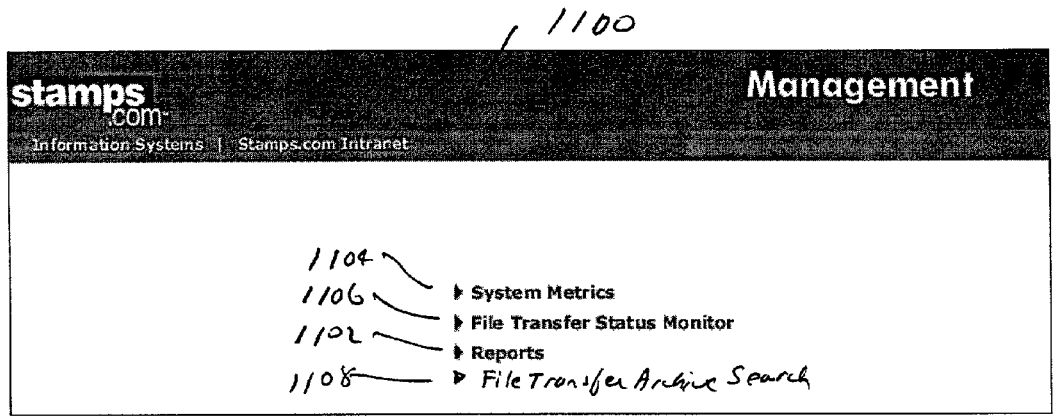
FIG. 47 is a Home page of the Management screen flow.
FIG. 48 is a chart of Systems Metrics.

The last module is the management screen flow 1101, the screen flow structure which is shown in FIG. 46. The last module in the postal system internet is shown in FIGS. 46 through 48, wherein FIG. 46 is a screen flow of the management module. Beginning with manager home page 1100, a user can select and be hyper linked to a master reports menu 1102, a systems metrics menu 1104, a file transfer status monitor 1106, and a file transfer archive search 1108. An exemplary screen print of the manager home page is shown in FIG. 47. From the master reports menu 1102, a user can select report hyperlink and choose a report date range 1112 and display a report 1114, and then download a tab-delimited report. From the file transfer archive search 1108, the file transfer archive results 1110 can be displayed and downloaded. The master reports menu can have a similar arrangement in appearance as the customer reports selection. FIG. 48 is a sample screen print of some of the systems matrix. The file transfer status monitor 1106 can have similar appearance as the meter administration file transfer status monitor and the file transfer archive search could have the similar appearance to the payment administration file archive search.

The next main module of the On-line Postage System is a Meter Refund & Withdrawal Processing Module. This software module will be run within the Stamps.com Secure Postal Network on a client machine. It will allow a Meter Administrator (MA) to finish the withdrawal process initiated from either the client or Customer Support (CS). The withdrawal process can be initiated by a Customer Support Representative (CSR) or Meter Administrator through the Postal Intranet only if the customer cannot use their client software. This initiation will be done through an HTML interface. The Refund & Withdrawal application will withdraw the meter and print an indicium for the full remaining meter balance. It will generate and print a USPS Form 3601-C form that will be sent to the USPS with the indicia for refund processing, along with a copy that will be retained and filed by Stamps.com. The Commerce Department at Stamps.com will implement additional physical security to control access to this application and the indicia printer. The Stamps.com R&D department will require password security and preferably additional security, such as SmartCard authentication to access this application. The Stamps.com Network Operations department (NetOps) may require biometric verification for access and this will be located in an enclosed and secure room.

The functions of the Meter Refund & Withdrawal Processing Module comprise Reports, Print, User Interface, and Customer Support User Interface. The Reports displayed on screen include a Withdrawal Request Report and a Withdrawn Meters Report. Printing functions include PS Form 3601-C for USPS (which should be signed by a Meter Administrator and mailed to the USPS), a PS Form 3601-C for filing—watermarked with "COPY", a Withdrawal Request Report, and a Withdrawn Meters Report. The User Interface includes a Run/Print Withdrawal Request Report and display, a Print Withdrawal Request Report, a Print PS Form 3601-C's, a Confirm proper printing on each individual PS Form 3601-C set, and a Run/Print Withdrawn Meters Report and display. The Customer Support UI will have a Customer Profile Display in HTML, and will have Account Status, and will show "Withdrawal Requested" and date after a request is made, and will show "Withdrawn" and date after a meter is withdrawn. This is the primary indication that the customer's account is closed. Having described the Meter Refund & Withdrawal Processing Module in brief, this module will now be described in greater detail.

Turning to the Refund/Withdrawal Process Flow, the withdrawal can be initiated through the client, or through Customer Support. For withdrawal initiated through the client, the process is as follows. When the Customer chooses to close their account, the customer, in essence, surrenders their meter.

Figure 49:
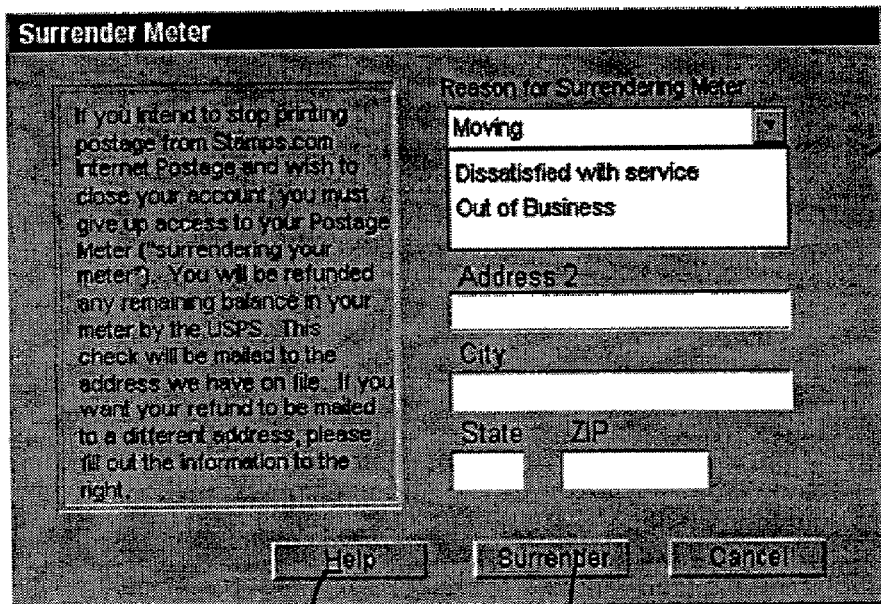
FIG. 49 is a screen print of a Refund/Withdrawal process flow.

First, the Customer initiates the Withdrawal function in the Stamps.com client software. FIG. 49 is a "Surrender meter" screen print 1200. The additional information required to complete a PS Form 3601-C form should be gathered—most information already exists on Stamps.com servers. Client should prompt customer to fill out additional information required, including a mailing address if different from the one on their license—this will require a client UI. If Customer provides a new mailing address, their mailing address will not be changed on the Postal Servers, this address will be held only to generate the PS 3601-C. Customer should enter a reason for Withdrawal from a pick list in this UI. The reason for withdrawal that is printed on the PS Form 3601-C is "Cancellation" as mandated in the IBIP specification. Stamps.com can ask for an additional internal reason in this dialog if necessary or if desired. Some possible reasons for surrendering can include: No use for software anymore; Too expensive; Difficulty connecting; Too much lost postage due to printing mistakes; No support for windowed or pre-addressed envelopes; Incompatibility with other software; Requires printing of address and postage indicia 'stamp' together; No longer have significant mail volumes; and/or Poor customer support. A "HELP" button 1202 to screen to link to Help file for more information on withdrawal. The surrender meter 1200 can also ask a second question in the dialog, namely, "What product/service will you now use for your postage needs?", and present the options: Regular stamps; Postage meter; Alternative Internet Postage product; or Other with box for text (not shown.) The Customer then clicks the "Surrender" button 1204.

Figure 50:
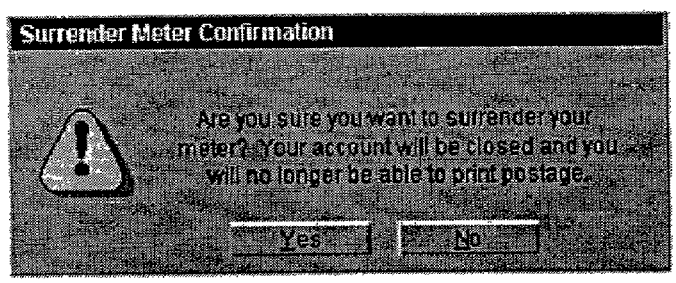
FIG. 50 is a screen print of the Surrender Meter Confirmation.
Figure 51:
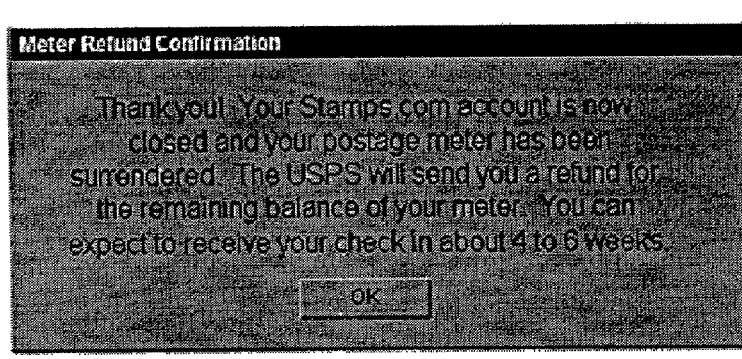
FIG. 51 is a dialog box Meter Refund Confirmation.

Next, referring to FIG. 50, a screen print of the Surrender Meter Confirmation 1206 is displayed. There is no default button—user should choose Yes or No—or—user should manually type 'Y-E-S' to choose yes. If the customer hits "No", it cancels the meter surrender. This does not save the reason for revocation or the mailing address. If the customer hits "Yes", a dialog box Meter Refund Confirmation 1208 as shown in FIG. 51 is displayed. If the customer chooses "Yes", there is no way internally to stop the Withdrawal or the refund, regardless of when it is actually processed. Of course, the wording can be modified as desired. The User has the option to export print logs at this time. If user declines export, print logs will be overwritten when client is re-started or uninstalled. Finally, the Client shuts down. At this point, the only option available is re-registration.

Next, change the Meter Status to "Withdrawal Requested" status. This state disables all functionality in the client except registration (it is desirable to leave the option for the user to be able to re-register for the service with the same software). The customer will not be able to print or purchase postage, however, this state flags the meter as ready and clear for withdrawal processing, the customer's convenience fees are stopped as of this date, and an email is sent to the customer, notifying them of their withdrawal and end of service.

Figures 52, 53:
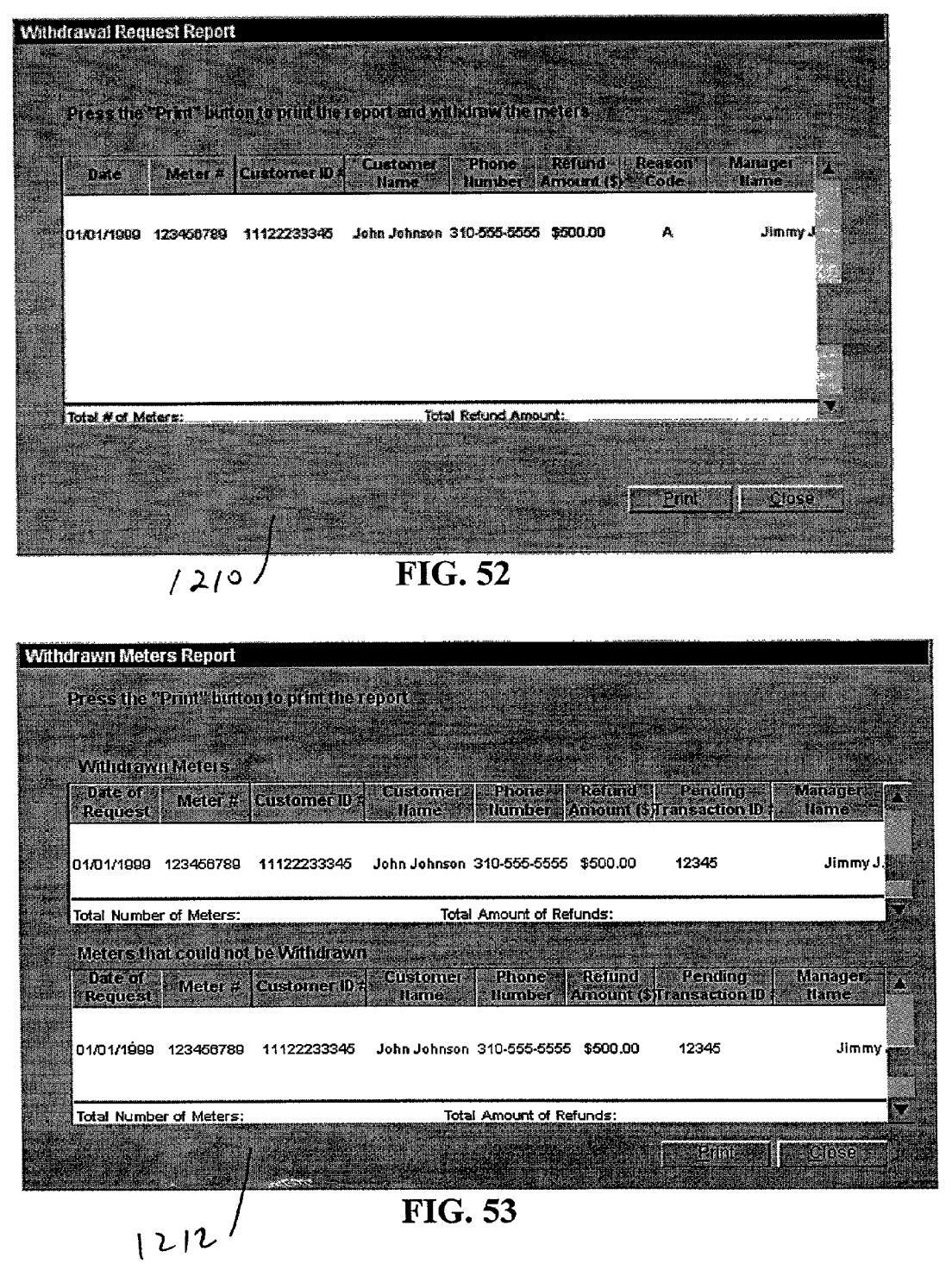

Next, Daily/Weekly Processing takes places. The Meter Administrator runs a report of all Withdrawal/Refund Requests at a regular time decided by Network Operations. Reports can be displayed on screen before printing to see if any requests are pending. If no requests are pending, report does not have to be printed. Withdrawal Requests are date dependent. This report will find all meters in a "Withdrawal Requested" state, that have been in that state for 14 days or longer. Other periods can also be used. The USPS requires that Stamps.com wait 14 days for a transaction to clear before processing the refund. The Withdrawals Requested Report is printed. FIG. 52 is a exemplary screen print of a Withdrawal Request Report 1210.

Next, "Create" a 3601-C form electronically with existing customer data and new input. The PS Form 3601-C information is saved in the database along with the date and time. The record should have a Transaction Activity Code='9' for "Cancellation." The record should have the Transfer or Refund Indicator='R' for refund. The software should automatically check the "Withdrawal" box, automatically check the "Cancellation" box, and automatically set the "Amount of Refund" to equal the descending register of the old meter. *The amount of refund MUST equal the descending register*.

In the next step, print two (2) copies of PS Form 3601-C for each Withdrawal request are printed. PS Form 3601-C PS Form 3601-C is printed with Refund Indicia as specified by USPS-address. One copy is for USPS and is signed by the Meter Administrator. As soon as this indicia is generated, the PSD is completely shut down and will not function. One copy is for Stamps.com and is printed with a watermark "COPY". This copy is filed with the Withdrawal Report for the day. The UI will repeat for each request on the Withdrawal Report. The Meter Administrator should confirm accurate printing after each print set (both copies) of PS Form 3601-C. UI will ask if the forms are printed properly. If the form(s) did riot print properly, the Meter Administrator can immediately reprint the form(s). All pending financial transactions should reach some finality before a meter is withdrawn. A pending financial transaction cannot be left unresolved; it should reach a state of Approved or Rejected. The software runs a check on each meter before it prints the 3601-C or the refund indicia. If there are any unresolved transactions, the PS 3601-C will not be printed. The user will be prompted with a simple dialog that states: "This meter cannot be withdrawn, transactions are pending." The software will remember that the meter cannot be withdrawn and this will be noted in the Withdrawn Meters report. The print information is logged and can be re-created in the Transaction Server if a misprint occurs. The MA verifies that there were no printer errors, but does not check to see that the indicia reflect the correct values. The meter in the PSD is completely de-activated once the withdrawn state is assigned after the USPS receives the PS 3601-C form.

Thereafter, the Stamps.com account is closed. The Stamps.com billing is stopped when the original withdrawal request was made, the meter balance is zeroed upon printing of indicia, the meter Status is changed to Withdrawn, date, the comment entered from client UI, and an email is generated from Site Server letting the customer know their meter has been withdrawn and the USPS will send them a check for the refund amount.

Next, a Withdrawn Meters Report is run. A sample screen print of the Withdrawn Meters Report 1212 is shown in FIG. 53, and displays the meters withdrawn and amount, and the meters that could not be withdrawn due to pending and unresolved transactions. The Withdrawn Meters Report should be attached to copies of PS Form 3601-C and filed for reference.

Next, mail the PS Form 3601-C forms to USPS, file PS Form 3601-C copy, make a CMRS report records meter change as required, and finally, the CMLS report optionally records the meter change. That completes the steps taken when the withdrawal is initiated through the client.

The steps for withdrawal is initiated through Customer Services (CS) are as follows.

First, CS receives a request from a customer for withdrawal. The only acceptable reasons are that software will not run or a server connection cannot be made. As long as the client is functioning, the customer should withdraw through client.

Next, CS verifies the customer's identity by looking up customer through normal CS HTML interface. Verifies based on customer information, such as SSN, Tax ID, EID or keyword. This verification information is the same as that used to verify a request for lost password recovery.

Figures 54, 55:
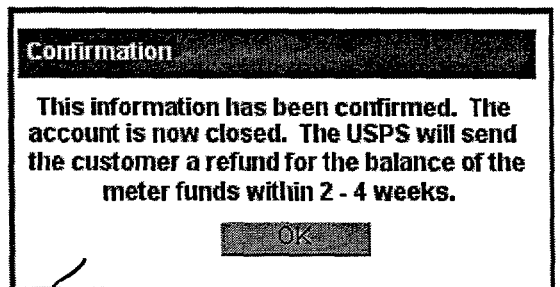
FIG. 54 is a screen print of the Withdrawal meter.
FIG. 55 is a screen print of a CS confirmation.

Next, CS launches the HTML Withdrawal user interface (UI.) This is launched from a hyperlink on the Customer Profile screen. CS records reason for withdrawal, and asks the customer if their mailing address is current (as displayed on Profile screen.) If No, CS records new mailing address. A sample screen print of the Withdrawal meter 1214 is shown in FIG. 54.

Next, CS should get a Manager to continue processing. The Manager should supply UserName and Password to submit. CS should call manager over to their workstation. A CS Manager or Meter Administrator can have unrestricted access to the confirmation screen and can process without assistance.

Figure 56:
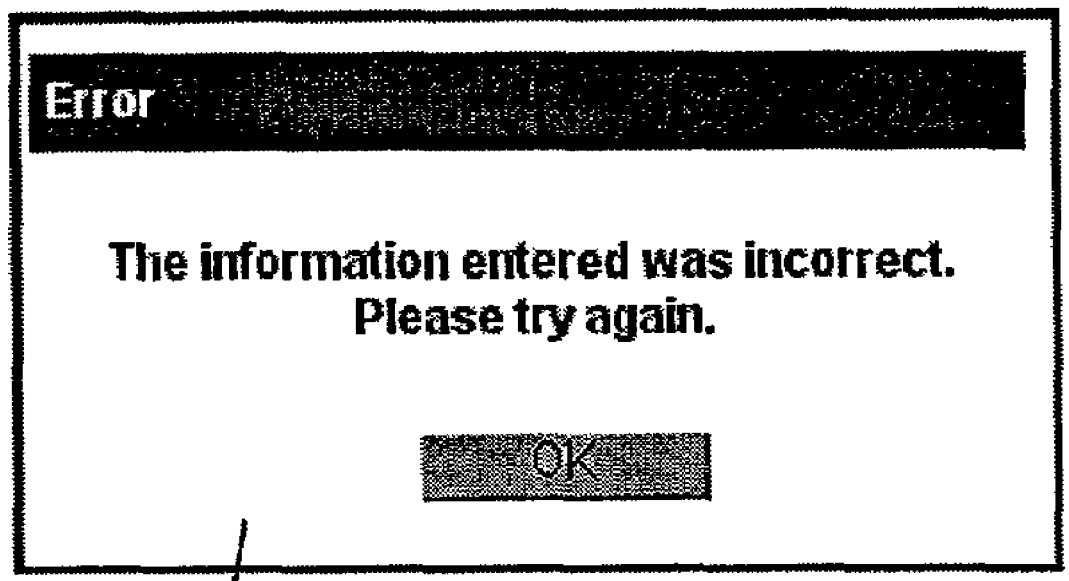
FIG. 56 is an error message.

Thereafter, the CS Manager or MA confirms withdrawal and amount, and clicks "OK to Withdraw" on the interface. The Meter Status is changed to "Withdrawal Requested" just as initiated through the client. If the information matches, CS gets confirmation, a sample screen print 1216 of which is shown in FIG. 55. If the information does not match, an error message 1218 is displayed, such as shown in FIG. 56, and the user is asked to try again.

Lastly, the withdrawal is processed as above. The meter status is now Withdrawal Requested, just as if the request was made through the client, and the steps noted above with respect to withdrawal is initiated through client are followed.

Figure 57:
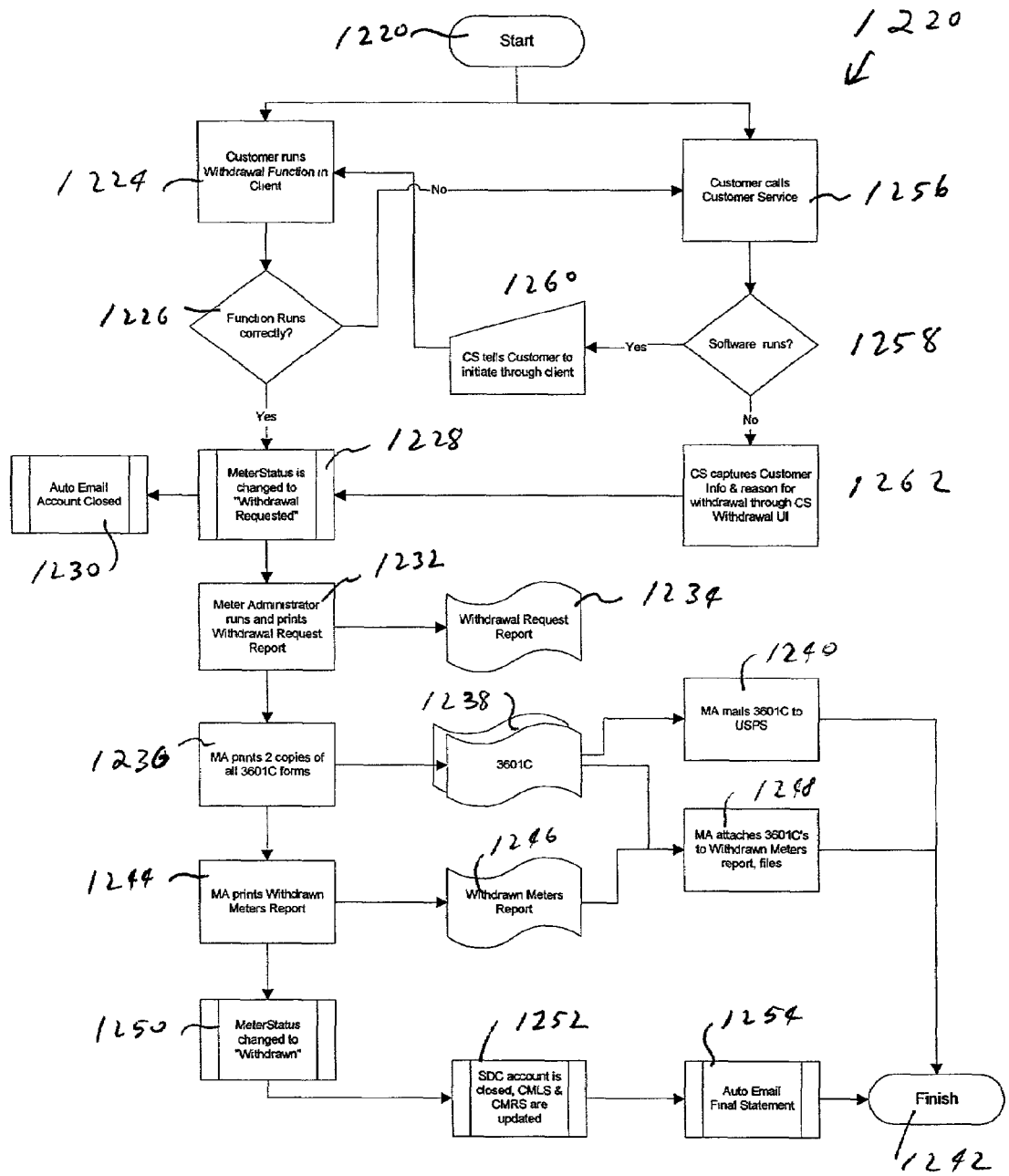
FIG. 57 is a Refund/Withdrawal Processing Flow Diagram.

Turning to FIG. 57 there is shown a Refund/Withdrawal Processing Flow Diagram 1220, that includes withdrawal initiated by either the client or through customer service. From start 1222, customer runs the withdrawal function in client 1224. If function runs correctly 1226, then the Meter Status 1228 is changed to "withdrawal requested" and an auto Email is sent notifying customer that their account is closed 1230. The Meter administrator runs and prints a Withdrawal Request Report 1232 and 1234. MA prints two copies of all PS 3601-C forms 1236 and 1238, and MA mails them to the USPS 1240. The MA then prints the Withdrawn Meters Report 1244 and 1246 and MA attaches them to the Withdrawn Meters report and files them 1248. The Meter Status 1250 is changed to "withdrawn", the Stamps.com account is closed, CMLS and CMRS are updated 1252, an auto Email Final Statement 1254 is sent to customer, and the process is finished 1242. If the customers call CS 1256 and the client software runs 1258, then CS instructs customer to initiate the withdrawal through the client 1260, in which case the process flow is directed to 1224. If the client software does not function properly, the CS captures the customer information and reasons for withdrawal through the CS withdrawal UI, and the process is directed to 1228, and continues until completed.

The following scenarios are examples of Refund rules, Reports, PS Form 3601-C printing, refund UI, and Refund Operational procedures in two scenarios. In a first scenario, the Customer requests an ACH payment. Stamps.com resets meter with requested amount. Within 10 business days (or some other time period), customer requests a refund and withdrawal of meter. The ACH request has not necessarily cleared by then. Stamps.com generates PS Form 3601-C with refund indicia for full meter amount. The PS Form 3601-C is mailed to USPS for processing, and the ACH request is returned for NSF.

In another scenario, the Customer requests an ACH payment. Stamps.com resets meter with requested amount. The ACH request is returned for NSF. The Customer requests a refund and withdrawal of meter. Stamps.com generates PS Form 3601-C with refund indicia for full meter amount, and a PS Form 3601-C is mailed to USPS for processing.

FIG. 58 is a sample screen print of a Withdrawal Request Report 1234 and FIG. 59 is a sample screen print of a Withdrawal Meters Report 1246. The Withdrawal Meters Report 1246 shows both the meters actually withdrawn, and the meters that could not be withdrawn due to unresolved transactions. All reports can be displayed on screen, printed, and 'saved as' in standard tab delimited format. The specifications for form PS 3601-C are shown in FIG. 60.

Figures 62, 63:
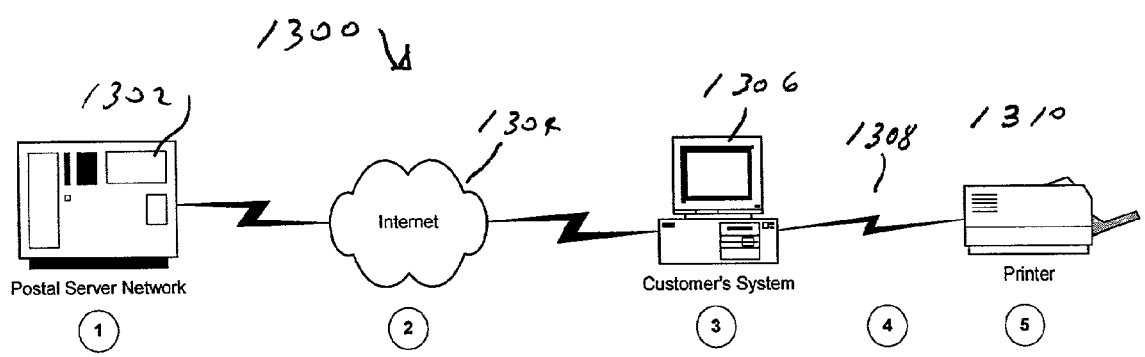

Turning to Refund Indicia, the specifics are prescribed by the USPS. The format and byte length are the same as normal indicia. Indicia amount may not be greater than existing limit of $17,000.00, based on the Ascending register. Preferably, delivery point and rate category fields are zeroed out, and the Indicia Version number is the first field in the barcode is one byte long. FIG. 61 is a table 1272 showing the values to be used for these fields. The Algorithm ID is the second field in the barcode and is also one byte long. FIG. 62 is a table that shows the values to be used for the fields. All other values for these fields are reserved for future use, to be determined by the Postal Service. The ascending and descending registers are both adjusted as normal, and the refund indicia print is the last action the PSD can make, and it cannot be reset. The refund indicia may or may not contain the Stamps.com logo.

Another important module in the On-line Postage System is a Misprint Processing Module. There is a chain of events that must be correctly executed to print indicia with the Stamps.com system. Any major disruption in any of these events may lead to a misprint, or non-print, of an indicia. Because customers trust the system to print correctly, the system should be able to deal with the possibility of a misprint and its implications. The USPS will not assume the responsibility in any way for crediting either misprints or unused postage, and will not credit users if an account is debited and an error occurs with the actual printing (resulting in a non-print). In the Stamps.com system, there will be an error log system in place to track some of the errors that could be made on the Stamps.com network. These logs will be available to Customer Support offline. All misprints requests should be considered on a case by case basis, looking at customer activity, customer volume and past history in requesting misprints credits. Because crediting a users account or meter directly results in loss to Stamps.com and is not reimbursed by the USPS, a definitive misprints policy should be created to ensure this function is not abused.

In describing the Misprint Processing module, the following definitions will be used. "Unused Postage" is postage indicia that has been printed correctly but the customer has chosen not to use. This is at the customer's discretion. The USPS may credit the customer for unused IBIP postage, but this process has not yet been defined. Stamps.com is assuming there will be no method in place by product launch to accommodate this type of refund. "Misprinted Postage" is postage that has been printed but which cannot be used for mailing purposes due to condition, placement or adhesion characteristics on the label or envelope for a particular mailpiece, and for which a "proof" of condition exists. The USPS will not credit the customer in any way for misprinted postage. "Proof of Condition" is the physical example of invalid postage that has resulted in a debit to the customer's Stamps.com account for the above reasons, and which cannot be used for mailing purposes. "Reimbursement Postage" is a customer request for reimbursement of postage debited but not produced, and which cannot be substantiated by physical proof or evidence of a program failure. Postage that is not produced may be a result of user error, an error on the Stamps.com Postal servers, or an Internet connection error. The USPS will not credit the customer in any way for postage debited but not printed—there is no way to prove that nothing was printed.

FIG. 63 shows the five places involved in the printing chain 1300 of events that can cause indicia to misprint or not print at all. These are at the Postal Server Network (e-Meter, Servers, Routers) 1302, the Internet Connection 1304, the Customer's hardware and client software 1306, at the printer connection 1308, and at the printer 1310. True "Misprinted Postage", as defined above, will most likely occur at the printer 1310. Any error in 1302, 1304, 1306 or 1308 would most likely result in a non-print, or "Reimbursement Postage".

In the Stamps.com system, the e-Meter (cryptographic module) and Postal Server design will inherently prevent errant confirmation of indicia printing, so the errors that could be encountered on the server side are related to moving that indicia from the e-Meter to the internet connection (error type #2.) Hardware or software failure or overload could potentially prevent or alter this transmission. Any errors in creating and sending indicia out of the vault will be recorded in an internal server exception log. This is the only case where we Stamps.com can 100% verify errors, as it is highly regulated and tightly controlled. This is also the least likely place for a printing error to occur.

After the indicia leaves the vault, the internet connection to the client could potentially be reset or dropped completely, due to telecommunications problems, line outages, bad routing, etc. (error type #2.) This is beyond Stamp.com's control, and errors may or may not be detected by the Postal Servers. Any error the servers do detect will be logged in the internal server exception report. Once the client has received indicia, it can be lost before transmission to the printer due to power failures, software/hardware failures, user error, etc. (error type #3.) Currently, there is no way for Stamps.com to verify this type of error. When the indicia is transmitted to the printer, it may be lost due to user error (i.e. printer not connected or bad connection), power failure, hardware failure, LAN failure, etc. (error type #4.) Currently, there is no way for Stamps.com to verify this type of error. Even if the indicia is successfully transmitted to the printer, it may be lost due to user error (no envelopes, turned off printer before print complete, no toner) or conditions beyond the user's control (power failures, paper jams, etc.) This type of error may result in a misprint that can be verified on the print media (error type #4.) If the print media is not present, or there is no toner, there can be no verification. It should be noted that without receiving the actual misprints—the misprinted indicia, there is currently no way for Stamps.com to verify a misprint. Even with the misprint, Stamps.com cannot distinguish between an error type #2 that is not logged and error type #3's, 4's, or 5's. Stamps.com is therefore not able to distinguish what might be a user error as opposed to a connection error or power outage.

To limit losses, Stamps.com has a misprints policy. Misprints are generally not credited for unless the request meets certain criteria. For example, if a customer is printing over a certain dollar amount per month (for example, $300 or greater) and also is requesting a credit for a certain threshold amount (for example, $5.00 or greater), they would qualify for a misprints credit exception. A customer's account or meter could be directly credited, depending on the Misprints Policy. High volume customers with a misprints reimbursement request of less than the threshold amount ($5 in the above example) could be told to hold onto the misprinted mailpiece until they have amassed more than $5 total in misprints. This would allow Stamps.com to meet its minimum threshold amount, while maintaining good customer service. This might not be a preferable policy if customers create misprints on purpose to get credited for previous (real) misprints. Customer Support Representatives will have the ability to add a credit to the customer's meter or account (as decided by NetOps), for the purpose of crediting misprints. This UI may have a maximum credit limit, as well. All credits will either automatically generate an instant email notifying the customer, or be reflected in a monthly billing statement to notify the customer.

In order to ensure and enhance user awareness of the policies and rules, notification and statement of policy will preferably appear in the Client print dialogs and Help, the website and website FAQ. They might also appear in marketing materials and instruction collateral as necessary. Customers should be aware how a misprint will be treated if it occurs. Documentation and Help should also highlight the fact that the forced test print on a new printer is intended to provide some protection for customers from misprints, and can be done at any time to test printer settings.

Figure 64:
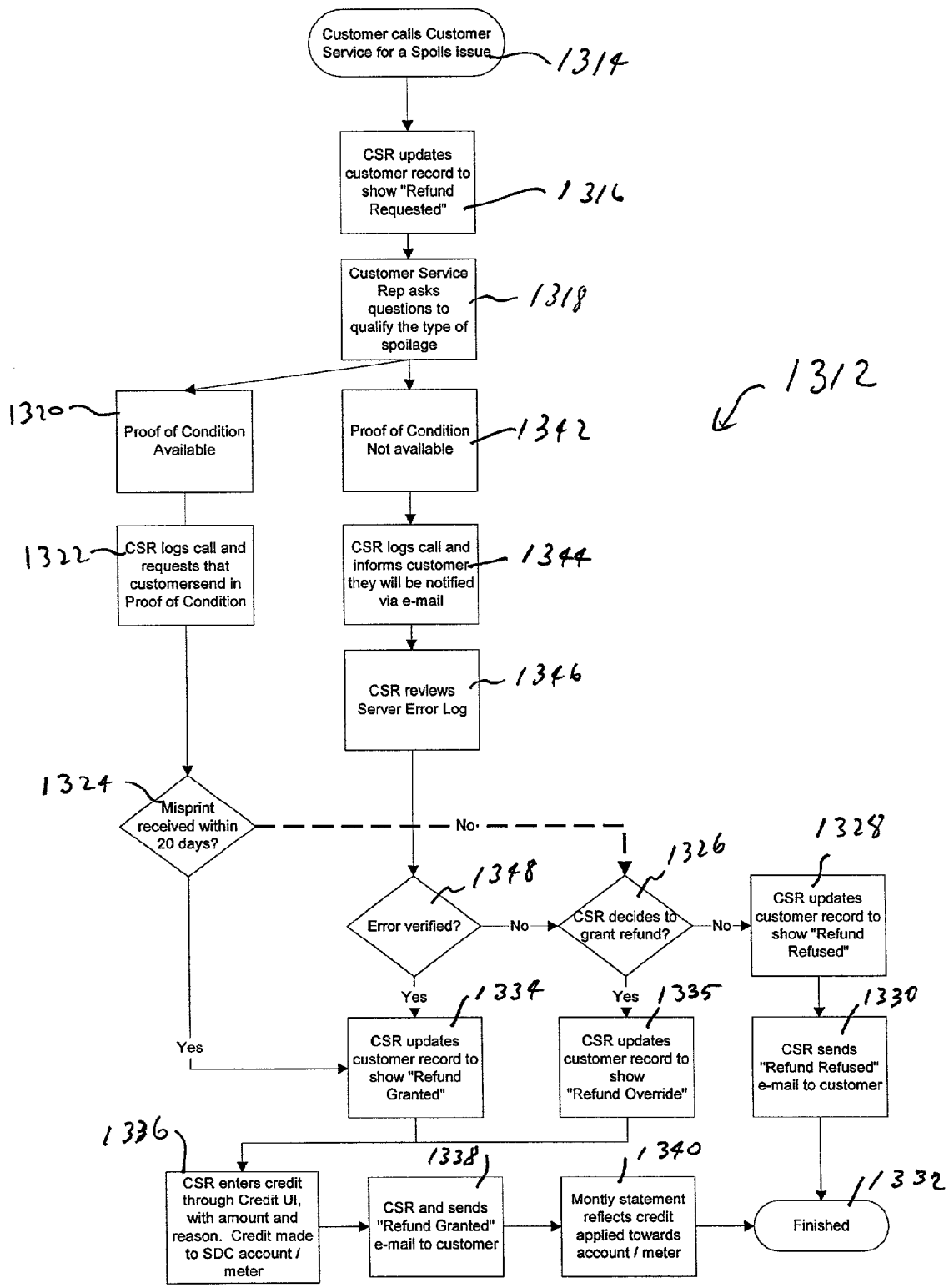
FIG. 64 is a misprint refund process flow.

Referring to FIG. 64, there is shown a Misprints Refund Process Flow 1312. In the process flow, the customer call CS for a Spoils issue 1314, and the Customer informs the CSR that they had a misprint and would like a refund. The CSR flags the customer record as "Refund Requested" in the Customer Support software 1316, including the date and time of the request, and the type of misprints as defined by NetOps, and the CSR tries to qualify the reason for spoilage 1318. If Proof of Condition is not available 1342, then the CSR logs the call and informs the customer that they will be notified via e-mail of the resolution (e.g. within 24 hours) 1344. A daily report is preferably printed with all misprints requests from all customers. Customer Service accesses a non-real-time version of the server error log (a table in the database) and compares this log to the misprints report. This log will have to be manually printed at the end of the day, and contains all print errors. The log contains the Customer ID, Transaction ID, the print time and date, and the amount of postage 1346. If the Error is verified 1348, then the CSR updates the customer record to show "Refund Granted" 1334, and the CSR enters the credit through the Credit UI, with the amount and reason, and the credit made to the Stamps.com account/meter 1336. The CSR then sends a "Refund Granted" e-mail to the customer 1338. The Monthly statement reflects the credit applied towards the account/meter 1340, and the process is finished 1332. If Proof of Condition is not available 1320, the CSR logs the call and requests that the customer send in the Proof of Condition 1322. Faxing should not be an option, as there is no way to record misprints to ensure the same envelope is not resubmitted. The only way to ensure an envelope will not be resent is to get the original in-house. If the Misprint is received within the requested time (e.g. 10 days) 1324, then the process is directed to box 1334, and the process continues as described above. If, however, the misprint is not received within the requested time, the CSR will decide whether to grant a refund anyway 1326. If a decision is made not to grant a refund, the CSR updates the customer records to show "Refund Refused" 1328, the CSR sends a "Refund Refused" e-mail to the client 1330, and the process is finished 1332. If at step 1326, the CSR decides to grant the refund even though no Misprint was received, the CSR updates the customer records to show "Refund Override" 1335, and then the process continues with the CSR entering the credit through the Credit UI, with the amount and reason, and the credit made to the Stamps.com account/meter 1336. The process continues until finished 1332. There are four options if misprints are verified: Credit Stamps.com service fees in the next billing cycle; Instantly credit the customer's meter; Manually issue a check for the amount; or Do not credit customer. If the CSR can verify the error, they will be able to update the customer record (in the CS software) to show the refund and the reason. They will be able to assign a general credit to the customer's SDC account or meter with the reason for the credit. A Service credit would appear in the user's next monthly statement. This credit update triggers the following changes: The users' monthly service charge/meter is adjusted for the misprints amount; An automated e-mail is generated on SiteServer and sent to the customer saying: "A credit of <amount> will be applied to your service account/meter. Please contact us if we can be of further assistance"; and a Credit appears in Customer Billing History. If the error is not verified, the CSR will refer to the Misprint Policy. The CSR can override this on a case by case basis, at their discretion, and updates the CS software record to show the refusal and the reason. Also, if customer calls back, the CSR can override refusal at their discretion. An override record will be tagged with "Refund Override" and the CSR name for tracking.

Figures 65, 66:
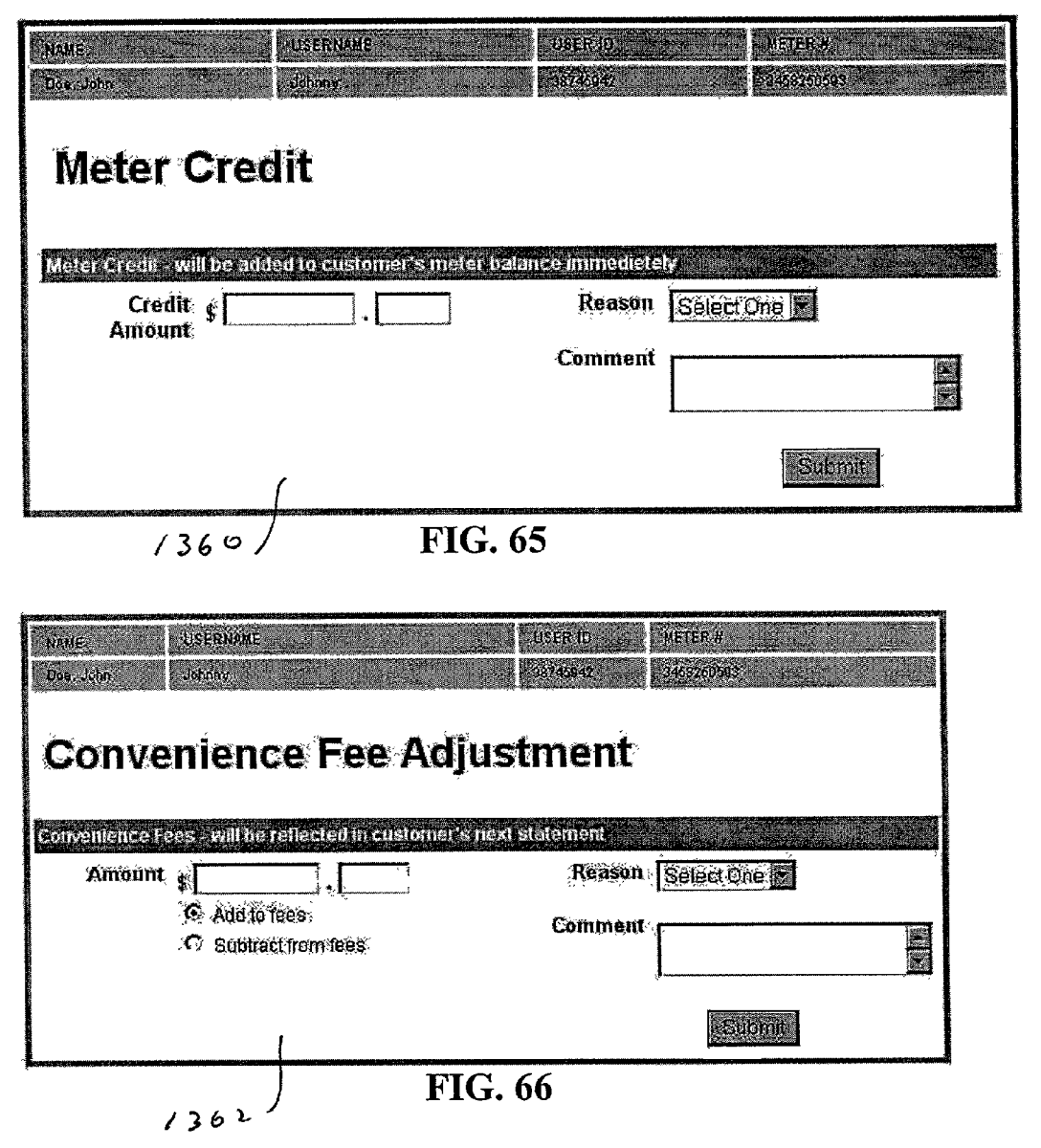

A Master Credit UI 1360 is shown in FIG. 65, a Convenience Fee Adjustment UI 1362 is shown in FIG. 66, and an Instant Adjustment UI 1364 is shown in FIG. 67. These interfaces will be available for both Customer Support Representatives and Billing/AR Administrators for account adjustments. All screens can have limits on the amounts, based on user log-in or user group. In addition, different screens can have entirely restricted access based on login.

It is up to Network Operations to decide how a user is credited for misprints. The following three ways are possible: Direct addition of funds from Stamps.com account to user's meter; One time instant debit or credit to a user's credit card or ACH account; and/or One time debit or credit made to the customer's monthly or yearly bill. Transaction will not appear until the customer's next scheduled statement. The credit UI will preferably allow credits of no more than $10.75 (or some other desired amount) for Customer Support personnel and no more than $50 (or some other desired amount) for Managers.

Preferably, all reports are generated from the Offline Database. Customer Support Credits should be generated by date range, by CSR, and run separately for Instant Credit, Account Credit, or Meter Credit. A sample screen print of the Customer Support Credit 1366 is shown as FIG. 68. Customer credits can be shown by Customer and can be generated for a specific Date Range 1368, a sample screen print of which is shown as FIG. 69.

Misprints requests and credits could be monitored through the Customer Support interface, or in the Offline database. Reports should be generated by time period: # Of requests for each type of reimbursement (misprints, unused, reimbursement); # Of misprints logged, Total $ credited (per time period); # Of misprints logged, Total $ credited (per individual meter); or # Of accounts closed due to policy (customer and business), etc. (customer support software report.) This information will be valuable in determining whether this policy is adequate in the long term, and whether Stamps.com needs to address this topic further with the USPS.

FIG. 70 is a table 1370 which outlines the three approaches for misprints for the different types of errors. This completes the description of the Misprint Processing Module 1312 of the invention.

The next major software application for On-line Postage System is the Quality Assurance (QA) Envelope Management system. The software will record the receipt of QA envelopes. This function can be an in-house function but can also be outsourced. To that effect, the application will generate a flat text log file (or simple MS-Access™ file) that can be FTP'd or e-mailed to Stamps.com daily for upload into the postal system. The purpose of the QA Envelope Management system is as follows: To track QA envelope by meter #; indicate QA envelope has been received; indicate the quality of the envelope; and to create an easy-to-transfer log for simple upload into Postal System.

This software application would interface with the necessary 2D-barcode reader to read the indicia on a QA envelope. A user in any location could run this stand-alone application, scan stacks of mail (eventually using an automated scanner) to record the receipt of the item and attribute it to the correct user by user ID or Meter. The log would be sent daily from an unlimited number of locations to our servers and uploaded. This would not require real-time input into the system, and would allow outsourcing of the receipt and storage of this paperwork. An envelope that passes will only need to be scanned once. Passed envelopes, will show an 'OK' message and a positive beep. If there is nothing wrong with the envelope, the next envelope can be scanned immediately. Envelopes that pass the indicia scan but have other flaws in printing can be associated with a Scan Code at the user's discretion. If the scanner is held for 5 seconds and cannot read an indicia, it will timeout and a "Not Readable" message will be displayed with an audible buzz sound. All envelopes that fail QA will require 2 scans—one of the envelope and one of a standard list of 'Scan Codes'. This list of Scan Codes will be printed and labeled on a standard piece of paper and located on the scanning workstation for easy access (timeout after 5 seconds with scanner on.) The person scanning can evaluate the envelope for other signs of misprint that do not necessarily affect the indicia scan. In addition, damaged envelopes that do not scan will not necessarily suspend the account if there are different criteria assigned to this failure. If the software detects two scans of the Codes in a row, it will assume an envelope failed, and the user will be prompted to enter the meter # from the human readable part of the IBIP indicia for envelope identification. This will be the only keyboard activity required. All scans can be voided manually in case of error by hitting the 'Esc' key or 'Cancel Scan' button on the main screen. The application will ask for the scan again, depending on what it expects (either indicia or Code).

In an upload process, the user who generates that scan log will manually copy the log to an FTP site or send it to the Stamps.com Meter Administrator via email. The Meter Administrator will use the Postal Information Systems Intranet to upload the text file to the Postal Server. After this upload, the MA will receive a confirmation that the file was uploaded and parsed successfully. The log can then be kept in a local file directory for future reference. On upload through the Meter Administrator, the server will parse the log file to assign a successful or unsuccessful scan of an envelope to a particular customer. Each received envelope will be logged in the users' profile and will be available to Customer Support. FIG. 71 is a chart 1400 of codes representing various envelope states.

The QA Envelope Log will include data that is human-readable, tab-delimited text file (.txt) and will not be encrypted. Logs should be named with a unique date/time/user name and stored in a user-determined log file. The filename should be the same as or part of the unique serial # in the header information. Each time the software is run, it will create a unique log file. Log files cannot be appended to each other automatically. All logs must have some validation device that the servers can use to authenticate and ensure that the file has not been tampered with or corrupted. Log files will be zipped using WinZIP with password protection (or other programs) and e-mailed to the Stamps.com Meter Administrator for upload into the system. If the application or system fails while running the software, the log will record up to the last full transaction performed.

Figure 72:
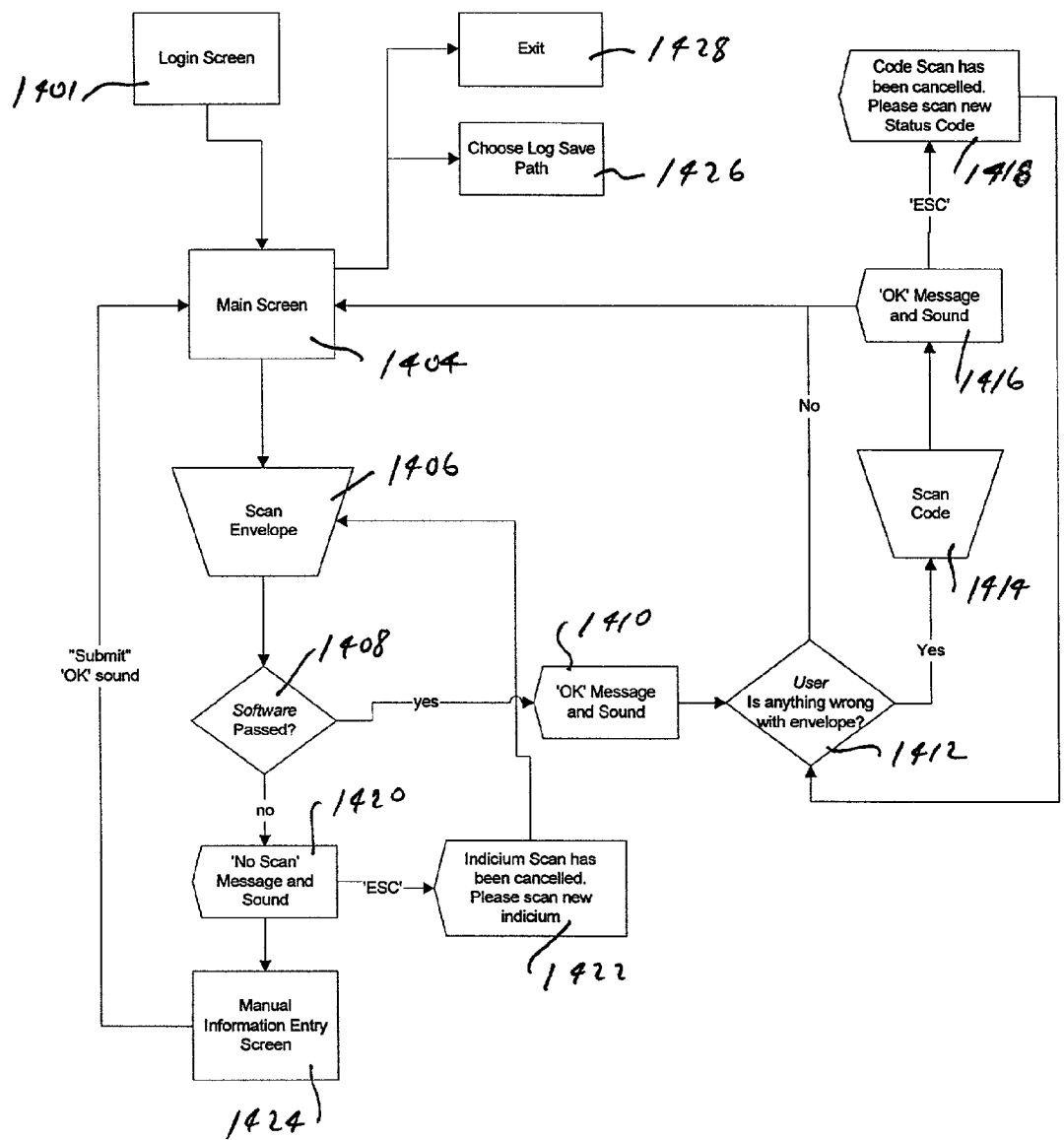
FIG. 72 is a process-flow of a Scan Screen Flow.
Figure 74:
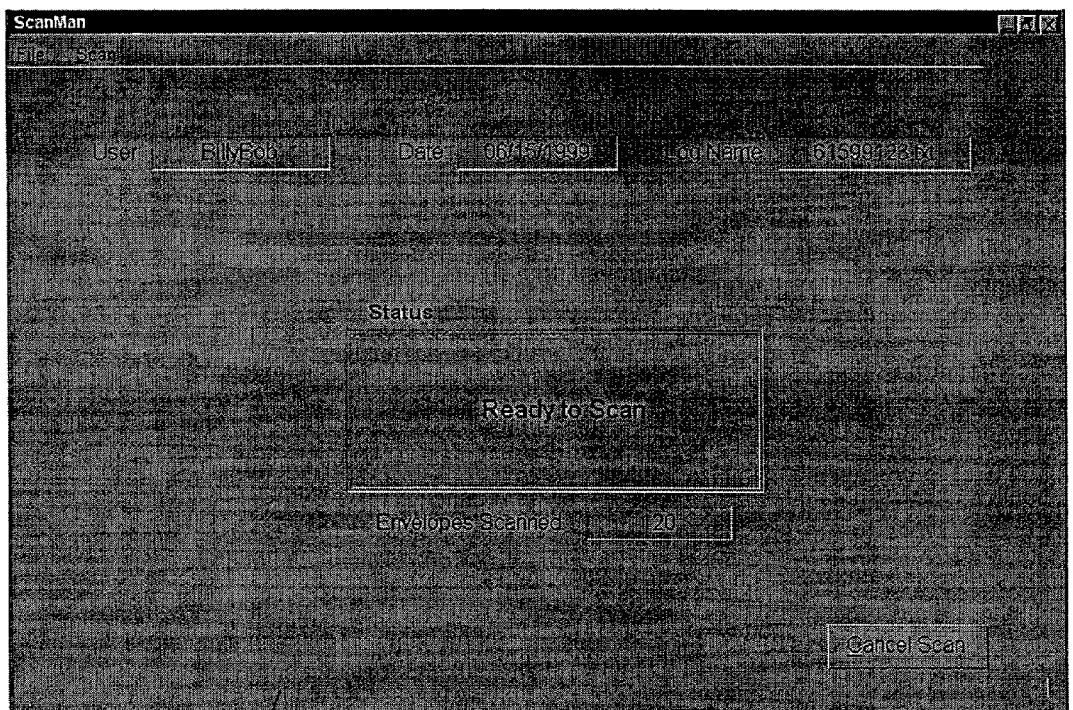
FIG. 74 is a QA Envelope 1406 a screen print.
Figure 75:
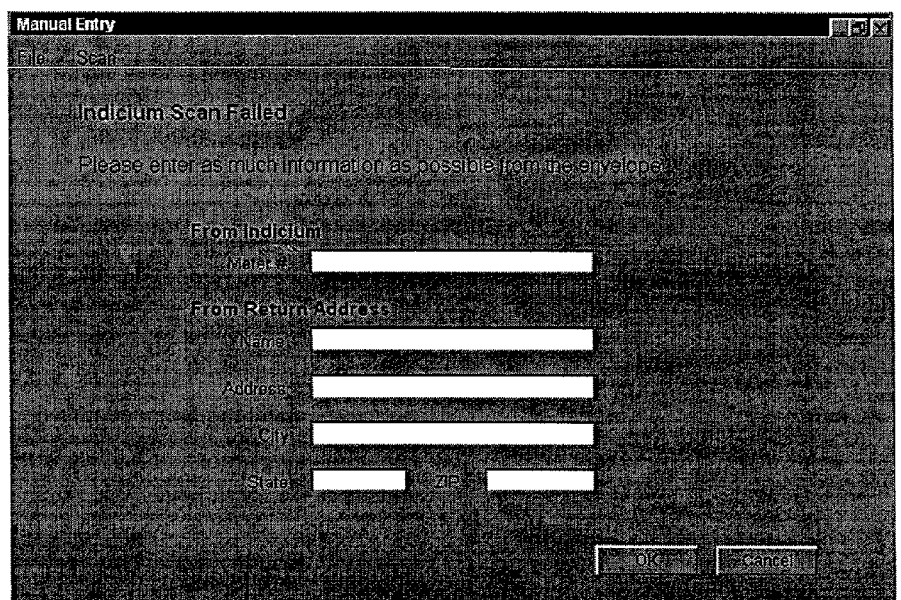
FIG. 75 is a sample input screen for manual entry of the QA Envelope scanning.

FIG. 72 is a process flow of a Scan Screen Flow 1402. From a login screen 1401 (a screen print of which is shown in FIG. 73) a main screen 1404 can be accessed. From the main screen 1404, the user will scan the QA Envelope 1406, a screen print of which is shown in FIG. 74. If the envelope is software passed 1408, then an "OK" and an optionally sound message will be displayed 1410. At a decision tree 1412, if there is nothing wrong with the envelope, the user is taken back to the main screen 1404. If there is something wrong with the QA envelope can be associated with a scan code 1414, an OK message and sound 1416 will be given. By hitting an ESC key, the Code Scan will be canceled, and the user will be asked to scan new Status Code 1418. If the envelope is not software passed at 1408, then a "No Scan" message and an option unique sound will result 1420. By hitting the ESC key, the process will be canceled, and user will be directed to scan a new indicium 1422. The user can also manually enter information 1424. A sample input screen 1424 is shown in FIG. 75. That completes the discussion of the QA Envelope Management Module.

The next major component of the On-Line Postage System is a Commerce Processing software system, the purpose of which is to summarize, report, and confirm daily payment requests to Citibank (or any other bank which Stamps.com interacts), CMRS, USPS Finance, and credit card processors securely with minimal user involvement. The software should also process credit card and ACH transactions by customer purchase and manage monthly invoicing. Finally, the software should provide an audit trail and a viewable history log for all such transactions.

The Payment Processing process requires Meter Status and Payment Status conditions to be incorporated into the database. Each unique meter number has a Meter Status associated with it. Each Payment Request made by a user, either with ACH or credit card, also has a Payment Status associated with it. Each Payment Request is considered unique, and each request will have its own status, independent of other requests. Note that each payment is associated with a meter, not a license.

Each meter is affected by certain events listed in Table 1430 shown in FIG. 76. Each meter event is logged with an associated date. These events affect the "Access State" of the client. Access State is a concept rather than a hard coded state and describes the accessibility of the functions of the Client. The reasons for which a meter has been suspended are tracked. The meter number is included in all meter event logging. Reasons for administrative hold, such as invalid billing formation or email address, can be defined by operations.

Each Payment Request has a status field and a date field associated with it. Each Payment Status change event has a date associated and may or may not have an additional Comment associated. The payment source should be a separate field rather than in the comment field so that it is preserved when the status changes. The sources are: Customer; Employee-Customer Support, Payment Administrator, Telemarketing (and name); Auto-refill (future); Free Postage Transfer; and Merchant Transfer.

The date and time when a payment request is Pending and the date and time it is Captured, Returned, Rejected, or Approved is logged. A table 1432 showing this information is shown in FIG. 77. All of the sources above can put money in the PSD except for a Merchant Transfer that transfers accumulated credit card postage purchases to the USPS when Stamps.com is acting as a merchant (if the USPS permits ACH transfers of this amount).

In Meter Value Tracking, the value of postage in the meter is tracked as well as the amount of postage that the account has in dispute. The disputed amount results when a payment is rejected, returned, denied, etc. after the meter has been reset. It allows printing up to the amount that has successfully been processed and put into the meter, less any disputed amount. Any amount that was rejected or returned cannot be printed, i.e., allow the customer to print the valid amount but not the additional amount added to the meter that has not been paid for. When a meter is given free postage that would exceed the maximum amount allowed in the meter (typically $500), then the free postage is deferred until it can be wholly added to the meter without going over the limit. No partial deferment of free postage is allowed.

The following states define various functional states that the system can be in and how these states affect the behavior of the system and the client. States should include but are not limited to: License Pending (The user has opened an account with Stamps.com and is awaiting approval of a license); Active (The user has received a valid license. All functions are fully accessible to the client); Withdrawal Pending; Withdrawn; Suspended (The behavior of the system has been limited due to one or many events that can occur simultaneously. If more than one event has occurred, the system should use the more restrictive attributes pertaining to each capability. Minimum supported should be: Forms Not Received, QA Envelope Not Received, QA Envelope Failed, Payment Returned, Payment Hold, Administrative Hold). See the Activity Codes & Meter States specifications for a detailed description of the entire list of states and their system behavior permissions.

A next feature of the Commerce Processing System provides for Payment Processing. Purchases are not processed until the customer has been assigned a license. Customers should be able to initiate manual purchases through the client or through a Stamps.com agent. No matter how a purchase is initiated, once it is logged it follows the same process flow based on payment type (ACH or Credit Card). The payment request may be completed in the back-end payment processes. To support credit card payment processing, a dial-up line can be used to handle the initial load. This dial-up setup should be created to allow a very rapid transition to a leased line. The dial-up can be used for testing and to get to market release as quickly as possible. This line can be placed with the server infrastructure. The communications layer should be isolated to allow an easier switch to a leased line when the volume requires greater throughput. A Payment Processing Flow 1500 is shown in FIG. 78. To initiate a purchase 1502, a user logs the purchase and set a status request 1504. From there either an ACH payment request 1506 can be processed, or a credit card 1508 can be processed. Finally, there is back end payment processing 1510. Various features of the Payment Processing Flow are further described below.

Payment Information is stored in a secure manner. The credit card information is encrypted before storing in the database. In addition, the last 5 digits of the card is stored in an unencrypted form for use by the client and Customer Support. Similar protection for the ACH ABA number and account number are also provided. The system will check for unpaid service fees and disputed postage balance for the account whenever the payment information is updated, and process them to collect the outstanding fees. The credit card billing address (AVS address) will be saved separately from the licensing physical and mailing addresses. The AVS address with each credit card transaction will be saved for later dispute transaction authentication, along with the name, card type, and expiration date.

A new system variable called the ACH Delay Variable that represents the number of business days that should minimally pass from the time that an ACH payment is submitted until the meter can be reset with that amount is provided. By default, the ACH Delay Variable is set to 0. A value of 0 indicates that meters are instantaneously reset after a purchase request is made and has passed ABA number cleansing. The system should correctly handle all pending and submitted purchase requests whenever the ACH Delay Variable is changed. Two (2) business days after the time that a customer requests an ACH postage purchase, the customer's meter will be credited with the amount purchased if no return or rejection has been received. The number of business days is a variable that can be changed although this may require bringing the system down. For example: A customer requests $200 of postage via ACH at 8 PM on Monday night. At approximately 8 PM on Wednesday night, the customer's meter value will be increased $200. The Payment Administrator can request and schedule a change in this variable from Network Operations. Changes to the Variable are performed offline, and any change to the ACH Delay Variable should pass QA before being released onto the live servers.

A Reporting Schedule will provide that information is transferred to third parties according to a desired schedule.

To initiate a purchase, the system should verify that the purchase amount is greater than the minimum amount specified in the pricing plan. Set to $500 the maximum meter balance plus pending purchases (meter balance+pending purchases<=$500), regardless of the payment method. These limits should be enforced at the client level first. This $500 limit is the USPS-mandated default for all new accounts. The Meter Administrator is allowed to update this amount for any account. Force only one payment method, either ACH or credit cards, to be active at a time for both postage purchases and service fees. For ACH Purchase Initiated by Client, the following protocol should be observed: The customer initiates a purchase through the client and specifies ACH as the payment method. The customer supplies their ABA number, the account number, the name on the account, and the purchase amount. The software adds the date and time of the request. The client should offer the customer the chance to use the previously entered bank numbers on file on the server, otherwise, the customer can enter new ones. Display only the last 5 digits of the ABA number and account number plus the account name. When the customer submits the completed request, check the validity of the information. Verify that the ABA Number and the account number are correct using the Thompson software. Prompt the customer to make corrections and resubmit. Once the request has been submitted and accepted, check the ACH Delay Variable. If the value is 0, reset the meter immediately with the purchase amount, and ensure that when the ACH Delay Variable is changed—increased or decreased—that no pending payment requests are dropped. Lastly, add the request to the ACH processing pipeline.

For Credit Card Purchase Initiated by Client, the customer initiates a purchase through the client and specifies credit card as the payment method. Provide the client with a list of accepted credit cards. The customer supplies name, credit card number, credit card type, expiration date, AVS address, and the purchase amount. The software adds the date and time of the request. The client should offer the customer the chance to use the previously entered credit card number on file on the server. Otherwise, the customer can enter a new one. Display only the last 5 digits of the credit card number plus the card type and expiration date. When the customer submits the completed request, check the validity of the information. Verify that the expiration date is greater than the current date. Verify that the credit card number is all numeric. Verify the basic card type identification (see FIG. 79) for card type identify information 1503. Validate card number with MOD10 check and do not accept request if check fails. Multiply the card number by a series of weights ( . . . 212121) (alternating 1's and 2's with 1 as the rightmost digit). Add units and tens position of each resulting product as single digits. Add 1 and 2 if the digit was a 6 and the weight was a 2, equaling 12 (1, 2). Divide by 10, once all the results are summed. If there is no remainder, then the credit card number is valid. See the rules 1505 set forth in FIG. 80. Use AVS when authorizing to verify that the credit card billing address is valid. The AVS address does not have to match license physical or mailing address. Prompt the customer to make corrections and resubmit. Process the request through the commerce pipeline once it has been submitted and accepted.

For postage purchase initiated by Customer Support or Payment Administrator, the following preferably takes place. The Payment Administrator or a Customer Service Representative can add postage to a meter for a variety of financial and customer support issues. The source type, the actual person making the request, the reason code, the amount, the date and time are logged. Accept a transaction ID number for tracking the request and enter it in the purchase comment field. Initiate an ACH purchase request with the source account being the Stamps.com account, not the customer's account. Reset the meter immediately (as if ACH Delay Variable=0) because no credit risk from Stamps.com's account exists. Lastly, Email the customer indicating that the meter was reset, the amount, the date and time.

For immediate credit initiated by Customer Support or Payment Administrator, the Payment Administrator or a Customer Service Representative can issue an immediate credit to a customer's credit card. The source type, the actual person making the request, the reason code, the amount, the date and time are logged. Return a transaction ID number for tracking the request. Put a credit card reversal into the processing pipeline. If the customer uses ACH, manually process the reversal by writing a check. Email the customer indicating that the amount was credited, the amount, the date and time.

To process ACH postage payment requests, the following system is followed, and describes how money is transferred to the USPS from customers and Stamps.com using ACH. Meters should be eligible to have purchase requests processed (see the Client Access Status.) The appropriate reports are sent to the Payment Administrator, including online Payment Request Report. Archive the reports online for at least 90 days and offline thereafter for future auditing. See FIG. 81 which depicts a simplified flowchart of ACH batch processing 1512. In this process, first assemble all eligible payment requests for submission to Citibank 1514. An eligible payment is defined as an ACH purchase request submitted after the last ACH processing batch. No payments are ever resubmitted for ACH processing; even if rejected or returned. Eligible payments include: Payments to cover previously rejected or returned payments are submitted as new transactions; Eligible ACH purchase requests: PaymentStatus=Requested, Type=ACH; Eligible Free Postage transfers: Include a payment from the Stamps.com account for the total amount of free postage reset into meters during that period (see Pricing Plans); Eligible Immediate Meter Credits: Include a payment from the Stamps.com account for the total amount of free postage reset into meters during that period for spoilage and other customer support reasons; and Combine the two previous amounts into one transaction. Second, send ACH Payments to Citibank 1516 (or the appropriate financial institute used.) Initiate this process every day at a (Payment Administrator) configurable start time. Create files per the NACHA specification. Dial Citibank through the encryption box using Procomm Plus protocols and modem. Check for a positive connection. If the line is busy, wait 30 seconds and repeat. Upload the file to Citibank using Procomm Plus protocols. Check for Citibank confirmation. If confirmation is not present, notify the Payment Administrator. Check total amount on confirmation against the total amount on the original file. If it does not match, send an alert to the Payment Administrator that an error has occurred and the step in which it occurred (where the totals differ.) Notify the Payment Administrator with a simple message that the process has been fully transacted. Archive the uploaded file and the confirmation file by date in an archive directory by date. Once the payments have been successfully uploaded, change their statuses from Requested to Pending.

Figure 82:
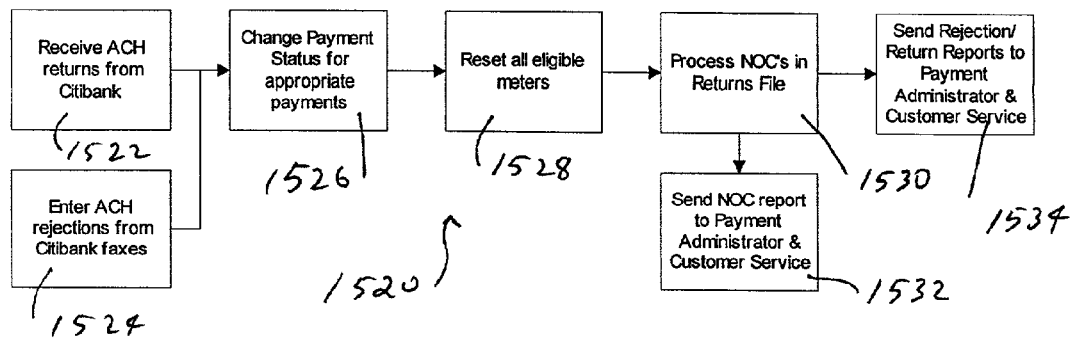
FIG. 82 is a flowchart showing ACH meter resets processing.

Turning to FIG. 82, there is shown an ACH Meter Resets Process 1520. First, download ACH Returns File, and download returns file from Citibank twice per day, Monday-Friday only, and upload file to server for processing. Next, enter ACH rejections from Citibank faxes 1524. This can be performed by Payment Administrator at any time. Manually enter rejections. Lookup user record by meter number read from Citibank rejection fax. Change transaction request status to 'Rejected'. User selects from combo box. (Rejects are bad ABA routing numbers. Returns are bad account numbers or insufficient funds.) Next, change Payment Status for appropriate payments 1526. Change the Payment Status from Pending or Approved to Returned or Rejected as appropriate. Update the disputed amount if the payment was reset into the meter. Notify customer via email that payment was rejected or return. Next, reset all eligible meters 1528. Reset all meters for ACH postage purchases if the ACH Delay Variable is not 0. This can accomplished with a periodic process that checks request dates and times versus the ACH Delay Variable. If a meter has a disputed value, apply all funds to the disputed amount first. Then, reset the remaining amount, if any. This process should also be applied for free postage and other monies deposited in customers' accounts by Stamps.com. Send email to customers notifying them of meter reset, method, amount, date and time. In the next step, process NOC's (Notice of Change) in Returns File 1530. Change the Payment status from Pending to Approved; add the NOC to the Purchase comment field. Send email to customer indicating bank has updated info and customer should change it. Following this, send NOC report to Payment Administrator and Customer Support 1532. Create NOC report offline for Payment Administrator and Customer Service. Lastly, send Rejection/Return Reports to Payment Administrator and Customer Service 1534. Include all records in the report where PaymentStatus=Rejected or Returned since the last report. Customer Support should work with customer to resolve issues. Customer Support sees the transaction status via their interface. Notify customer of payment rejection or return via email and on next login.

Another feature of the payment processing flow is to Transmit Stamps.com-only ACH Transactions Manually. If ACH is restricted from customer use and is only to be used for Stamps.com paying for free postage, then the transmission process may be implemented manually. All monies deposited into a meter and not paid for by the customer should be paid by Stamps.com (automatic free postage, customer support credits, credit for unused postage put into the meter, etc.) Every day that files are ordinarily sent to Citibank, sum up the total amount of money owed to the USPS. Generate an ACH Submission File with a single transaction for this amount of money using the Stamps.com ABA and account numbers (to be provided). Encrypt this file. Email it to the Payment Administrator. The Payment Administrator will manually upload the file to Citibank.

Archive the file. A report should be available via the offline database to allow the Payment Administrator to view the transactions that made up the total calculated in #2. Mark the transactions as having been sent as per the automated ACH processes. Provide a means for the Payment Administrator to decrypt the file and to set passwords, etc. Include the total from #2 in the ACH transfer line item of the DBAR. Use the following process to update the Citibank passwords. Maintain the Citibank passwords locally on the server. Initiate a password file Email to the Payment Administrator every 4 weeks. Payment Administrator manually transmits the password file to Citibank. Payment Administrator sends a "password confirmed" request to the ACH service causing the password to be updated after manually confirming that the password file was received by Citibank.

Figure 83:
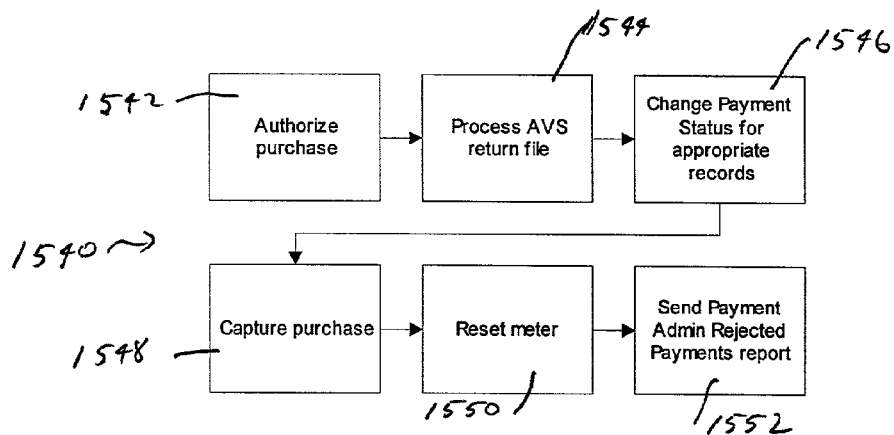
FIG. 83 is a flowchart showing credit card processing.

In order to process credit card payment requests, the following features are employed. The payment capture is described in a following section with reference to FIG. 83 credit card processing 1540. The first step is to authorize the purchase 1542. The Client displays the valid credit card types according to an ordered list sent by the server. Send the customer name, credit card number, expiration date, and billing address to FDMS. Use a Stamps.com merchant ID if acting as merchant for postage purchases and for service fee billing. Use USPS merchant ID if acting as agent for postage purchases. Queue all purchase requests for later processing if the credit card processor is down, and do not reset the meters. Client should inform user that approval is pending after timing out. Save the AVS address along with the transaction for dispute analysis. Next, process AVS return file 1544. Receive Authorization via AVS Return file. Process the Authorization according to the AVS return code. In this, cross-reference an action code from the AVS return code, reject the payment if the action code=D or D*, accept the payment if the action code=A or A*, and retry the payment if the action code=R (Server, not client, retries the authorization.) Next, change Payment Status for appropriate records 1546. Set Payment Status=Rejected if transaction Response Code is Denied, Referral, Re-enter, or Pick Up. Set Payment Status=Rejected if transaction Response Code is Approval and AVS Response Code is D or D* per the AVS Response Code. Set PaymentStatus=Approved if transaction Response Code is Approval and AVS Response Code is A or A* per the AVS Response Code. Next, capture the purchase 1548. Use same merchant bank connection as the authorization; do not hang up. Notify the client if authorization or capture was not captured. Update the Payment Status field to "Captured" if previously authorized purchase is successfully captured. Fifth, reset meter 1550. Apply credit to meter if amount authorized and captured. If a meter has a disputed value, apply all funds to the disputed amount first. Then, reset the remaining amount, if any. Notify customers of meter reset, method, amount, date and time via email. Notify customers of payment rejections via email. Lastly, send Payment Administrator rejected payments report 1552. Send Payment Administrator and Customer Service of all reject payments for the day.

Figure 84:
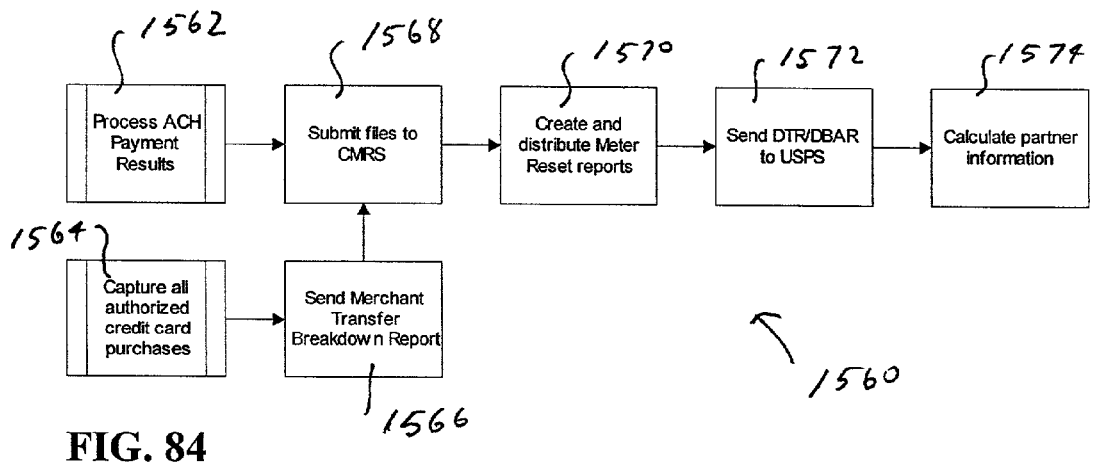
FIG. 84 is a flowchart showing back-end processing.

A last part of the Payment Processing Flow is Back-end Processing. FIG. 84 is a logic flow diagram showing Back-end Processing 1560. ACH payment results are processed as described above 1562. Additionally, all authorized credit card purchases are captured 1564. When Stamps.com acts as a merchant, these previously authorized purchases should first be captured (at the time of authorization or through a delayed batch process), transferring the money from the customers to Stamps.com's merchant bank account. This operation is described in previous sections pertaining to credit card operations. Next, send the Merchant Transfer Breakdown Report 1566. When Stamps.com acts as a merchant, all funds captured from previously authorized postage purchases bought using credit cards should be transferred from Stamps.com's merchant bank account to the USPS's Citibank account using a wire transfer. Until this process is automated, the Payment Administrator initiates this process manually by transferring one lump sum wire transfer to the USPS. Send Payment Administrator the Merchant Transfer Breakdown Report, notifying the Payment Administrator to wire the sum total to the USPS. Next, submit files to CMRS 1568. Coordinate transmissions to CMRS, Citibank, and USPS Treasury (DTR/DBAR) to reference the same set of data over the same time period. Create the 2 CMRS files (movement and reset.) Give all the files the same date, time, and cycle number. Preferably use Pacific Time as the time zone for all time-based fields (but any consistent time zone is acceptable.) Process the files after CMLS processing to get the Meter Movement file. Use a configuration parameter that defines the number of years ahead the inspection due date is from the installation date. Set the inspection period parameter to two years initially. Call CMRS using Expedite Manager. Retry calls and log failures. Notify the Payment Administrator if unable to send the files. Upload the files to CMRS. Archive the files. Archive Resetting file under the name CMRS.RESET.DATE.TIME, where DATE and TIME are the date and time of submission to CMRS. Archive Movement file under the name CMRS.MOVE.DATE.TIME. Archive Address file under the name CMRS.ADDR.DATE.TIME. Fifth, create and distribute Meter Reset reports 1570. Send Meter Reset and CMRS Report to Payment Administrator. Sixth, Send DTR/DBAR to USPS 1572. Fax DBAR to USPS. Notify Payment Administrator that DTR/DBAR is ready to be printed and faxed if DTR/DBAR should be faxed manually. Lastly, calculate partner information 1574. This involves collecting appropriate information to allow the following calculations to be performed on an offline version of the database: Calculate amount due to partners from postage printing. Total amount printed by all customers with the same OEM code. Enables payment for revenue sharing. Calculate amount of each advertisement art printed. Total the number of times each authorized logo was printed that day. Enables payment for advertising in the advertising art area.

That completes the discussion of the Payment Process Flow. Next, there can be provided various payment pricing plans. Pricing plans can be stored in a table. FIG. 85 is a such a table 1576. The Commerce Director should be able to make changes to any pricing plan. Sufficient operational controls should be enacted to ensure management signoff and Quality Assurance verification of any pricing plan changes or email template changes. Simple changes to the contents of a row may be implemented after sufficient Quality Assurance verification. Implementing new pricing plans (columns) may require new software development. Any changes to a plan that are in customers' favor may be changed in that plan description. Any changes to a plan that are not in customers' favor should be entered as a new pricing plan to allow the original plan to be used for existing customers on that plan.

Figure 86:
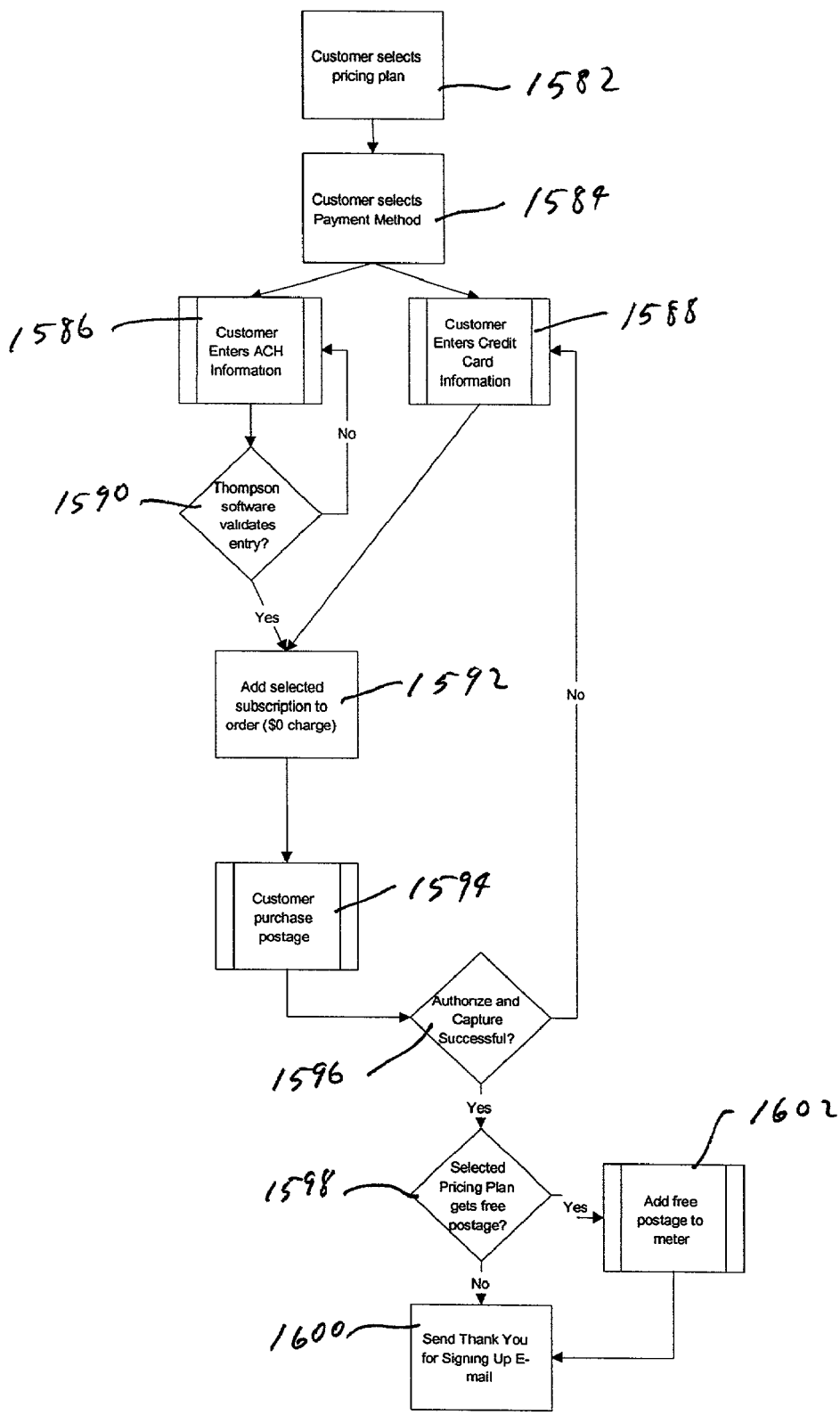
FIG. 86 is a pricing plan selection process.

FIG. 86 is a Pricing Plan Selection Process Flow 1580. A customer selects a pricing plan 1582 and selects a payment method 1584. The customer then either enters ACH information 1586 or the customer enter credit card information 1588. If the customer enters ACH information, software validates the entry 1590. If the entry is incorrect, the user is asked to re-enter the ACH information. If the ACH or credit card information is correct add a selected subscription order 1592. The customer then purchases postage 1594. At decision tree 1596, a determination is made to see if the authorization and capture was successful 1596. If not, the user is asked to re-enter the credit card information 1588. If the authorization and capture is successful, the user selects a pricing plan 1598. If free postage is offered, then the free postage is added to the meter 1602, and the customer receives thank you for signing up message E-mail 1600. If no free postage is added, the customer simply receives the thank you for signing up message E-mail 1600.

Business Plans and Customer Plans are offered. Other hybrid or alternate plan can be offered as well. The Business Plan Selection can offer the following features: Allow customer to pay by ACH, Visa, MasterCard; Customer enters financial information; Do not charge customer for service fee at sign-up; Require customer to purchase postage to continue; Set minimum postage purchase requirement to $10 (as an example); Use the same financial information to pay for service fees and postage purchases; Deposit $25 Free Postage into customer's postage meter; and Allow only 1 Free Postage Promotion per customer, e.g. customers who switch plans do not get a second free starter kit and the free postage. The Consumer Plan Selection offers the following features: Allow customer to pay by ACH, Visa, MasterCard. Customer enters financial information; Do not charge customer for service fee at sign-up; Allow customer to choose optional prepaid plan; Require customer to purchase postage to continue; Set minimum postage purchase requirement to $10 (or some other determined amount); Use the same financial information to pay for service fees and postage purchases; Deposit $10 Free Postage into customer's postage meter; and Allow only 1 Free Starter Kit per customer, e.g. customers who switch plans do not get a second free starter kit or free postage.

Part of the pricing plan involves an On-going Postage Purchases. These can differ for Business Plan and Customer Plan customers. For example, the Business Plan can offer the following features: Do not charge customer a reset fee on postage purchased; Require a $10 minimum for postage purchases, $500 maximum; Allow customer to make an unlimited number of purchases, subject to the previous limitations; Notify customer in the client to correct financial information if a customer purchases postage (via credit card) and authorization fails; If a customer attempts to purchase postage via ACH and authorization fails later, customer will be sent email notifying customer that submitted financial information has been rejected and access will only be available to the undisputed amount in the meter; and If a customer attempts to purchase postage via credit card or ACH and the transaction cannot be completed in a timely manner, inform the customer that an email will arrive and display purchase approval (or lack thereof). The Customer Plan offers the following features: Do not charge customer a reset fee on postage purchased; Require a $10 minimum for postage purchases, $500 maximum; Allow customer to make an unlimited number of purchases, subject to the previous limitations; Notify customer in the client to correct financial information if a customer purchases postage (via credit card) and authorization fails; If a customer attempts to purchase postage via ACH and authorization fails later, customer will be sent email notifying him that his financial information has been rejected and access will only be available to the undisputed amount in the meter; and, If a customer attempts to purchase postage via credit card or ACH and the transaction cannot be completed in a timely manner, inform the customer that an email will arrive and display purchase approval (or lack thereof.)

The Pricing Plans and monthly billing therefore have the following features, which differ slightly depending on the plan type. For Business Plan, the features include: Begin a customer's billing cycle on the day of registration if the customer registers on the 1st-28th of the month; If a customer signs up on the 29th, 30th, or 31st, move the customer's billing date to the 1st, 2nd, or 3rd, respectively; Ensure that the first monthly billing cycle for these days begins in the following month, not after 2-3 days; Charge customers 10% of postage used/printed for the month with a $3.99 minimum and $29.99 maximum charge; Email the customer on the day of the billing an email statement outlining postage use and calculation of service fee; and Suspend access to printing temporarily if service fee payment is rejected. For Consumer Plan, the features are as follows: Begin a customer's billing cycle on the day of registration if the customer registers on the 1st-28th of the month; If a customer signs up on the 29th, 30th, or 31st, move the customer's billing date to the 1st, 2nd, or 3rd, respectively; Ensure that the first monthly billing cycle for these days begins in the following month, not after 2-3 days; Charge customers $1.99 per month for up to $25 of postage used/printed per month; Charge customers 15% of postage used/printed above $25 with a $29.99 maximum charge; Email the customer on the day of the billing an email statement outlining postage use and calculation of service fee; and Suspend access to printing temporarily if service fee payment is rejected.

The Prepay Option for Consumer Plan are as follows: Offer those customers on the Consumer Plan the opportunity to prepay for 1 year their monthly $2 fees at a discounted rate of $19.99 (or some other desired discount plan); Continue to apply the regular $25 monthly usage cap, charging for any usage at 15% with a ($29.99–$2=$27.99) maximum; and Email customer on the day of the billing an email statement even if no additional charges are incurred that month.

Stamps.com should have the option to switch customers between plans. There is accordingly a provision provided for switching between pricing plans. In general, customers should be switched to a new billing plan only after the next billing so only full months of postage use are billed. No prorating is required. Use only the last plan chosen during a billing cycle if the plan was switched multiple times. Do not record a switch if the customer switches back to the customer's current plan for the current billing cycle. Therefore, do not bill a customer more than once for the Prepaid Plan if they switch back to it via a multiple switch during the same billing cycle. Restrict customers from receiving new promotions and free postage from repeated switching. Do not refund any service fees from the Prepaid Option for the Consumer Plan if the customer switches before the one year time period. This may be handled through Customer Support if necessary.

The Customer may also wish to switches plans. If so, the customer should be warned of the implications of switching plans, particularly for forgoing the fees from the Prepaid Option to the Consumer Plan. If the customer switches, mark account to switch plans the next time the bill is calculated, and send customer email alerting him or her of the way switching is handled and welcoming him or her to the new plan.

Figure 87:
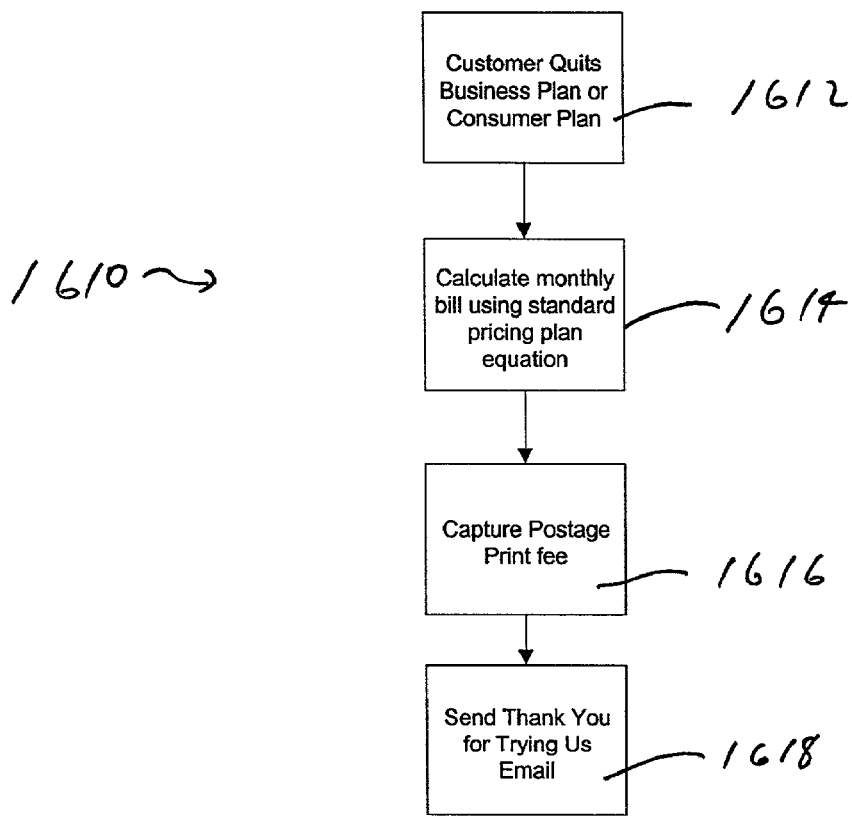
FIG. 87 is a flowchart showing the meter surrender and pricing plans.

Pricing plans have no affect on meter refunds. FIG. 87 is a process flow for meter surrender and pricing plans 1610. A customer quits the business or consumer plan 1612. Send customer an email asking customer to call Customer Support if authorization fails. Do not process a withdrawal request until all its outstanding transactions have cleared. Initiate final ACH or credit card charge and suspend access to customer's meter. The software calculates the monthly bill using standard pricing plan equation 1614. The postage print fee is captured 1616, and lastly, a "Thanks for trying us" type of E-mail is sent to customer 1618. Calculate the customer's final monthly bill using the standard monthly billing procedure for that pricing plan. Send offline report daily to Payment Administrator containing list of all refunds needed for accounts paid via ACH to facilitate cutting checks to these customers. Send offline report daily to Payment Administrator containing list of all refund requests for which a payment could not be captured. Do not bill the customer again whether the meter's withdrawal request has been processed or not.

The monthly billing process for Business Plan customer preferably involves submitted bills to customers every month via email. Bill customers regardless of whether the meter or license is suspended or the meter is dormant. The Email Infrastructure does not need to be secured for monthly billing. Customer Support should be able to view current and past billing statements. Customer Support also requires the ability to add entries to the monthly bill to provide credits or debits to customers' accounts. The system should log the entry, including the account number, the reason code, the amount, and the date and time. Customer Support requires the ability to give free months of service to customers and there should be maintained a field for each customer that contains the number of free months remaining. In this process, log the entry of the free months, including the number of free months provided, the customer service representative making the entry, and the date and time. Do not bill the customer if the field is greater than 0. Decrement the field value after that customer gets the current month free on the current billing cycle.

Writing checks to customers processes all "ACH reversals". Process credit card reversals normally. When a credit or debit is made, log the amount, the employee making the change, the reason, and the account changed. Email the customer with the information about this change.

Figure 88:
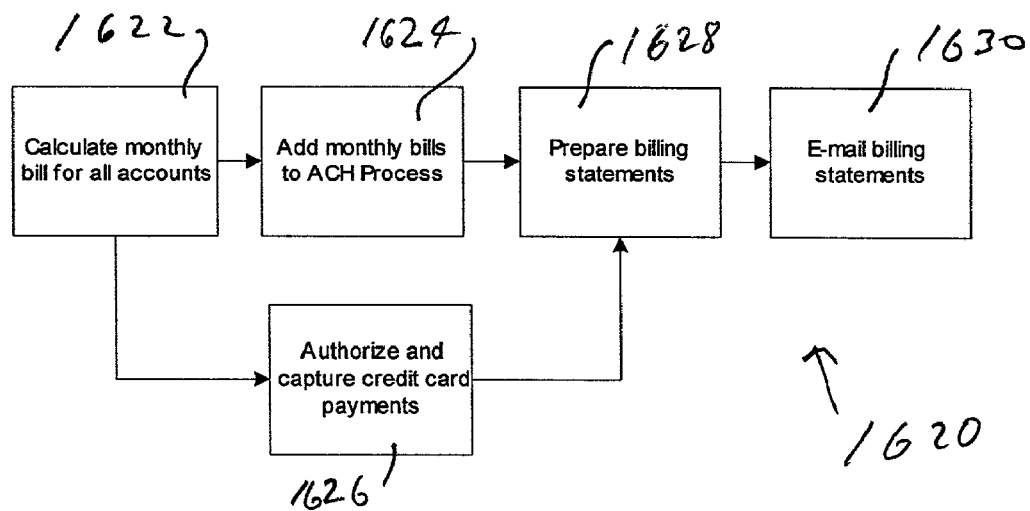
FIG. 88 is a flowchart showing the monthly billing process.

FIG. 88 is a monthly billing process flow 1620. First, calculate a monthly bill for all accounts 1622. Add monthly bills to ACH Process 1624 or authorize and capture credit card payments 1626. Prepare billing statements 1628, and E-mail the billing statements 1630. This process is described in greater detail below. The step of calculating the monthly bill for all accounts 1622 has the following features: Level-load the billing process equally over each month; Process the monthly billing on the registration anniversary of each customer; Do not assign customers an anniversary day to ensure that billing is level loaded. It is assumed that the customer arrivals will be randomly distributed; Do not charge customers the service fee if they have a free month; do process debit and credit line items; Decrement the free service field by 1 if free service is provided; Charge the Prepaid Option to the Consumer Plan at the end of the first month; Add in any debit and credit line items that Customer Support or the Payment Administrator may have entered for this customer; If the company owes the customer money, debit the customer's account if paying via credit card or send the customer a check if paying via ACH; Maintain date of last billing and next billing for each customer; Authorize any credit card payments; Capture credit card payments; Send a report to the Payment Administrator of all the service fees that could not be captured; and Payment Administrator suspends these delinquent accounts.

Check if credit card will expire within predetermined time (e.g. 40 days) and authorize and capture credit card at step 1626, and has the following features: Email customer to update credit card information; If credit card is expired, handle this as an unpaid service fee-suspend access to printing until the fees are paid; and Detect when the client changes the financial information and check for unprocessed service fees that can now be authorized and captured.

Add monthly bills to ACH process at step 1624. Use the USPS account, assuming that the USPS will rebate Stamps.com fees; Send a report to the Payment Administrator of all the service fees that could not be captured; Payment Administrator suspends these delinquent accounts; and Add the capability to use a separate Stamps.com ACH account.

Prepare billing statements at step 1628. The statement should include: greeting; customer name; customer ID number; total postage printed; total service fee; list of credits and debits; total charge; pricing plan summary; advertising space; and Prepayment Option for Consumer Plan should also include number of remaining months of prepaid basic fee left.

If the E-mail to the customer in step 1630 bounces, re-send every day for up to 5 days. Log all failures. Have client display message to customer indicating the failure. Notify Payment Administrator and Customer Support if the statement cannot be delivered after 5 days: Customer name, ID number, statement date, phone number, and email address; include the billing statement. Notify the client on login that the email address cannot be reached and to call Customer Support. Only perform this once per bounced email sent. Check for and send any previously bounced e-mails when customers change their email address and resend them to the new address.

A last step in the monthly billing process involves processing ACH Reversals. Send report to Payment Administrator containing list of needed ACH reversals. These will be processed by writing checks to each customer.

In the billing scheme, a second bank to accept ACH Service Fees for Stamps.com can be used, except that a different phone number will be dialed, different passwords will be used, and different potential file header formats will be needed. Separate internal ACH reports should be sent for each bank. For example, if Chase Manhattan is acting as the service fee ACH processor, the following protocol should be observed. Sends Transaction Journal as acknowledgment of ACH request file, listing settlement dates, total debits, total credits, and processing system (Fed, etc.) Can be retrieved 2 hours after ACH request file is sent. Empty files should not be sent. Sends returns, rejects, retires, and NOC's in one NACHA formatted file (or optionally a Chase-specific format.) Treats returns and rejects the same. Requires similar password system to Citibank, but passwords do not change. Sends dummy file if no returns or rejects arrived that day. Can be retrieved after 6 AM ET the next day after the ACH request file is transmitted. Redeposit attempts after an NSF can be turned off optionally. Can handle acknowledgments for NOC's by an auto-prenote process. Accepts files on non-business days but will not process until the next business day. Multiple files can be sent. If two files with the same exact total are sent, the processing of the second file will be automatically suspended and a Chase representative will call Stamps.com to confirm the second file's validity. The first file is processed normally. Stamps.com can safely retransmit the same file, unlike with Citibank. Supports ACH reversals using NACHA format If there are any taxes, configure the servers and database to allow the offline determination of how much postage and related service fees were recognized by a state and if a CD was sent to a customer.

This ACH Password covers transfers to and transfers from Citibank for ACH transactions. While the bank Citibank is used to process ACH transactions, obviously other financial institutions can be used. Two password files are required each for NOC files, ACH rejection files, and transfer request files. One file covers the account from which Stamps.com receives files. The other covers the account to which Stamps.com transmits files. The ACH Password may need to be updated. One way to do this is to randomly generate a password preferably based on the rules below and send it to Citibank. Change the password each month. Ensure the password conforms to Citibank requirements, namely, that: The password is 7 characters; Alphanumeric; No repeating characters; No obscenities; No days of the week or months of the year; No ascending or descending characters or numerals, e.g., no 123, 321, abc, cba, etc.; Changed from the previous 5 passwords; Different first four characters of previous 5 passwords; Different first four characters from the username; Different first four characters from the name Stamps.com, i.e., STAM; and Cannot contain restricted words. Send two files containing the password to Citibank Include the account name, the old password, and the new password. Send the files using the standard transfer protocols. Send each file one at a time, i.e., log out after sending the first file and log back in to send the second one. After sending the files, notify the Payment Administrator to call Citibank personnel to confirm the change. To complete the change, upload each file containing a new password to the server, and set the passwords from these files as the new passwords for all ACH file transfers to Citibank.

There will be occasions when a customer disputes a charge. For those situations, Stamps.com should resolve the dispute as quickly as possible. If appropriate, refunds should be made in a timely manner either directly into the customer's account or through a credit on a credit card. Legitimate charges should be collected promptly. A collections agency may need to be employed for customers who do not submit payment in a timely manner, however if and how this will be implemented is still to be determined. FIG. 89 shows a process flow for a disputed charge process 1640. First, a notification of dispute is received 1642. This can be a fax received from the USPS or the Stamps.com merchant bank stating that a charge is being disputed. Forward all faxes immediately to the Payment Administrator for processing. Next, forward Payment Authorization report to FDMS and USPS 1644. The report is sent via fax (TBD) to FDMS and USPS for resolution. The report contains: customer name; customer ID#; transaction amount; date; address used for AVS; authentication number (if available.) Third, process the FDMS/USPS response 1646. Receive fax from the USPS or FDMS stating the result of the dispute. All faxes should be immediately forwarded to the Payment Administrator for processing 1646. Reactivate the meter, if appropriate, and credit or debit customer bill, as appropriate. Fourth, adjust the account 1648. Use the standard interface to debit or credit an account. Fifth, suspend account if applicable 1650. Payment Administrator uses an interface to set the disputed amount for meters associated with disputed postage payments. Payment Administrator uses an interface to suspend the meters associated with disputed service fee payments. Suspension of printing privileges is also appropriate when both postage and service fees are in dispute. Lastly, create report for Collections 1652.

Additional processes are preferably incorporated into the Commerce Processing System. A Refund Process procedure is established. Stamps.com should process refunds in a timely manner but in such a way that funds are only credited to customers once the refund has been verified. Printer jams, etc., are considered spoils and are dealt with separately. Envelopes with incorrect addresses, etc., are considered unused postage and are dealt with separately as well. Refer to the Meter Refund & Withdrawal Processing Software requirements documentation. For Spoils and Unused Postage, refer to the Misprint Processing Requirements.

For Internationalization of the system, consistent time zone should be used. The system will be able to correctly handle the situation in which the client and server are in different time zones. For daylight savings time the system should correctly handle situations in which the client and server change to daylight savings time at different times of day, different days, or not at all. Potentially, this can happen in the middle of any transaction with the client. As part of Internationalization, there should be included a language field indicating the preferred language of the customer. Send all e-mails to the customer in that language. This may be pre-populated with US English until needed. The following areas should also be encapsulated or otherwise isolated to ease internationalization: Currency; Numeric format (commas and periods); Dates, including the calendar used; Sorting; Telephone number formatting; Address formatting; Billing Administrator Interface The e-commerce system requires a numbering system to track each item that is processed through it. These unique number identifiers are referred to as stock-keeping units, or SHU's. These SHU's appear as the line items on the email statement e-mailed monthly to customers if applicable. All e-commerce transactions, from free postage and signing up for a monthly billing plan to customer support direct meter credits and monthly billing line items (both debit and credit), are assigned SHU's.

The system will provide for the preparation of various reports. Preferably, reports are archived for at least 3 months online and offline thereafter. These reports include Payment Requests Reports (which can cover daily payment requests made since the last payment processing), NOC Report, ACH Payments Rejected/Returned Reports, Credit Card Payments Rejected/Returned Reports, Meter Resets Reports, an ACH Transfer Breakdown Report (which allows the Payment Administrator to audit the lump sum payments transferred to the USPS account via ACH), an ACH Reversals Report, and a ACH and Credit Card Payment Rejected/Returned Report (for Service Fees) report.

FIG. 90 is a sample DTR/DBAR Fax to the USPS 1660, FIG. 91 is a sample form for Detail of Reconciling Items on the DBAR 1670, and FIG. 92 is a table 1672 of definitions for the DTR/DBAR Fax to the USPS of FIG. 90.

Figure 93:
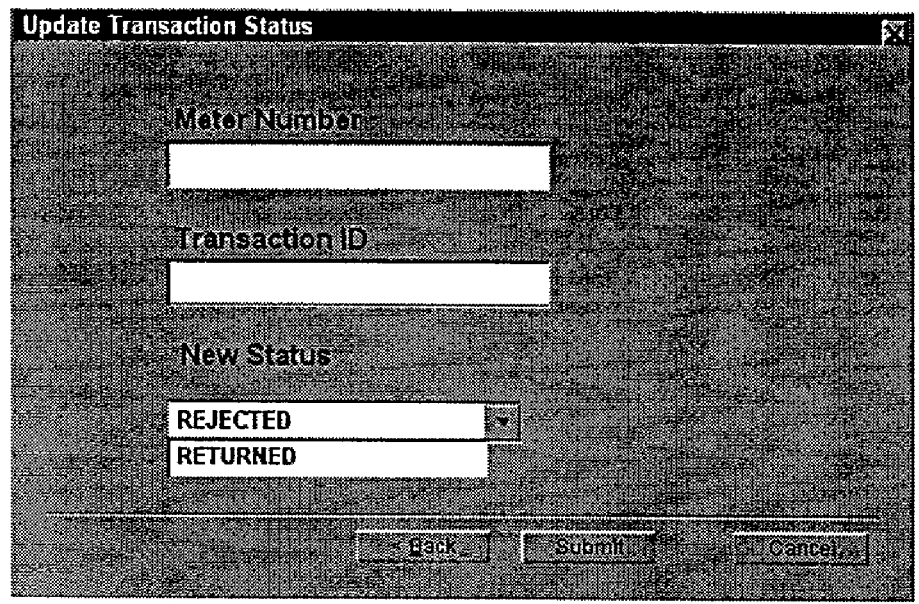
FIG. 93 is a screen print of an interface for the payment administrator.

There are certain interface requirements for the Commerce Processing software. The Payment Administrator is able to use the interface in the following ways: Adjust ACH Delay Variable; Adjust time of day Citibank files are processed; Change email template ID numbers used for all email template; Obtain disputed charge payment documentation; Enter Payment rejections; Suspend or Hold a customer account; Set the disputed amount for meters associated with disputed postage payments; Suspend the meters associated with disputed service fee payments; Directly credit a meter; and Directly credit or debit a credit card. For ACH payment rejections, the Payment Administrator is able to: Lookup the customer record by the meter number listed on the Citibank fax; and Change the transaction status to Rejected or Returned. FIG. 93 is a sample interface screen print of the Payment Administrator 1680. Customer Support is able to use the interface to: Add additional entries, debits or credits, to a customer's bill; Directly credit a meter; and Directly credit or debit a credit card. The Meter Administrator is able to use the interface to change the default maximum meter balance on an account-by-account basis.

The client handles the following summary of features explained elsewhere in this document: Handle new client access states; Handle pricing plan selection and switching; Enforce maximum and minimum postage purchase requirements; The client should offer the customer the chance to use the previously entered credit card or ACH information on file on the server, otherwise, the customer can enter a new one. Display only the last 5 digits of the credit card number along with the card type and expiration date; Implement new meter surrender procedure; Send messages to the client on log in, such as notify the client on login that the email address cannot be reached and to call Customer Support; Send info on advertising art printed to server; Inform user that purchase approval is pending after timing out; and Handle different daylight savings time changes and time zones from server. In additional other features may also be handled.

There are certain Email Template Requirements for the Commerce Processing System of the invention. Preferably, email templates are not deleted from the system. They are kept so that with transaction and other information, an email to a customer can be recreated. Each email template is assigned an ID number. These ID numbers are then associated with different e-mails that the system sends out. The Payment Administrator can change the email template ID number associated with each outgoing email type. Operational processes to assure management signoff and QA verification are beyond the scope of this specification. The list of email templates is as follows: Email customers notifying them that an ACH payment was rejected or returned and access will only be available to the undisputed amount in the meter; Email customers notifying them of meter reset, method, amount, date and time; Email customers notifying them of payment problem for rejected credit card captures; Email customers indicating bank has updated info and they should change it in the client (for ACH NOC); Email customers on the day of monthly billing an email statement outlining postage use and calculation of service fee; Email customers on the Consumer Plan a usage statement monthly; Email customers alerting them to charge calculation from switching plans and welcoming them to the new plan; Email customers asking them to call Customer Support if payment request fails during refund; Email customers when a credit or debit is made to their bills Email customers to update credit card information when the billing credit card is expiring (40 days beforehand); and Email withdrawing customers thanking them for using the service and explaining the refund timeline.

There are certain Notification Requirements for the Commerce Processing System of the invention. These include the following: Email the Payment Administrator with a simple message that the daily Citibank, CMLS, and CMRS processing has been fully transacted; Email Payment Administrator if 1 hour passes without successful credit card capture; Email the Payment Administrator if unable to send the CMRS files; Email Payment Administrator that DTR/DBAR is ready to be printed and faxed if DTR/DBAR should be faxed manually; Email Payment Administrator and Customer Support if the email statement cannot be delivered after 5 days (Customer name, ID number, statement date, phone number, and email address); Email the Payment Administrator to call Citibank personnel to confirm the change after sending the password files.

Another, miscellaneous requirement, is to log customers' IP address at every log in to the system.

Figure 94:
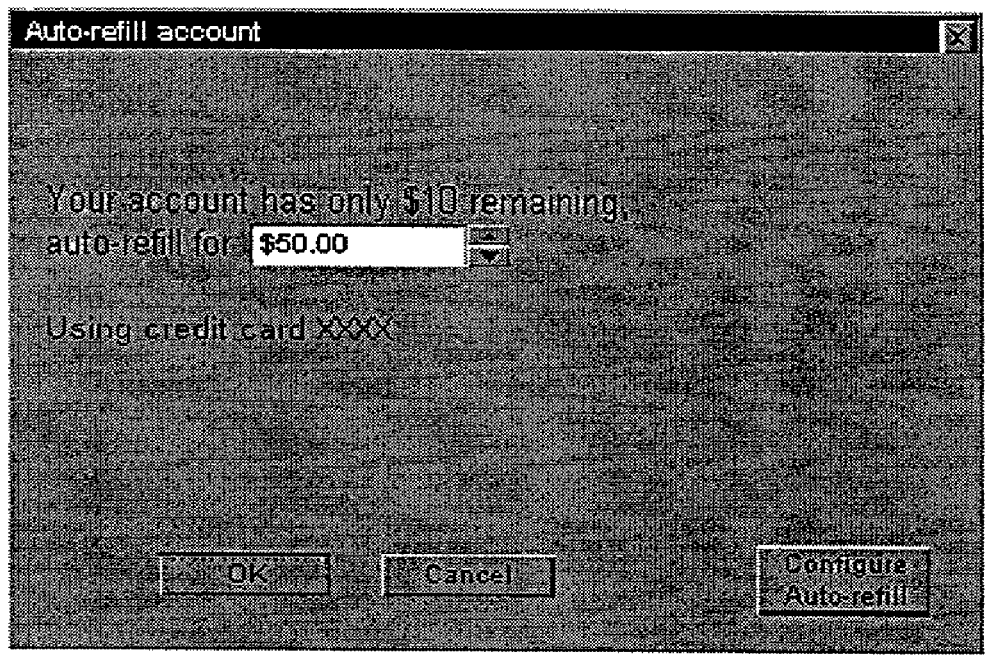
FIG. 94 is screen print for an auto-refill feature of the commerce processing system.

The Commerce Processing System of the invention has additional features. A user can initiate a Purchase through Auto-Refill. In order to configure auto-refill for the first time, if the customer does not have auto-refill set, they are shown an interface 1682 (a sample of which is shown in FIG. 94) when their account is at or below the minimum reset amount for their pricing plan. The customer should set an auto-refill level through the client that allows them to specify the "empty" level (the amount which triggers the refill), the refill amount, and the account that pays for the refill. The customer should not be able to specify an amount below the minimum specified in their pricing plan. Before the payment is submitted, the customer should see a message that reminds them that exceeding their maximum number of meter resets per month will result in a meter reset charge. At that point, the customer should be given the option to change the amount or submit the current amount. In order to trigger an auto-refill purchase, each time the customer prints postage, the client should check to see if the meter is at or below auto-refill minimum. If it is, the client should initiate a purchase request. The purchase request should be logged and processed as if it was manually initiated by the customer. Add a field to the purchase log to indicate if the purchase was manually initiated or auto-refill initiated. Send an email to the customer stating that the meter has been automatically reset via the auto-refill function. State the amount of the reset, the method (credit card, ACH), the new total amount in the meter immediately after the reset, and the number of free resets remaining this month. If the refill is the last free one, include a suggestion that they raise their reset amount.

Purchases may be initiated by Telemarketing or Customer Support. In such a scenario, customers call Stamps.com Telemarketing or Customer Support. Verify customer identity. Enter customer-supplied account, amount, method type, and specific payment method information. Verify transaction with customer. Supply transaction ID to customer after completing entry. Process as an ordinary credit card or ACH transaction with source field set as Stamps.com agent instead of manual, e.g., validate with Thompson software, etc. The client can view the new payment information on the next login.

There can be ACH Purchase Velocity Controls in place. These controls allow only a (configurable) maximum amount of postage payment requests to be processed over a (Payment Administrator) configurable period. The client should inform user that they have exceeded the velocity limit and disallow further requests. This feature prevents a customer from requesting unlimited ACH payments and printing the entire value multiple times in a 48-hour period until we catch them (slows ACH velocity.) There can be added a personal velocity override that can override the limits imposed above.

There can be an Online Postage Purchase Audit which compares the amount of ACH and credit card purchases versus amount reset in meters, taking into account rejections and returns and disputed amounts. A report is then sent to Payment Administrator and Risk Manager.

There can be Prioritize Postage Purchase Authorizations over monthly billing charges and postage purchase captures in the credit card pipeline if the credit card software allows this. This allows better real-time responsiveness for online postage purchases.

There can also be an ability to capture all authorized credit card purchases in batch mode. Batch processing shifts capture to a lower transaction demand time of day. The server should automatically capture all authorized purchases at a set time every day. This system should capture all approved purchases. This involves calling the merchant bank, transmitting a list of all authorized credit card transactions since last captures, retrying the merchant bank until capture completes, and notifying Payment Administrator if 1 hour passes without successful capture. The system should update payment status to captured for every previously authorized purchase that is successfully captured. Third, the system should handle rejected capture requests. Send report of all previously authorized purchases that are not successfully captured to the Payment Administrator, and send email to customer notifying them of payment problem.

There can be automated DTR/DBAR faxing, wherein a fax is automatically from the vault if possible.

There can be a Prepaid Plan Expiration Notification, wherein the customer is e-mailed 45 days before the expiration of the prepaid plan year. The customers' plans can be extended by 12 months when they pay for another year. The Client should support purchasing additional plan years when authorized There can be a Pricing Change Auto-Notification. Any changes to the plan should be logged along with the date of the change. The VP of Operations and VP of Marketing (and others) will be notified after a pricing change.

There can be a limitation on re-registrations, to limit the number of times a person or family can register or (quit and) re-register to the same address or limit the offering of free postage and free starter kits. This will require maintaining addresses of current and previous customers to enforce this limitation.

Lastly, the Billing Administrator should be able to use the interface to change the Pricing Plan table or change the billing statement format.

That completes the discussion of the Commerce Processing system of the On-line Postage System. The above processes and systems have been described in connection with the assignee Stamps.com for convenience sake. Furthermore, references to particular banks and financial institutions (e.g. Citibank and Chase Manhattan) are not intended to be limitation to the bank or financial institution used for various functions. References herein to the USPS are by way of example, and as other nations's postal authorities implement IBIP types of programs, the above described system can be put into place in foreign postal jurisdictions. The system and method of the invention can be implemented on a system-wide basis, or certain components and elements of the described system can be implemented, as desired. All in all, the system and method of the invention allows many critical functions of an on-line postage system to be automated, not only to save costs, but to improve service and profitability. It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for generating meter refund indicia data, the method comprising:
   providing a secure network between a postage value administrator and a postal service provider;
   authenticating a user at a user computer by a server on the secure network, wherein the server comprises a database and a cryptographic module;
   accessing meter refund withdrawal software executing on a user computer and transmitting to the server a request for a meter refund using the meter refund withdrawal software;
   processing the meter refund request via a meter refund application executing on the secure network at a support personnel computer;
   contacting the cryptographic module by the meter refund application;
   calculating the meter refund by the cryptographic module;
   generating indicia data for the calculated meter refund by the cryptographic module by accessing meter refund information from the database;
   transmitting the generated indicia data from a vault wherein the vault comprises the server; and
   printing the indicia including the indicia data.

2. The method of claim 1, wherein processing the meter refund request allows a meter administrator to initiate the meter refund.

3. The method of claim 1, wherein processing the meter refund request comprises generating reports including a withdrawal request report and a withdrawn meters reports.

4. The method of claim 1, wherein accessing the meter refund withdrawal software executing on the user computer comprises accessing a GUI to permit the user computer to interact with the server.

5. The method of claim 1, wherein the indicia is printed to an electronic file.

6. The method of claim 1, wherein the indicia is printed to a printer.

7. The method of claim 1, further comprising utilizing code for searching for a customer.

8. The method of claim 1, further comprising utilizing code for accessing a postage transaction history.

9. The method of claim 1, further comprising utilizing code for placing an administrative hold on an account.

10. The method of claim 1, further comprising utilizing code for accessing an e-mail history.

11. The method of claim 1, further comprising utilizing code for executing a file transfer status and file download.

12. The method of claim 1, further comprising utilizing code for executing a file transfer archive search.

13. The method of claim 1, further comprising utilizing code for uploading quality assurance envelopes.

14. The method of claim 1, further comprising utilizing code for providing print error credits to a customer.

* * * * *